(12) United States Patent
Campbell et al.

(10) Patent No.: US 12,447,430 B2
(45) Date of Patent: *Oct. 21, 2025

(54) ASSEMBLIES; COMPONENTS AND FILTER FEATURES THEREOF; AND, METHODS OF USE AND ASSEMBLY

(71) Applicant: Donaldson Company, Inc., Minneapolis, MN (US)

(72) Inventors: Steven K. Campbell, Lakeville, MN (US); Richard Patrick Manahan, Lake Elmo, MN (US)

(73) Assignee: Donaldson Company, Inc., Bloomington, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/603,624

(22) Filed: Mar. 13, 2024

(65) Prior Publication Data

US 2024/0216848 A1     Jul. 4, 2024

Related U.S. Application Data

(63) Continuation of application No. 17/711,386, filed on Apr. 1, 2022, now Pat. No. 11,938,432, which is a
(Continued)

(51) Int. Cl.
| | |
|---|---|
| *B01D 46/00* | (2022.01) |
| *B01D 46/24* | (2006.01) |
| *B01D 46/42* | (2006.01) |

(52) U.S. Cl.
CPC ...... *B01D 46/0005* (2013.01); *B01D 46/2411* (2013.01); *B01D 46/4227* (2013.01);
(Continued)

(58) Field of Classification Search
CPC ........ B01D 2265/022; B01D 2265/028; B01D 2265/06; B01D 46/0005; B01D 46/2411;
(Continued)

(56) References Cited

U.S. PATENT DOCUMENTS

| | | | |
|---|---|---|---|
| 4,135,899 | A | 1/1979 | Gauer |
| 5,772,883 | A | 6/1998 | Rothman et al. |

(Continued)

FOREIGN PATENT DOCUMENTS

| | | |
|---|---|---|
| CN | 203886287 | 10/2014 |
| CN | 108430600 | 8/2018 |

(Continued)

OTHER PUBLICATIONS

Invitation to Pay Extra Search Fees with Partial Search Report corresponding to PCT/US2019/062648 mailed Apr. 1, 2020.
(Continued)

*Primary Examiner* — Robert Clemente
(74) *Attorney, Agent, or Firm* — Merchant & Gould P.C.

(57) ABSTRACT

An air cleaner assembly is disclosed, along with related methods. In one aspect, the air cleaner assembly has a housing including a housing body and a removable cover that together define an interior volume for holding a filter cartridge. The housing can include a first part of a first connection arrangement. The air filter cartridge can include a second part of the first connection arrangement. In one aspect, the first and second parts can be secured together place the air filter cartridge in a latched position by moving the air filter cartridge in a first direction. In one aspect, the first and second parts can be disconnected from each other to place the air filter cartridge in an unlatched position by moving the air filter cartridge in the first direction. The air cleaner assembly can include a second connection arrangement securing the air filter cartridge to the housing cover such that the housing body and housing cover are secured together.

14 Claims, 59 Drawing Sheets

Related U.S. Application Data continuation of application No. 16/690,753, filed on Nov. 21, 2019, now Pat. No. 11,298,642.

(60) Provisional application No. 62/932,556, filed on Nov. 8, 2019, provisional application No. 62/770,474, filed on Nov. 21, 2018.

(52) U.S. Cl.
CPC .. *B01D 2265/024* (2013.01); *B01D 2265/028* (2013.01); *B01D 2265/06* (2013.01); *B01D 2279/60* (2013.01)

(58) Field of Classification Search
CPC .......... B01D 46/2412; B01D 2271/027; B01D 2279/60
See application file for complete search history.

(56) References Cited

U.S. PATENT DOCUMENTS

| | | | |
|---|---|---|---|
| D396,098 S | 7/1998 | Gillingham et al. | |
| 5,792,247 A | 8/1998 | Gillingham et al. | |
| D398,046 S | 9/1998 | Gillingham et al. | |
| D399,944 S | 10/1998 | Gillingham et al. | |
| 5,820,646 A | 10/1998 | Gillingham et al. | |
| 5,895,574 A | 4/1999 | Friedmann et al. | |
| 5,902,364 A | 5/1999 | Tokar et al. | |
| D428,128 S | 7/2000 | Gillingham et al. | |
| 6,179,890 B1 | 1/2001 | Ramos et al. | |
| D437,401 S | 2/2001 | Ramos et al. | |
| 6,190,432 B1 | 2/2001 | Gieseke et al. | |
| 6,210,469 B1 | 4/2001 | Tokar | |
| 6,235,195 B1 | 5/2001 | Tokar | |
| 6,350,296 B1 | 2/2002 | Warner | |
| 6,533,933 B1 * | 3/2003 | Stankowski | B01D 29/96 210/232 |
| 8,097,156 B2 | 1/2012 | Tubbey et al. | |
| 8,097,157 B2 | 1/2012 | Tubbey et al. | |
| 8,784,523 B2 | 7/2014 | Coulonvaux et al. | |
| 8,864,866 B2 | 10/2014 | Osendorf et al. | |
| 11,298,642 B2 | 4/2022 | Campbell et al. | |
| 2005/0081497 A1 | 4/2005 | Connor et al. | |
| 2005/0172590 A1 * | 8/2005 | Burns | B01D 46/2407 55/498 |
| 2005/0235620 A1 | 10/2005 | Connor et al. | |
| 2006/0006124 A1 | 1/2006 | Yates et al. | |
| 2008/0142425 A1 * | 6/2008 | Hansen | B01D 46/2414 210/232 |
| 2009/0241489 A1 | 10/2009 | Becker et al. | |
| 2012/0060453 A1 | 3/2012 | Holzmann et al. | |
| 2013/0081990 A1 * | 4/2013 | Roesgen | B01D 35/30 210/232 |
| 2014/0166563 A1 | 6/2014 | Tubby et al. | |
| 2016/0038862 A1 | 2/2016 | Barnwell | |
| 2016/0184744 A1 | 6/2016 | Jakop | |
| 2016/0271536 A1 | 9/2016 | Joung et al. | |
| 2020/0155988 A1 | 5/2020 | Campbell | |

FOREIGN PATENT DOCUMENTS

| | | |
|---|---|---|
| DE | 2739290 | 3/1978 |
| DE | 10010507 | 9/2001 |
| DE | 202013011867 | 12/2014 |
| EP | 1616611 | 1/2006 |
| FR | 2363355 | 3/1978 |
| GB | 1499922 | 2/1978 |
| JP | 2006026633 | 2/2006 |
| JP | 2016036809 | 3/2016 |
| JP | 2019532811 | 11/2019 |
| WO | 2018111434 | 6/2018 |

OTHER PUBLICATIONS

International Search Report and Written Opinion corresponding to PCT/US2019/062648, dated Aug. 5, 2020.
International Search Report and Written Opinion for PCT/US2022/026034, mailed Jul. 21, 2022.
Machine translation of DE 20 2013 011 867 (Year: 2015).
Machine translation of FR 2 363 355 (Year: 1978).
European Search Report for EP24167805.1 mailed Jul. 19, 2024.

* cited by examiner

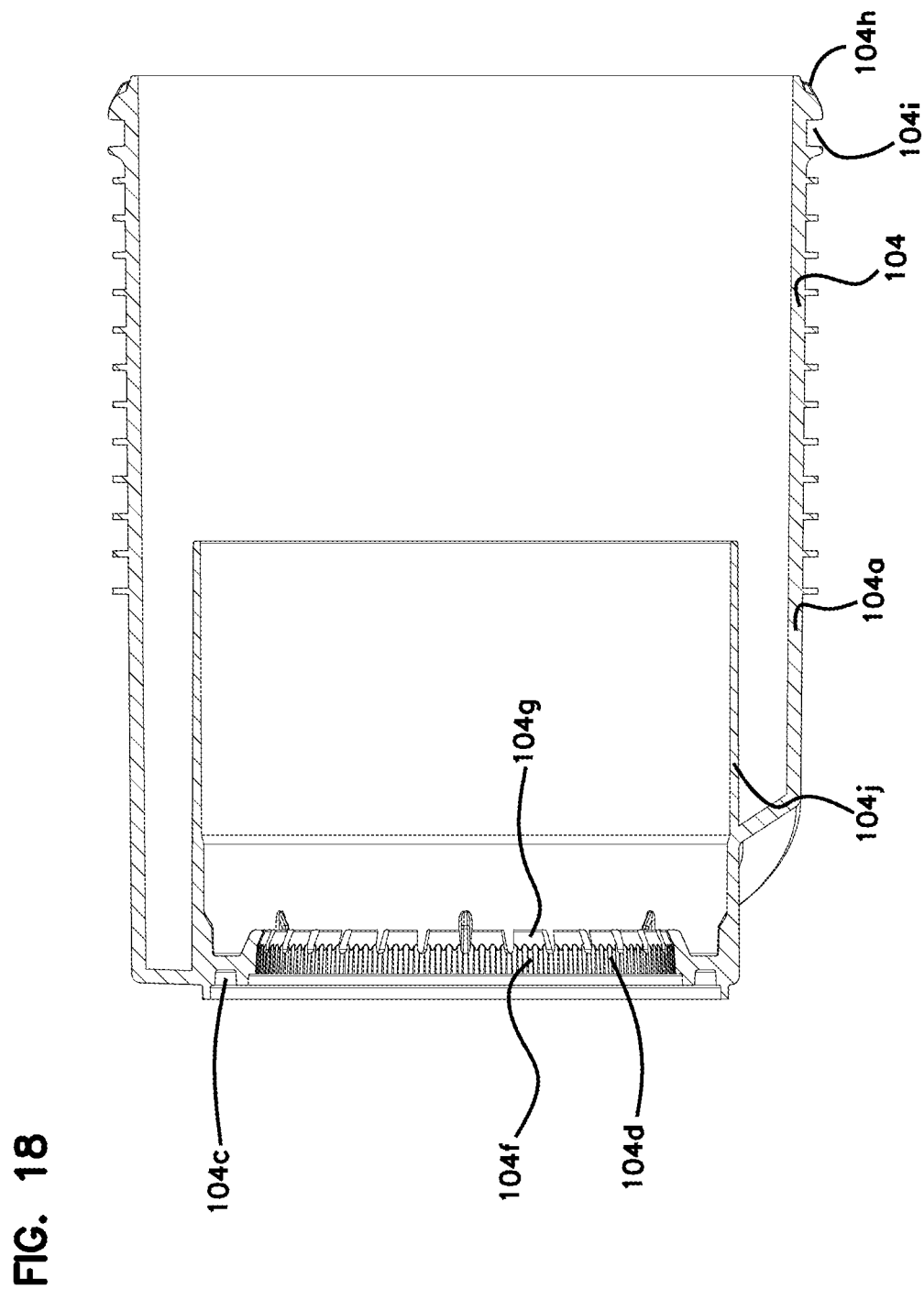

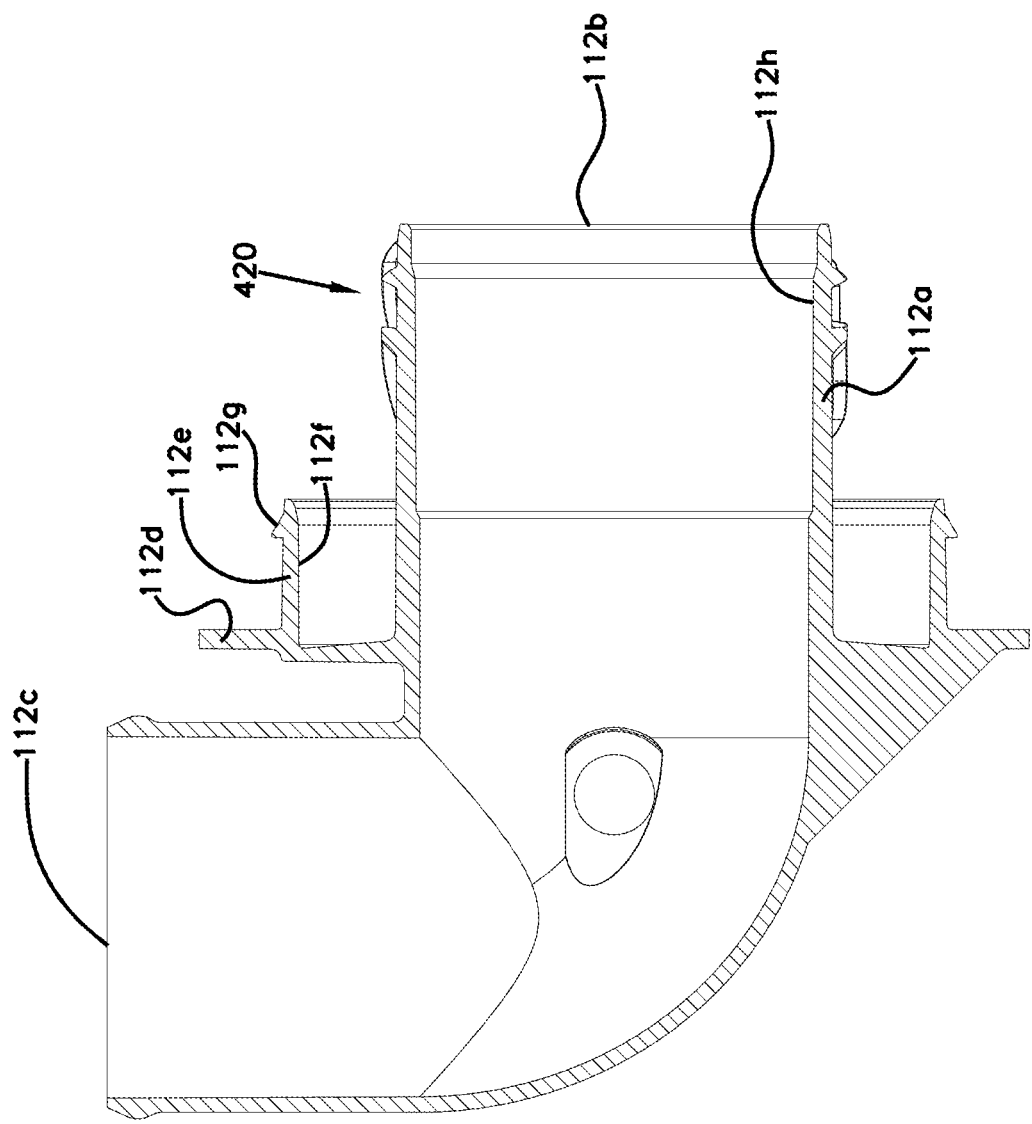

FIG. 35
FIG. 36
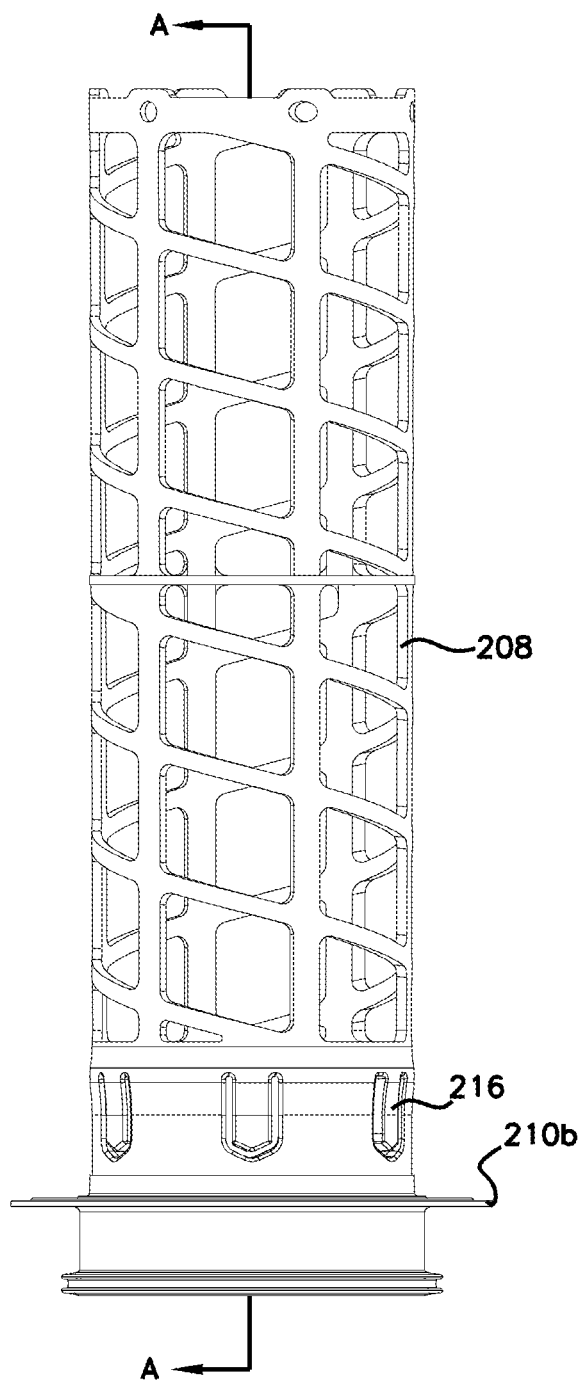
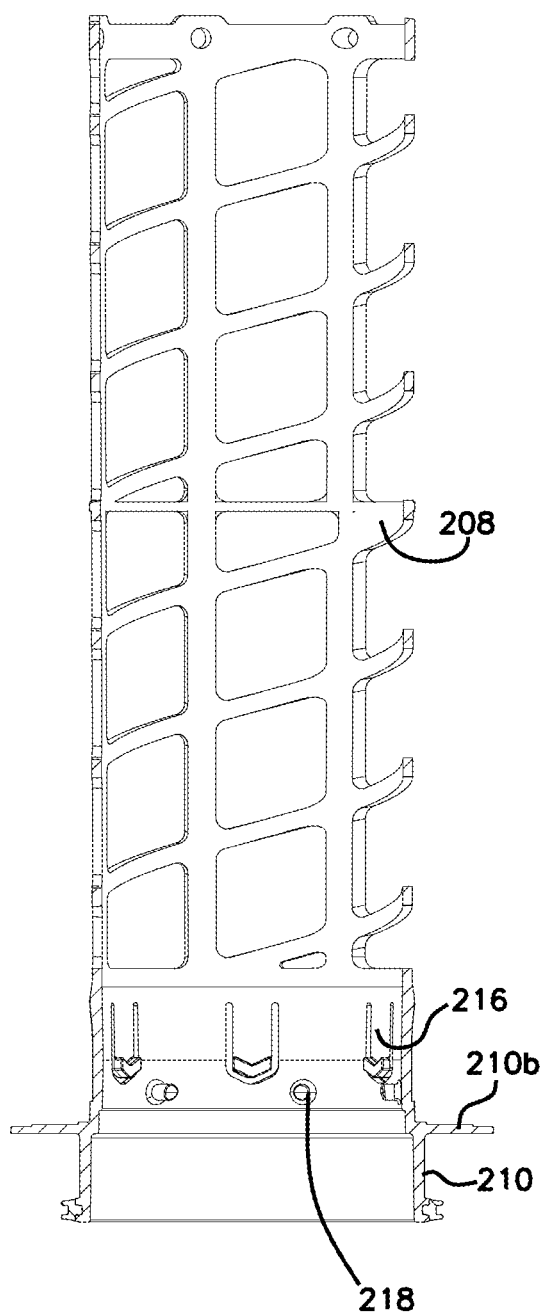

FIG. 42
FIG. 43
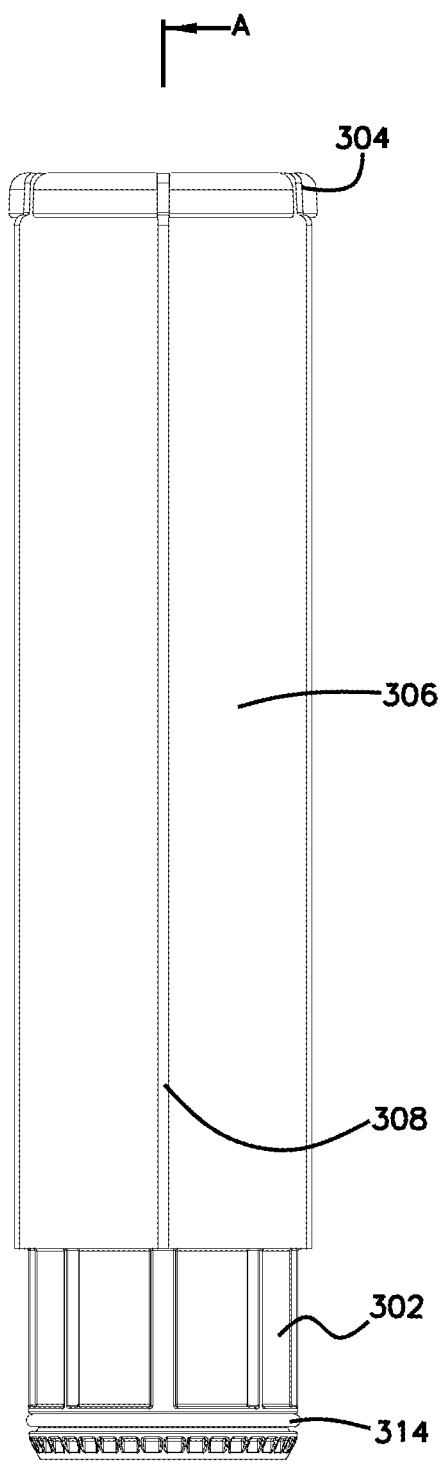
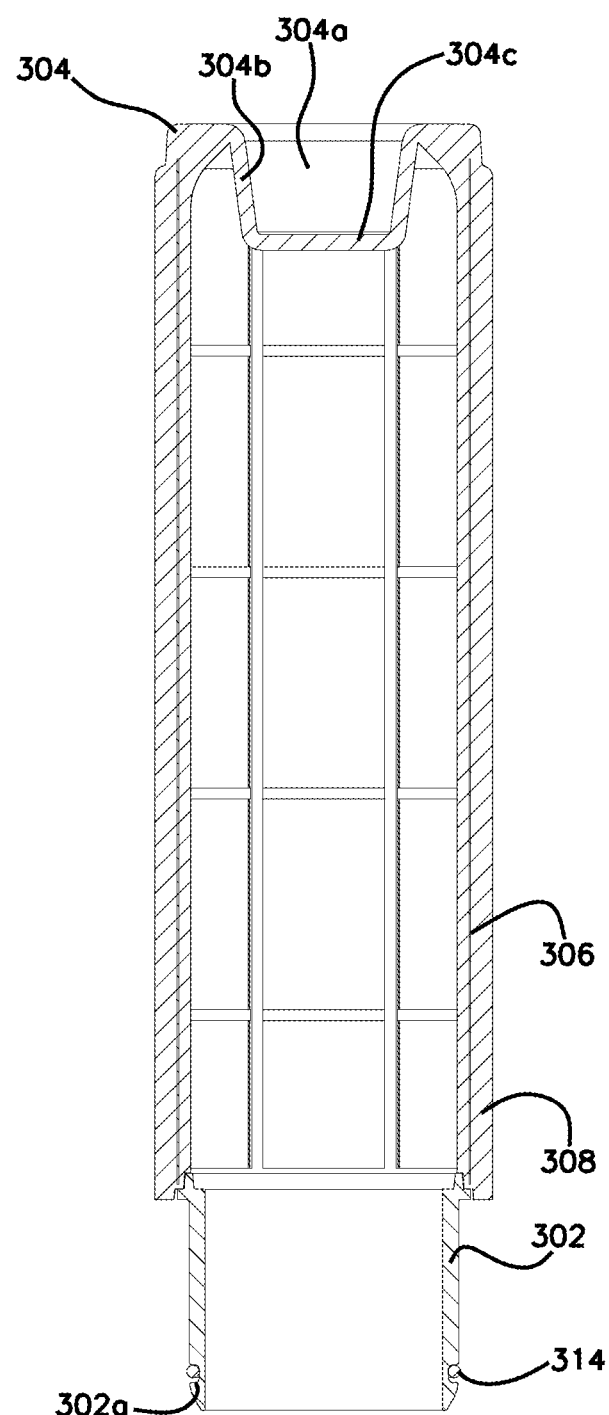

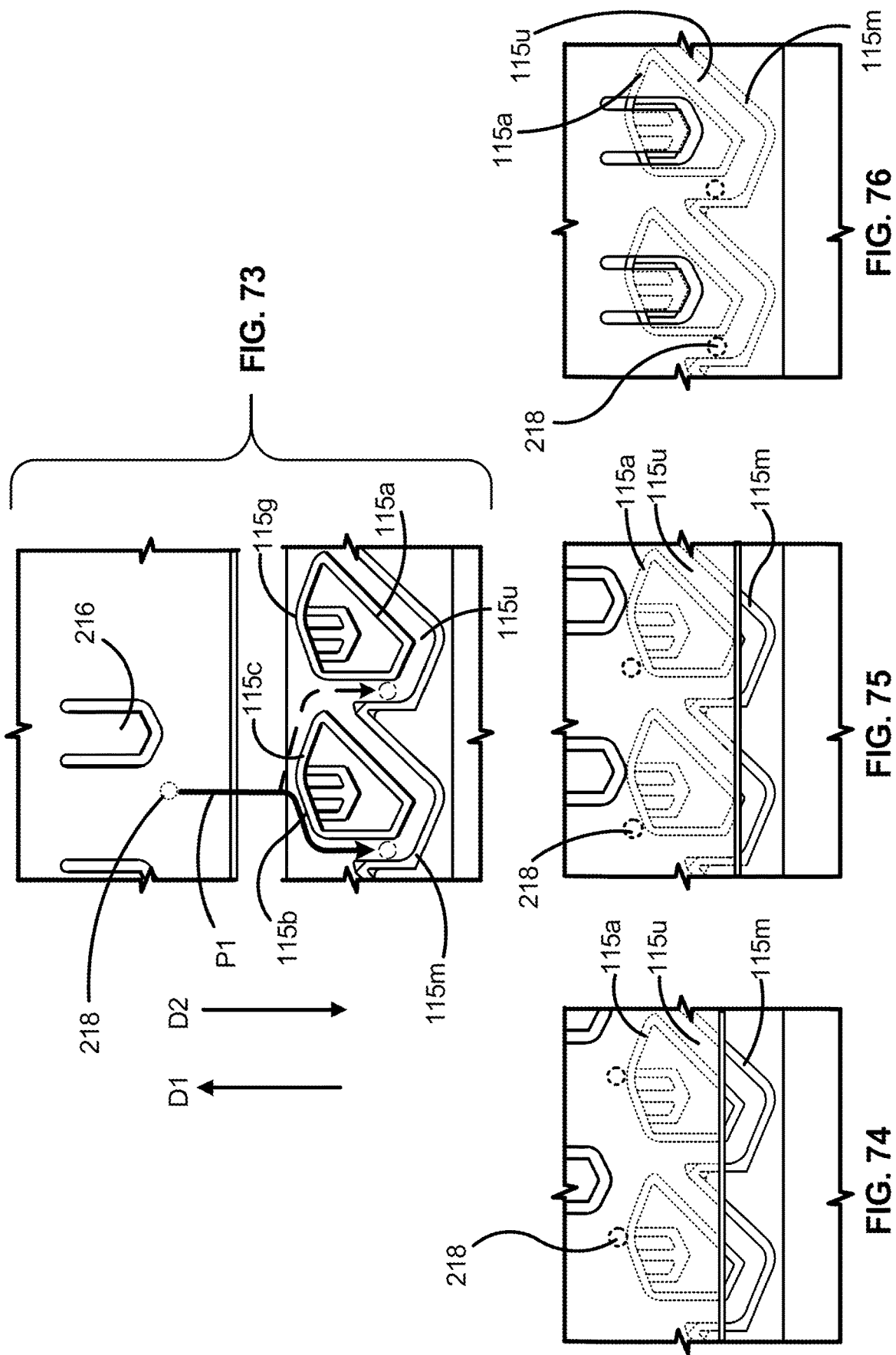

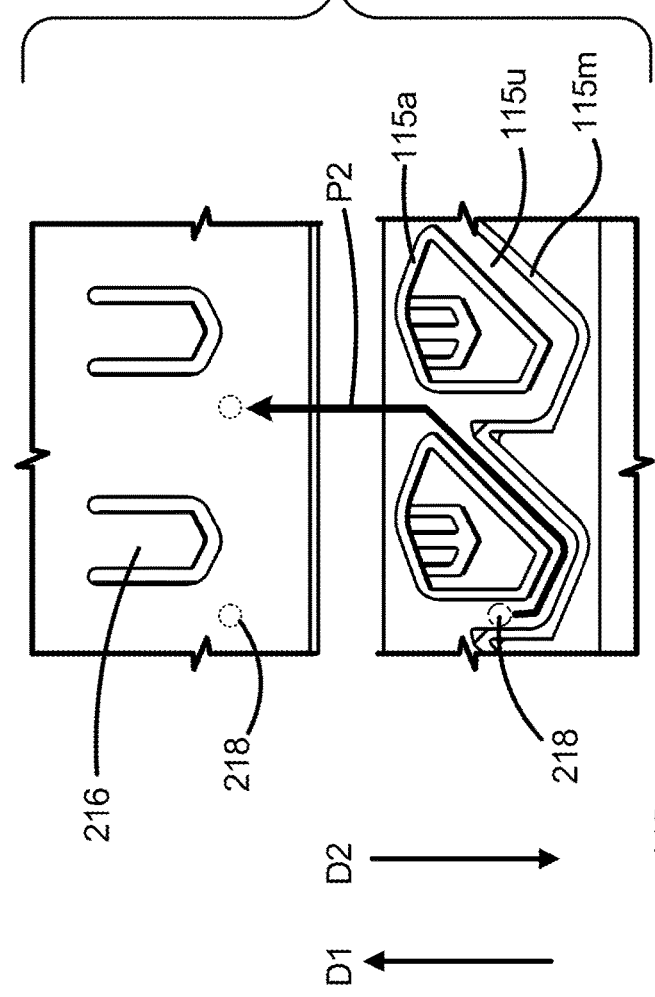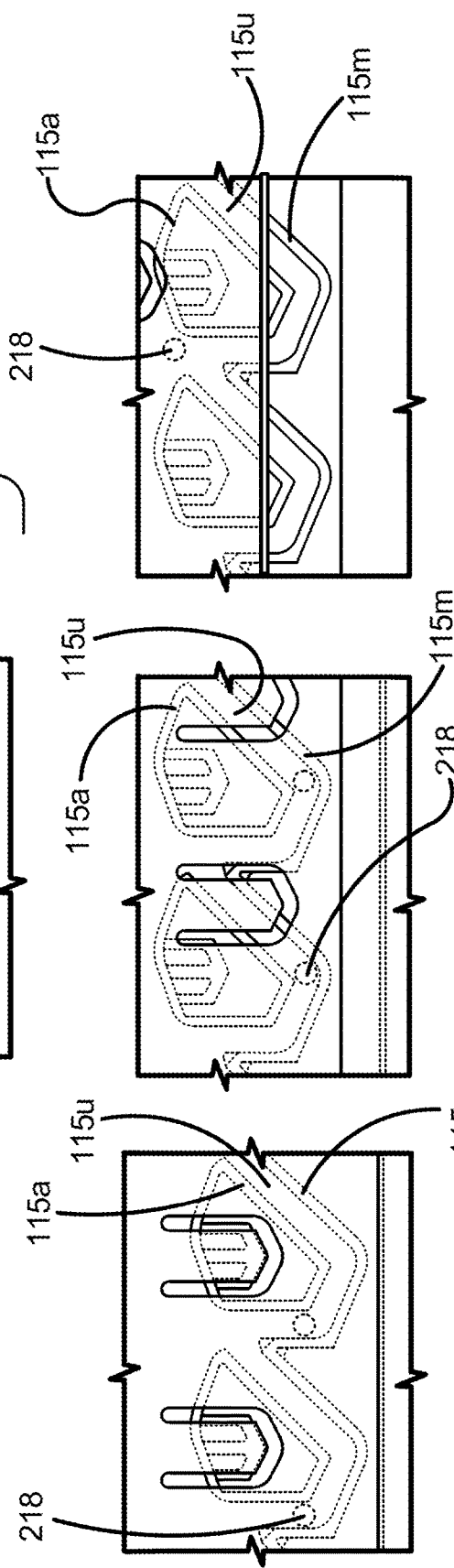

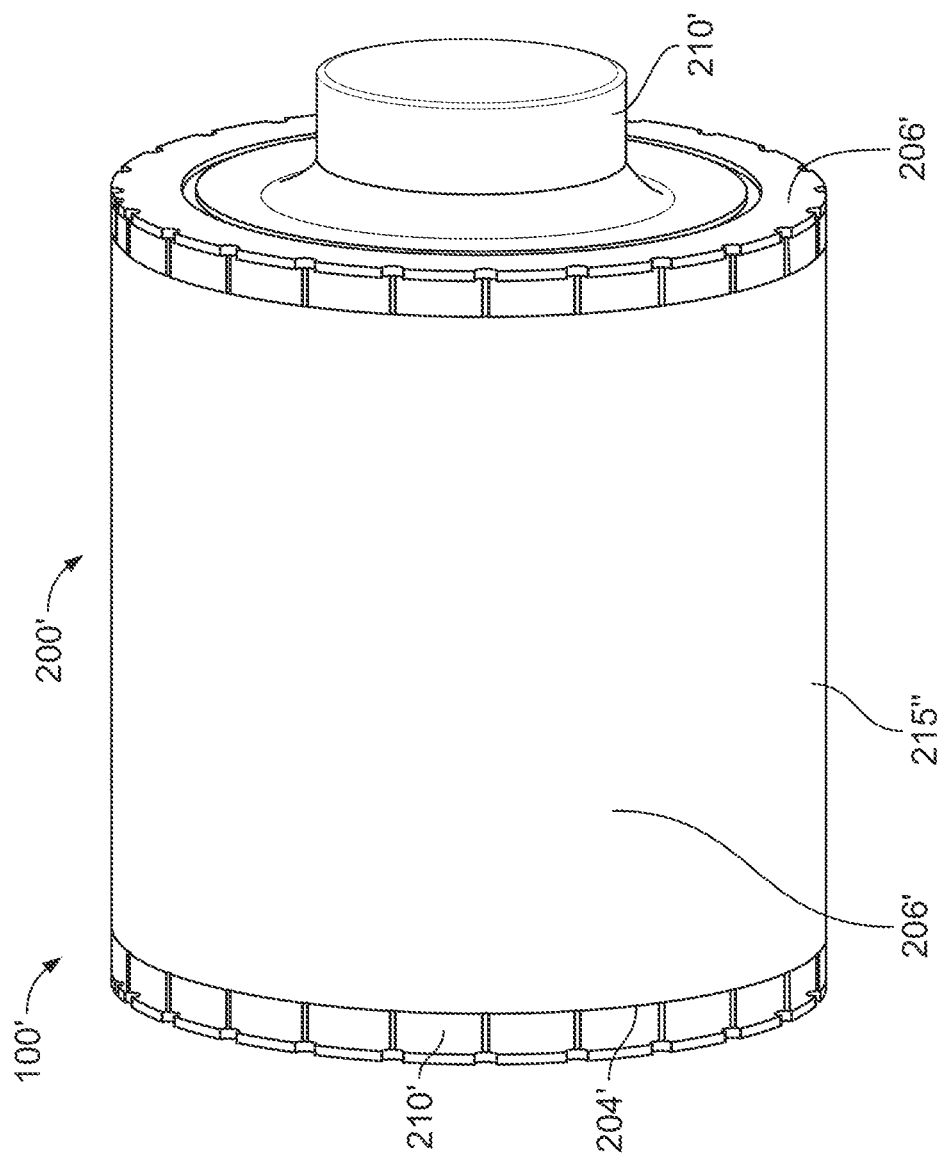

ASSEMBLIES; COMPONENTS AND FILTER FEATURES THEREOF; AND, METHODS OF USE AND ASSEMBLY

CROSS-REFERENCE TO RELATED APPLICATIONS

The present disclosure is a continuation of U.S. Ser. No. 17/711,386, filed Apr. 1, 2022, now U.S. Pat. No. 11,938,432. U.S. Ser. No. 17/711,386 is a continuation of U.S. Ser. No. 16/690,753, filed Nov. 21, 2019, now U.S. Pat. No. 11,298,642. U.S. Ser. No. 16/690,753 includes, with edits, the disclosures of U.S. Serial Nos. 62/770,474, filed Nov. 21, 2018 and 62/932,556, filed Nov. 8, 2019. The complete disclosures of each of the above-listed applications are incorporated herein by reference. A claim of priority to each of the above-referenced applications is made to the extent appropriate.

FIELD OF THE DISCLOSURE

The present disclosure relates to filter assemblies, for example air cleaner assemblies, and components and features thereof, and methods of assembly and use. The filter assemblies comprise a housing having a removable and replaceable filter cartridge therein. The filter cartridge is optionally configured with a housing seal arrangement, to advantage. Various features of filter housings and/or the cartridges are described, including features directed to a system for securing the filter cartridge within the housing and for securing the housing to a removable cover via the filter cartridge, which can provide for advantage. Methods of assembly and use are described.

BACKGROUND

Air or other gas filtering is desirable in a number of systems. A typical application is in the filtration of intake air to internal combustion engines. Another is in the filtration of crankcase ventilation filter assemblies. Typically, such systems comprise filter assemblies having a serviceable filter cartridge therein. After a period of use, filter media within a filter housing requires servicing, either through cleaning or complete replacement. Typically, for an air cleaner or crankcase ventilation filter assembly used with an internal combustion engine, for example on a vehicle, the filter media is contained in a removable and replaceable, i.e. serviceable, component, typically referred as a filter element or cartridge. The filter cartridge is configured to be removably sealed within the air cleaner, in use. Improvements in filter arrangements relating to assembly, serviceability, use are desirable.

SUMMARY

Filter assemblies (such as air cleaner assemblies or crankcase ventilation filter assemblies) components therefor; and, features thereof are described. Also described are methods of assembly and use. The filter assemblies generally comprise a housing assembly having a filter cartridge removably positioned therein. The housing assembly includes a main housing assembly and a removable cover which can be advantageously secured together in an axial direction by the filter cartridge. The main housing assembly may include, among other elements, a housing body and an outlet tube. In an alternate arrangement, a separate locking arrangement can be provided on the main housing assembly and removable cover to secure the removable cover to the housing body.

In one aspect, the filter cartridge can be provided with a first connection arrangement that allows the filter cartridge to be secured to and released from the main housing assembly or to the removable cover by an axial force provided by an operator in a "push-push" action. For example, the filter cartridge can be pushed in the insertion direction to latch the filter cartridge to the main housing assembly or removable cover, and can also be pushed again in the insertion direction to de-latch the filter cartridge from the main housing assembly or cover. In the example shown, the first connection arrangement elements are located on a support tower of the filter cartridge and an outlet tube of the main housing assembly.

In one aspect, the filter cartridge can be secured to the main housing assembly or removable cover by a second connection arrangement located at the opposite end of the filter cartridge from the first connection arrangement. The second connection arrangement can be configured as a rotatable cap with a threaded member mounted to the removable cover that engages with corresponding threads in the filter cartridge to place the filter cartridge in tension against the force of the first connection arrangement.

The disclosed configuration allows for an air cleaner assembly to be installed in a tight space, such as a vehicle engine compartment, without requiring access to the circumferential portion of the air cleaner housing in order to install and/or remove the associated filter cartridge and without requiring rotation of the cover relative to the housing body. Rather, the filter cartridge can be readily accessed at the end of the air cleaner assembly by simply disengaging the second connection arrangement and removing the cover in a direction opposite the filter cartridge insertion direction (i.e. axially). The filter cartridge can then be installed and/or removed from the main housing body by using the above described push-push approach. Accordingly, the disclosed air cleaner assembly has a smaller operational footprint in comparison to air cleaners using circumferentially arranged latches.

In one example, an air cleaner assembly includes a housing defining an interior cavity, an air inlet, and an air outlet, the air inlet and air outlet being in fluid communication with the interior cavity. The air cleaner assembly can further include an air filter cartridge disposed within the interior cavity, the air filter cartridge extending along a longitudinal axis and including an air filtration media separating the air inlet from the air outlet. The air cleaner assembly can further include a first connection arrangement having a first part associated with one of the air filter cartridge and the housing and having a second part associated with the other of the air filter cartridge and the housing. In some examples, the air filter cartridge is movable between a latched position and an unlatched position: in the latched position, the first part being engaged with the second part; in the unlatched position, the first part being disengaged with the second part. In some examples, the air filter cartridge is movable from the latched position to the unlatched position and from the unlatched position to the latched position by moving the air filter cartridge in a first direction parallel to the longitudinal axis.

In some examples, one of the first and second parts is located within an airflow path defined between the air outlet and the air filtration media.

In some examples, the air cleaner assembly includes a second connection arrangement securing the air filter cartridge to a cover of the housing, wherein the first and second connection arrangements secure the housing cover to a body of the housing via the air filter cartridge.

In some examples, the second connection arrangement includes a handle rotatably secured to the housing cover, wherein rotation of the handle in a first direction secures the air filter cartridge to the housing cover and rotation of the handle in a second direction disconnects the air filter cartridge from the housing cover.

In some examples, the air cleaner assembly includes a biasing element that biases the filter cartridge in a second direction opposite the first direction.

In some examples, the biasing element is secured to the air filter cartridge.

In some examples, the air filter cartridge rotates as the air filter cartridge moves from the latched position to the unlatched position and moves in a second direction opposite the first direction.

In some examples, one of the first and second parts includes a deflectable latch arm and the other of the first and second parts includes a catch engaged with the deflectable latch arm.

In some examples, the deflectable latch arm includes a plurality of deflectable latch arms.

In some examples, the deflectable latch arm is integrally formed in a support tube of the air filter cartridge.

In some examples, one of the first and second parts includes a guide pin.

In some examples, the guide pin includes a plurality of guide pins.

In some examples, the guide pin is integrally formed in a support tube of the air filter cartridge.

In some examples, the first or second part includes a plurality of guide pins and a plurality of deflectable latch members.

In some examples, the catch is arranged on an outlet tube of the housing.

In some examples, the outlet tube is rotatable with respect to a housing body of the housing.

In some examples, the first or second part includes a channel structure for receiving the guide pin.

In some examples, the biasing element is located proximate a closed end of the air filter cartridge.

In some examples, the first or second part of the first connection arrangement is located proximate an open end of the air filter cartridge.

In one example, an air cleaner assembly includes a housing defining an interior cavity, an inlet, and an outlet, the inlet and outlet being in fluid communication with the interior cavity, the housing assembly including a catch. The air cleaner assembly can include an air filter cartridge disposed within the interior cavity, the air filter cartridge extending along a longitudinal axis and including an air filtration media separating the housing inlet from the housing outlet, the air filter cartridge including a deflectable latch arm. The air filter cartridge can be movable between a latched position and an unlatched position: in the latched position, the deflectable latch arm being engaged with the catch; in the unlatched position, the deflectable latch arm being disengaged with the catch. The air filter cartridge can be movable from the latched position to the unlatched position and from the unlatched position to the latched position by moving the air filter cartridge in a first direction parallel to the longitudinal axis.

In some examples, at least a portion of the deflectable latch arm is located within an airflow path defined between the air outlet and the air filtration media.

In some examples, the air filter cartridge rotates as the air filter cartridge moves from the latched position to the unlatched position and moves in a second direction opposite the first direction.

In some examples, the deflectable latch arm includes a plurality of deflectable latch arms.

In some examples, the deflectable latch arm is integrally formed in a support tube of the air filter cartridge.

In some examples, the air filter cartridge further includes a guide pin interacting with a channel structure of the housing.

In some examples, the guide pin includes a plurality of guide pins.

In some examples, the guide pin is integrally formed in a support tube of the air filter cartridge.

In some examples, the air filter cartridge includes a plurality of guide pins and a plurality of deflectable latch members.

In some examples, the catch is arranged on an outlet tube of the housing.

In some examples, the outlet tube is rotatable with respect to a housing body of the housing.

In some examples, the latch arm is located proximate an open end of the air filter cartridge.

In one example, an air cleaner assembly includes a housing including a housing body and a housing cover, the housing body and cover defining an interior volume and an air filter cartridge disposed within the housing. The air cleaner assembly can include a first connection arrangement securing the air filter cartridge to the housing body and a second connection arrangement securing the air filter cartridge to the housing cover such that the housing body and housing cover are secured together, the second connection arrangement including a handle rotatably secured to the housing cover, wherein rotation of the handle in a first direction secures the air filter cartridge to the housing cover and rotation of the handle in a second direction disconnects the air filter cartridge from the housing cover.

In some examples, the air filter cartridge includes a first end cap with a first part of the second connection arrangement that engages with a second part of the second connection arrangement associated with the handle.

In some examples, the first part of the second connection arrangement includes internal threads and the second part of the second threaded arrangement includes external threads.

In some examples, the first end cap is a closed end cap.

In some examples, the first part of the second connection arrangement is integrally molded with the end cap.

In some examples, the handle includes a torque-limiting mechanism.

In one example, an air filter cartridge includes an air filtration media arrangement extending between a first end and a second end, a first end cap proximate the first end of the air filtration media arrangement, a second end cap proximate the second end of the media arrangement, and a deflectable latch arm for engaging with a catch associated with a housing of an air cleaner assembly.

In some examples, the deflectable latch arm includes a plurality of deflectable latch arms.

In some examples, the deflectable latch arm is integrally formed in a support tube of the air filter cartridge.

In some examples, the deflectable latch arm is located proximate the first end cap of the air filter cartridge.

In some examples, the air filter cartridge further includes a guide pin for aligning the deflectable latch arm with the catch.

In some examples, the guide pin includes a plurality of guide pins.

In some examples, the guide pin is integrally formed in a support tube of the air filter cartridge.

In some examples, the air filter cartridge includes a plurality of guide pins and a plurality of deflectable latch members.

In some examples, the air filter cartridge includes a biasing spring for biasing the air filter cartridge in a first direction opposite an insertion direction of the air filter cartridge.

In some examples, the biasing spring is located proximate a second end cap of the air filter cartridge.

In one example, an air filter cartridge includes an air filtration media arrangement extending between a first end and a second end, a first end cap proximate the first end of the air filtration media arrangement, a second end cap proximate the second end of the air filtration media arrangement, a first part of a connection arrangement for engaging with a second part of the connection arrangement associated with a housing of an air cleaner assembly, and a biasing element for biasing the first part against the second part for securing the air filter cartridge to the housing.

In some examples, the biasing element is located proximate a second end cap of the air filter cartridge.

In some examples, the biasing element is a helical spring.

In some examples, the first part of the connection arrangement is located proximate the first end cap and the biasing element is located proximate the second end cap.

In some examples, the first end cap is an open end cap and the second end cap is an open end cap.

In some examples, the first part is a deflectable latch arm.

In some examples, the first part is a plurality of deflectable latch arms.

In some examples, the first part is integrally formed with a support tube of the air filter cartridge.

In some examples, the first part is located within a clean airflow path defined between the first end cap and the air filtration media.

In one example, an air filter cartridge includes an air filtration media arrangement extending between a first end and a second end, a first end cap proximate the first end of the air filtration media arrangement, a second end cap proximate the second end of the air filtration media arrangement, and a first part of a first connection arrangement for engaging with a second part of the first connection arrangement associated with a housing of an air cleaner assembly, wherein the first part is at least partially located within a clean airflow path defined between the first end cap and the air filtration media.

In some examples, the first part is located within an interior volume defined by at least one of the air filtration media arrangement or a support tube that supports the air filtration media arrangement.

In some examples, the first part is a deflectable latch arm.

In some examples, the deflectable latch arm includes a plurality of deflectable latch arms.

In some examples, the deflectable latch arm is integrally formed in a support tube of the air filter cartridge.

In some examples, the deflectable latch arm is located proximate the first end cap of the air filter cartridge, wherein the first end cap is an open end cap.

In some examples, the air filter cartridge further includes a guide pin for aligning the deflectable latch arm with the catch.

In some examples, the guide pin includes a plurality of guide pins.

In some examples, the guide pin is integrally formed in a support tube of the air filter cartridge.

In some examples, the air filter cartridge includes a plurality of guide pins and a plurality of deflectable latch members.

In some examples, the air filter cartridge includes a biasing spring for biasing the air filter cartridge in a first direction opposite an insertion direction of the air filter cartridge.

In some examples, the air filter cartridge includes a first part of a second connection arrangement for engaging with a second part of the second connection arrangement associated with a cover of an air cleaner assembly.

In some examples, the first part of the second connection arrangement includes internal threads.

In some examples, the first part of the first connection arrangement includes one or more deflectable latch members and the first part of the second connection arrangement includes internal threads.

In some examples, the plurality of deflectable latch arms are arranged on a curved surface.

In some examples, the air filter cartridge further includes an outer shell extending between a pair of end covers defining an interior volume, wherein the air filtration media arrangement is disposed within the interior volume, wherein one or both of the pair of end covers defines one or more apertures for receiving unfiltered ambient air. In some examples, the air filter cartridge is exposed to the outdoors without the use of an outer shell and end covers having apertures. In such examples, an expanded metal liner may be provided at the exterior perimeter of the filter cartridge.

An air cleaner assembly can include an outlet tube, an air filter cartridge extending along a longitudinal axis and including an air filtration media separating the air inlet from the air outlet, and a first connection arrangement having a first part associated with one of the air filter cartridge and the outlet tube and having a second part associated with the other of the air filter cartridge and the outlet tube. In one aspect, the air filter cartridge is movable between a latched position and an unlatched position wherein, in the latched position, the first part being engaged with the second part and, in the unlatched position, the first part being disengaged with the second part. The air filter cartridge is movable from the latched position to the unlatched position and from the unlatched position to the latched position by moving the air filter cartridge in a first direction parallel to the longitudinal axis.

In some examples, the air filter cartridge includes a pair of end covers and an outer shell defining an interior volume within which the air filtration media is disposed. In some examples, one or both of the pair of end covers define one or more apertures for allowing unfiltered ambient air to enter the interior volume. In some examples, the air filter cartridge is exposed to the outdoors without the use of an outer shell and end covers having apertures. In such examples, an expanded metal liner may be provided at the exterior perimeter of the filter cartridge.

In some examples, the air cleaner further includes a biasing element that biases the filter cartridge in a second direction opposite the first direction.

In some examples, the biasing element is secured to the air filter cartridge.

In some examples, the air cleaner further includes a safety filter cartridge disposed within an interior volume of the air filter cartridge, wherein the biasing element acts against the safety filter cartridge to provide a biasing force against the air filter cartridge.

In some examples, the air cleaner further includes a tower disposed within an interior volume of the air filter cartridge, wherein the biasing element acts against the tower to provide a biasing force against the air filter cartridge.

In some examples, one of the first and second parts includes a deflectable latch arm and the other of the first and second parts includes a catch engaged with the deflectable latch arm.

In some examples, the deflectable latch arm includes a plurality of deflectable latch arms.

In some examples, the deflectable latch arm is integrally formed in a support tube of the air filter cartridge.

In some examples, one of the first and second parts includes a guide pin.

In some examples, the guide pin includes a plurality of guide pins.

In some examples, the guide pin is integrally formed in a support tube of the air filter cartridge.

In some examples, the first or second part includes a plurality of guide pins and a plurality of deflectable latch members.

In some examples, the catch is arranged on an outlet tube of the housing.

In some examples, the outlet tube is rotatable with respect to a housing body of the housing.

In some examples, the first or second part includes a channel structure for receiving the guide pin.

In some examples, the biasing element is located proximate a closed end of the air filter cartridge.

In some examples, the first or second part of the first connection arrangement is located proximate an open end of the air filter cartridge.

There is no specific requirement that an air cleaner assembly, component therefor, or feature thereof include all of the detail characterized herein, to obtain some advantage according to the present disclosure.

BRIEF DESCRIPTION OF THE DRAWINGS

FIG. 18 is a schematic cross-sectional view of the housing body shown in FIG. 14, taken along the line A-A in FIG. 16.

FIG. 23 is a schematic cross-sectional view of the outlet tube shown in FIG. 19, taken along the line A-A in FIG. 21.

FIG. 35 is a schematic side view of a support tower of the filter cartridge shown in FIG. 25.

FIG. 36 is a schematic cross-sectional view of the support tower shown in FIG. 35, taken along the line A-A in FIG. 35.

FIG. 42 is a schematic side view of the filter cartridge shown in FIG. 38.

FIG. 43 is a schematic cross-sectional view of the filter cartridge shown in FIG. 38, taken along the line A-A in FIG. 42.

FIG. 73 is a schematic view of the first connection arrangement of the air cleaner assembly shown in FIG. 1 illustrating an insertion path of the filter cartridge.

FIG. 74 is a schematic view of the first connection arrangement shown in FIG. 73 in an initial insertion position.

FIG. 75 is a schematic view of the first connection arrangement shown in FIG. 73 in an intermediate insertion position.

FIG. 76 is a schematic view of the first connection arrangement shown in FIG. 73 in a fully inserted position.

FIG. 77 is a schematic view of the first connection arrangement of the air cleaner assembly shown in FIG. 1 illustrating a removal path of the filter cartridge.

FIG. 78 is a schematic view of the first connection arrangement shown in FIG. 77 in an initial removal position.

FIG. 79 is a schematic view of the first connection arrangement shown in FIG. 77 in an intermediate removal position.

FIG. 80 is a schematic view of the first connection arrangement shown in FIG. 77 in a fully removed position.

FIG. 92 is a schematic perspective view of a variation of a third example of an air cleaner assembly having features in accordance with the present disclosure.

DETAILED DESCRIPTION

Figure 1:
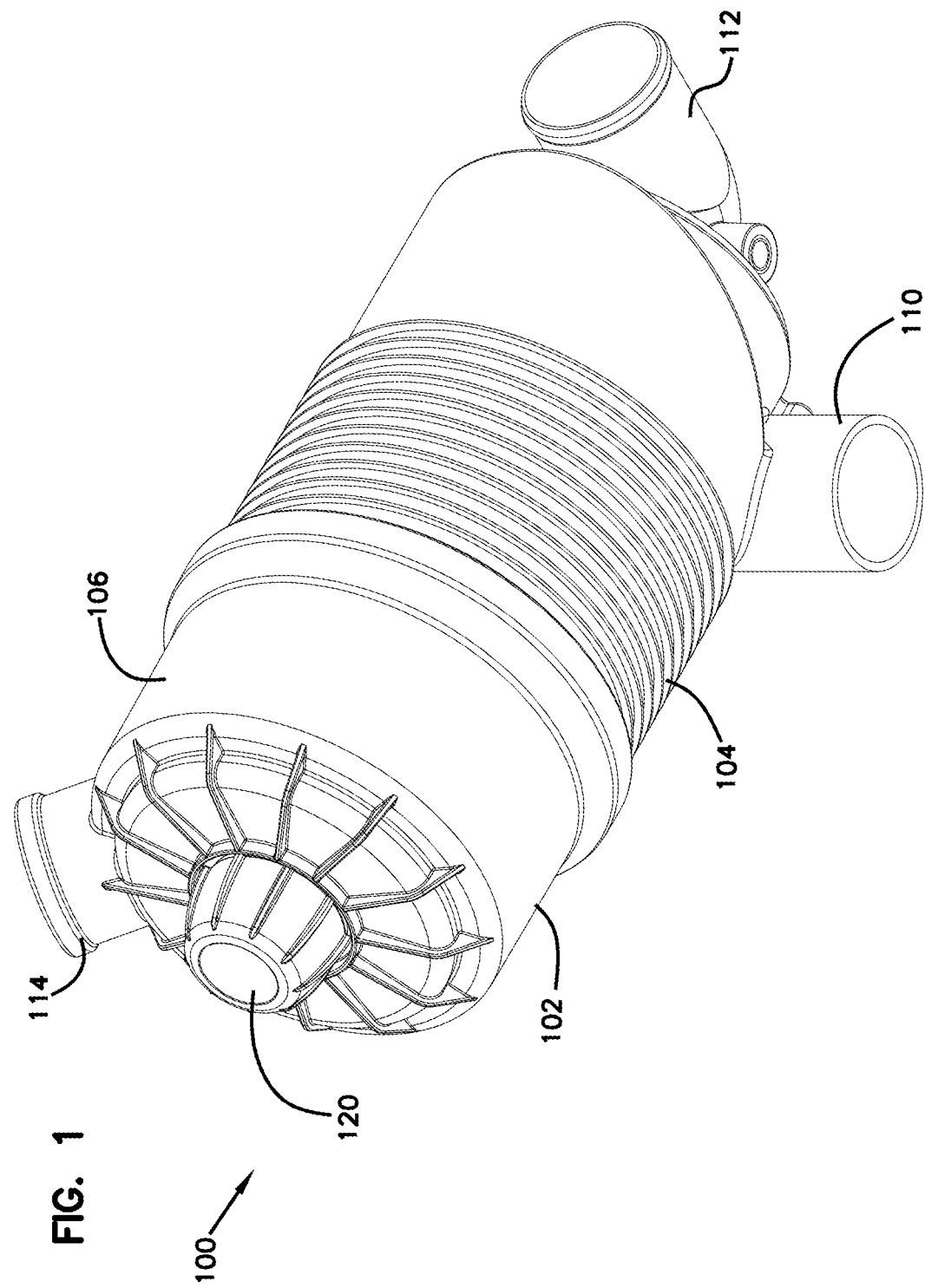
FIG. 1 is a schematic perspective view of an air cleaner assembly having features in accordance with the present disclosure.
Figure 2:
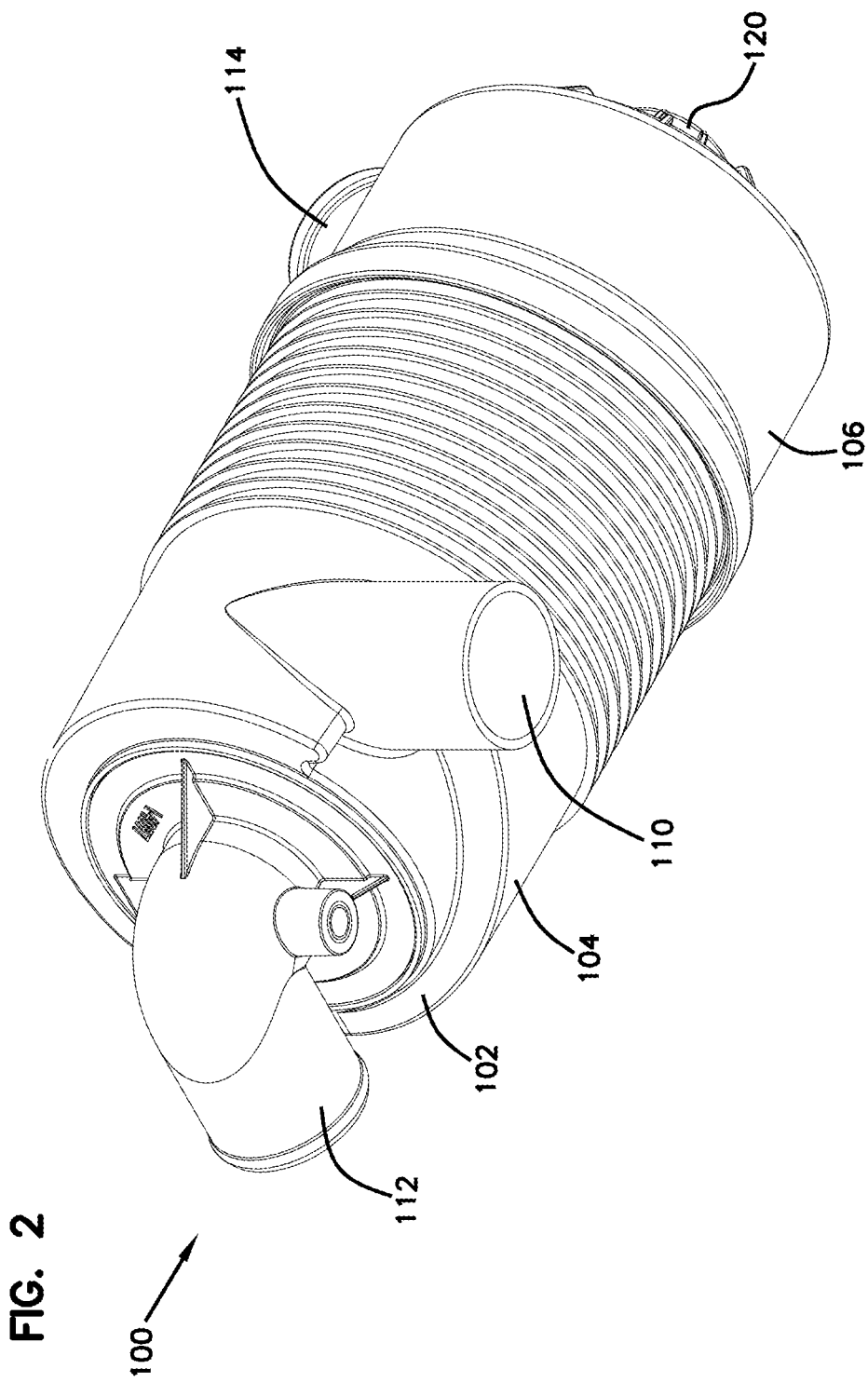
FIG. 2 is a schematic perspective view of the air cleaner assembly shown in FIG. 1.
Figure 3:
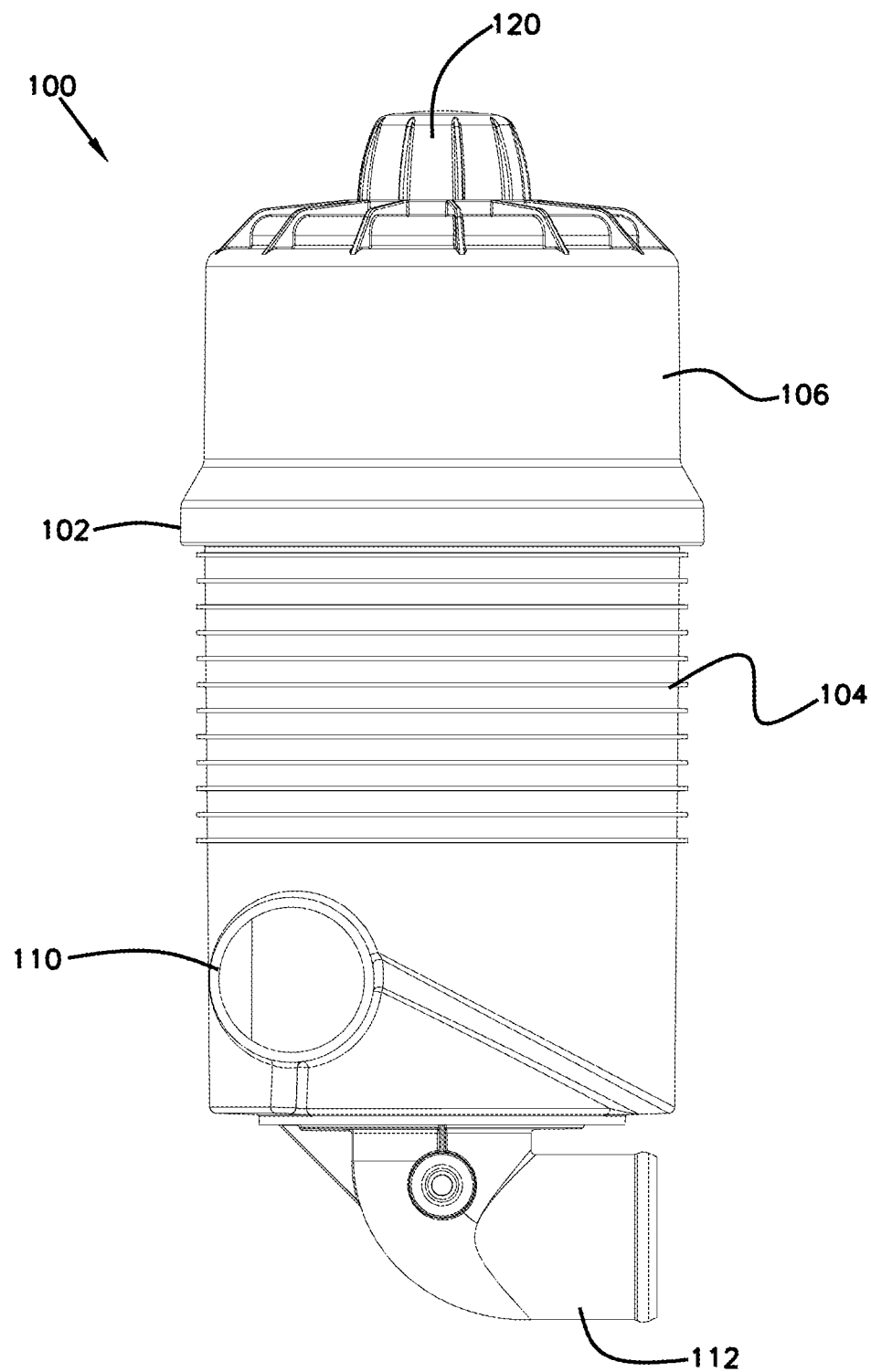
FIG. 3 is a schematic side view of the air cleaner assembly shown in FIG. 1.
Figure 4:
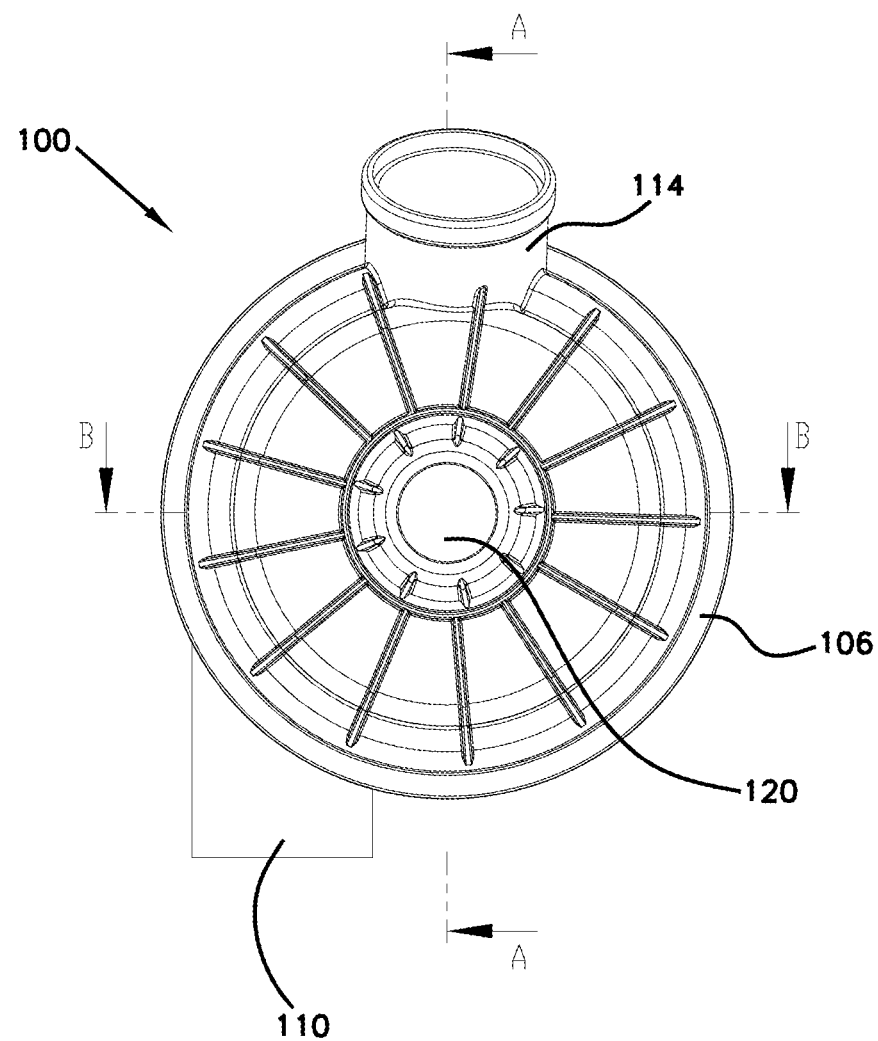
FIG. 4 is a schematic end view of the air cleaner assembly shown in FIG. 1.
Figure 5:
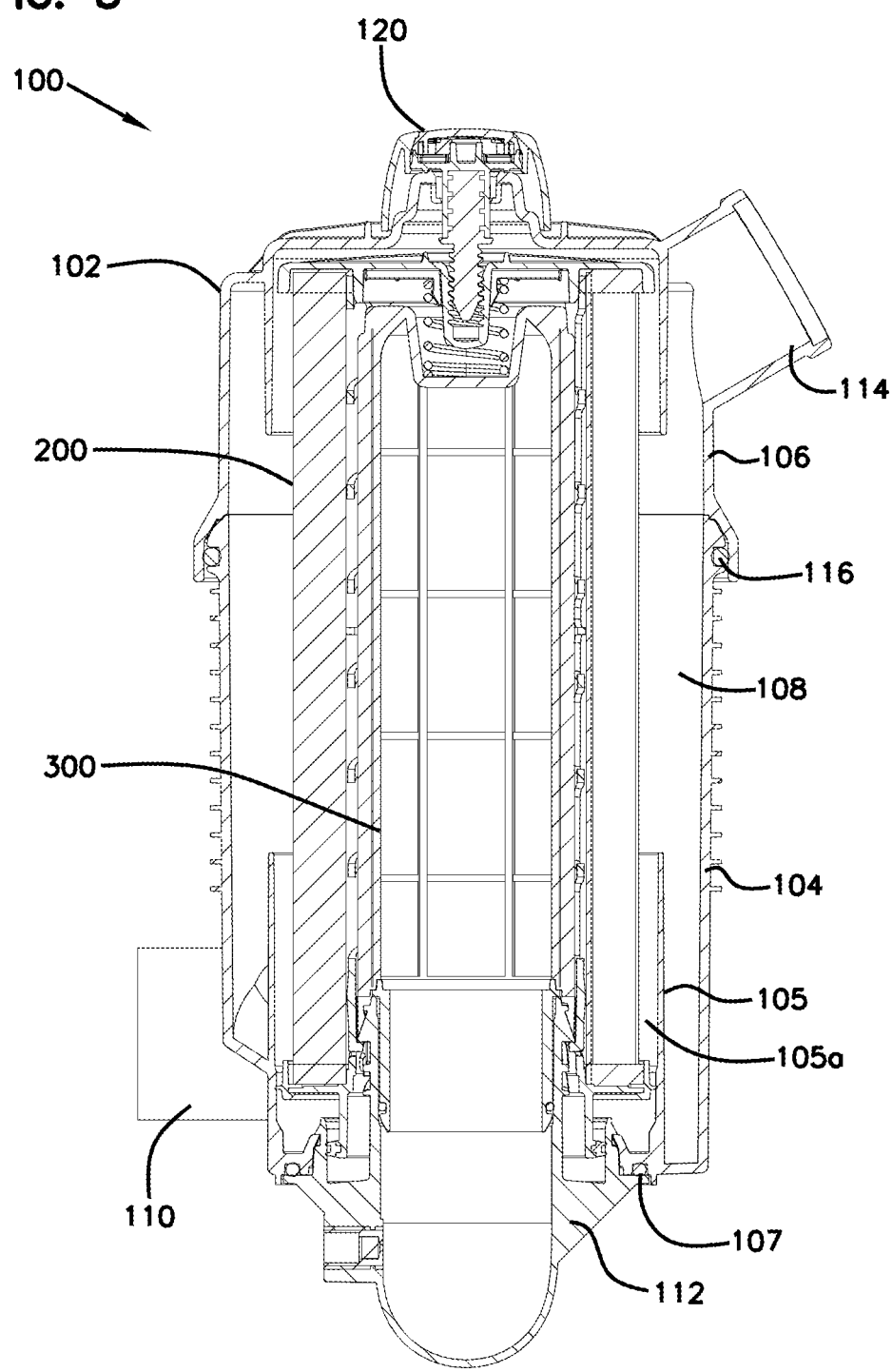
FIG. 5 is a schematic cross-sectional view of the air cleaner assembly shown in FIG. 1, taken along the line A-A in FIG. 4.
Figure 6:
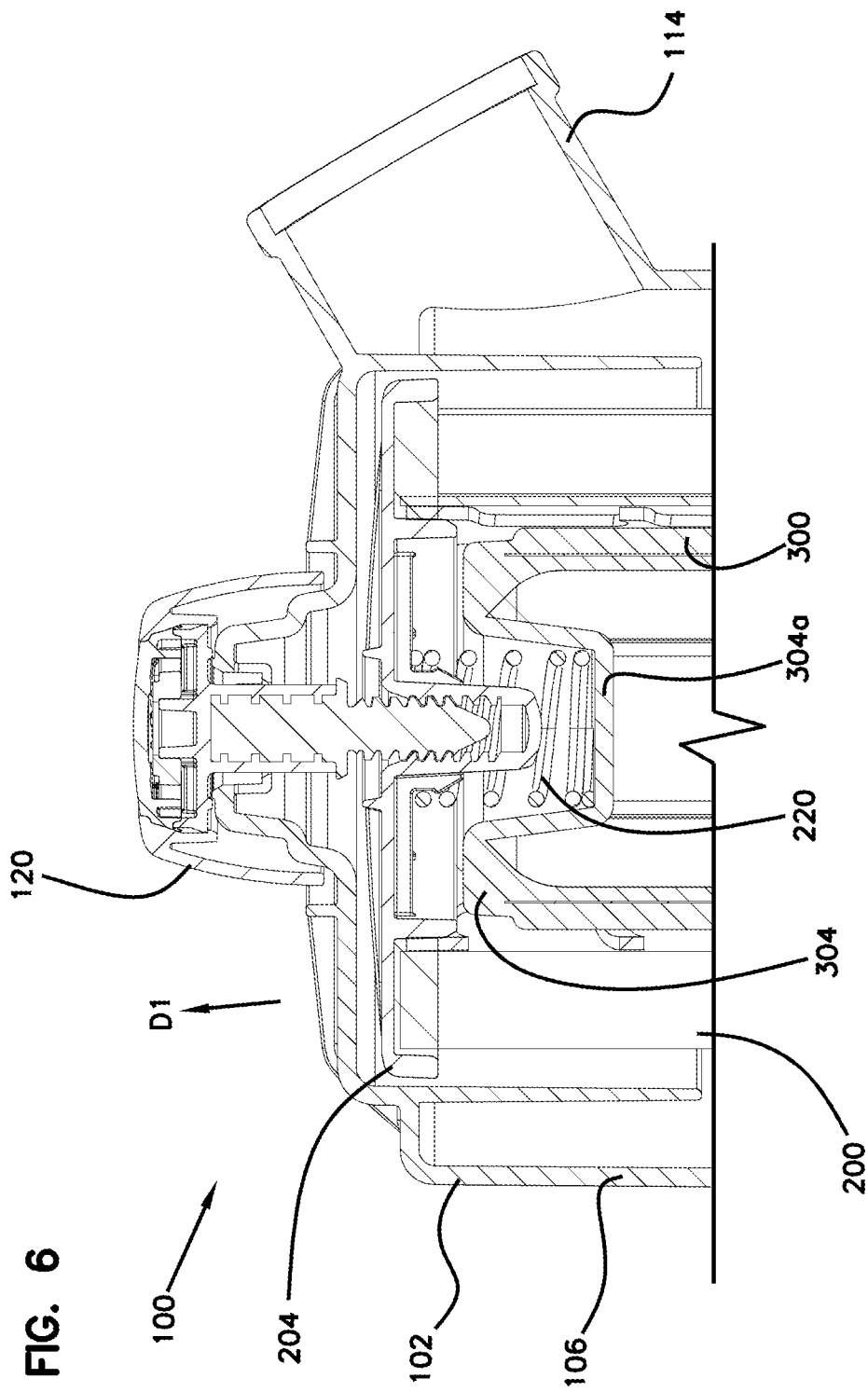
FIG. 6 is an enlarged portion of the view of the air cleaner assembly shown in FIG. 5.
Figure 7:
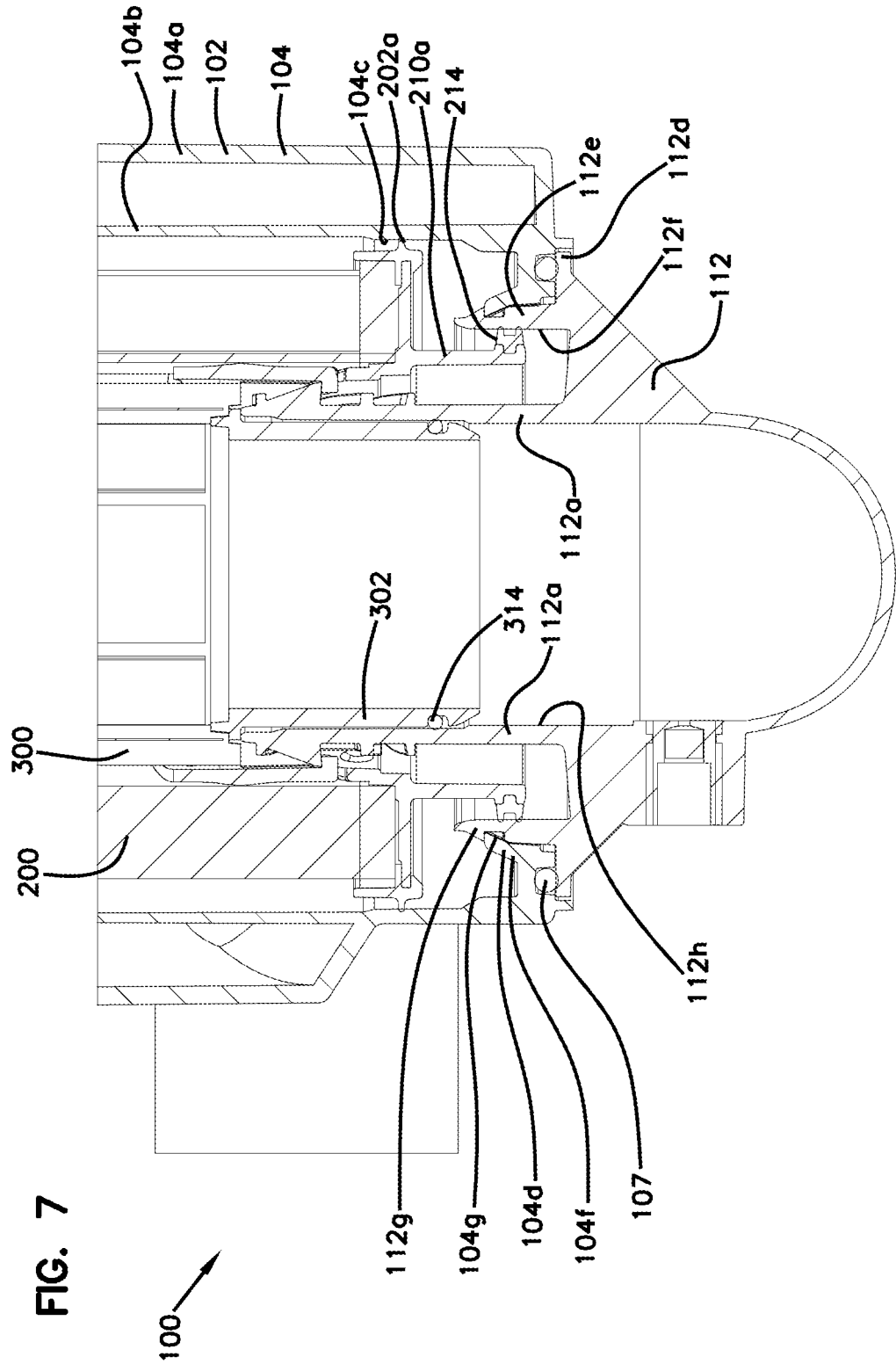
FIG. 7 is an enlarged portion of the view of the air cleaner assembly shown in FIG. 5.
Figure 9:
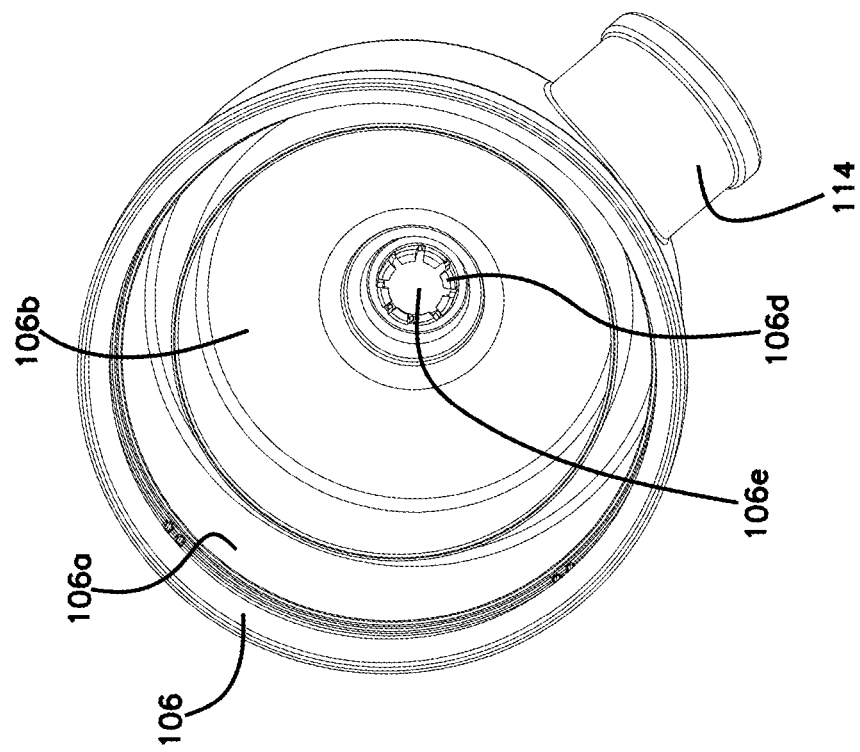
FIG. 9 is a schematic perspective view of the cover body shown in FIG. 8.
Figure 8:
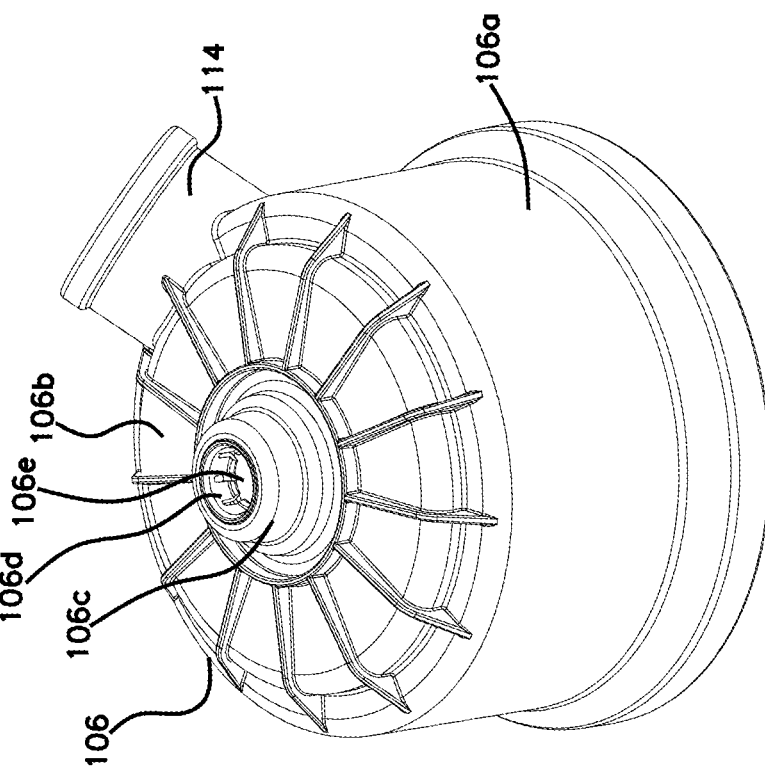
FIG. 8 is a schematic perspective view of a cover body of the air cleaner assembly shown in FIG. 1.
Figure 10:
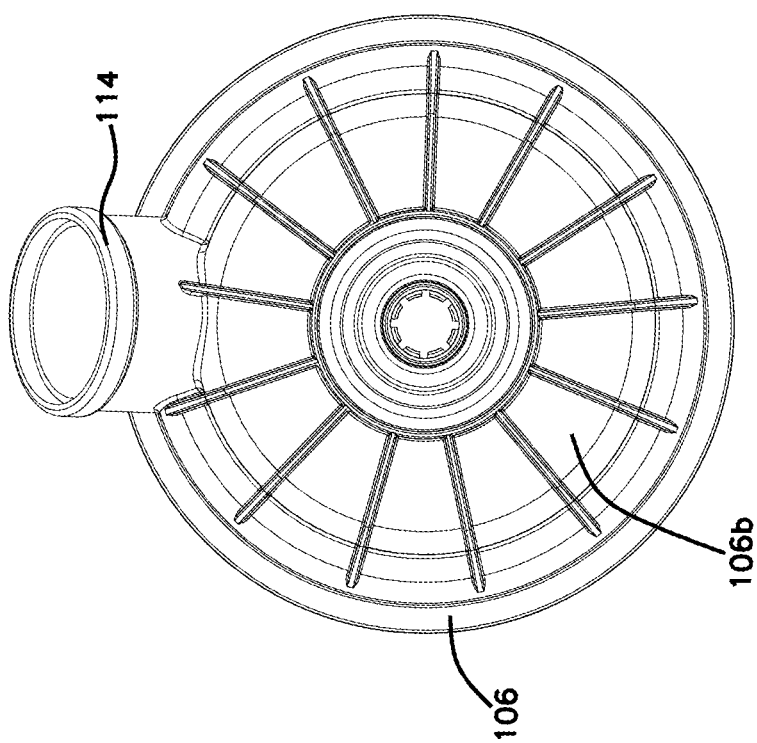
FIG. 10 is a schematic first end view of the cover body shown in FIG. 8.
Figure 11:
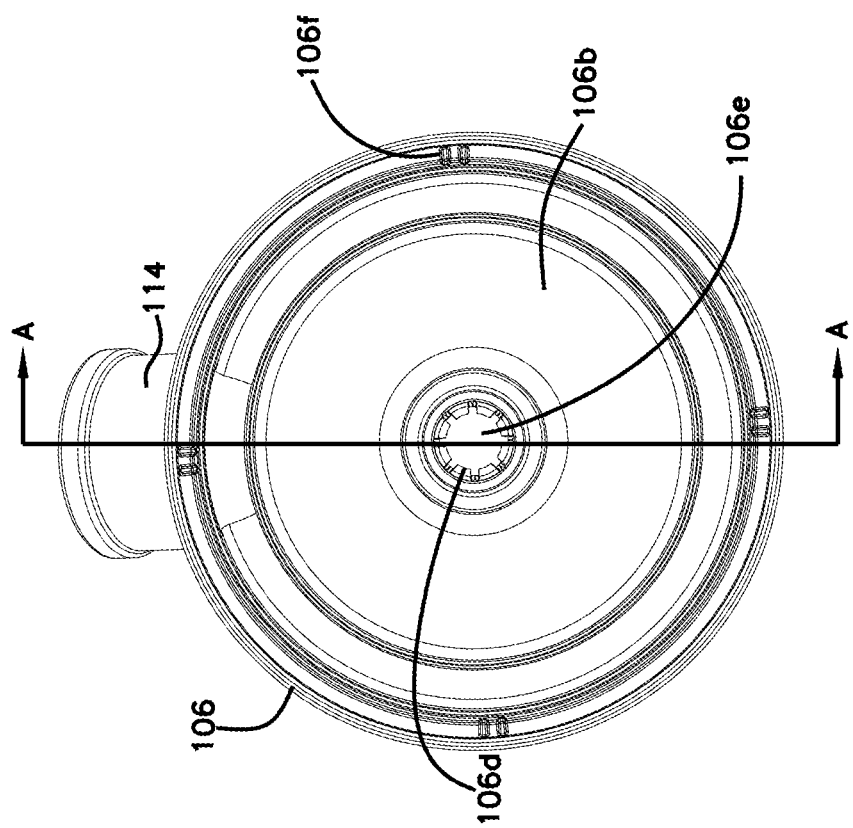
FIG. 11 is a schematic second end view of the cover body shown in FIG. 8.
Figure 13:
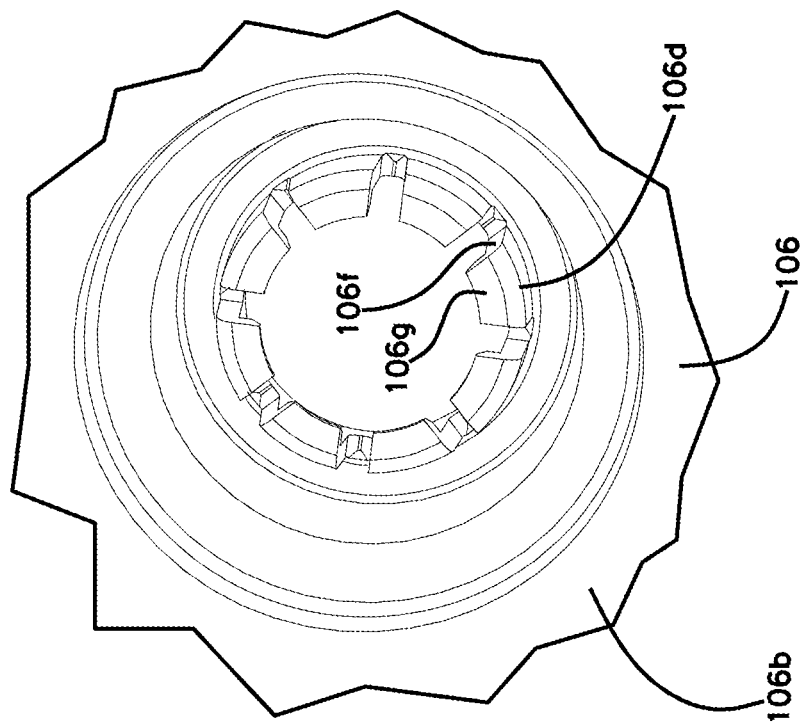
FIG. 13 is a schematic perspective partial view of the cover body shown in FIG. 8.
Figure 12:
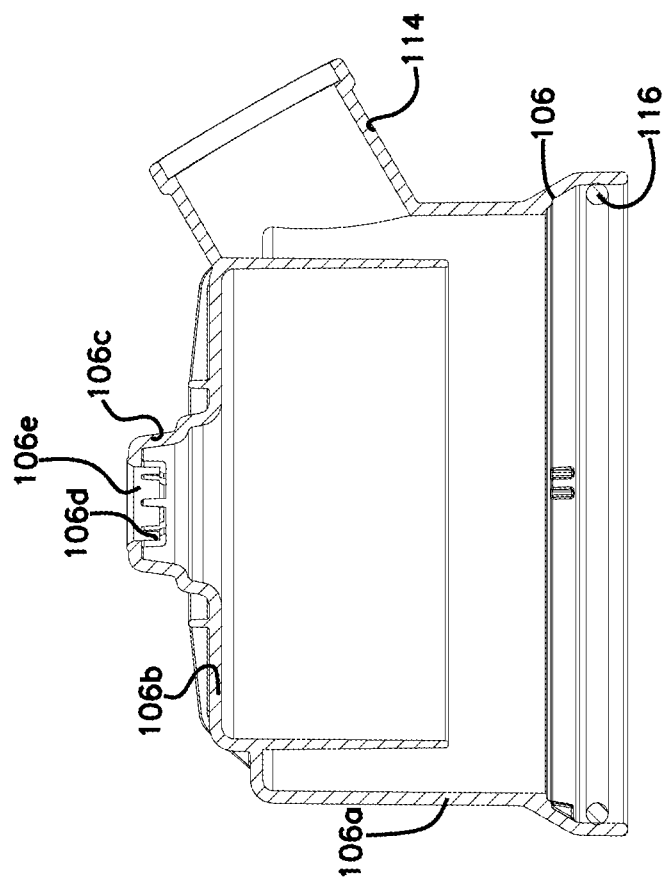
FIG. 12 is a schematic cross-sectional view of the cover body shown in FIG. 8, taken along the line A-A in FIG. 10.
Figure 14:
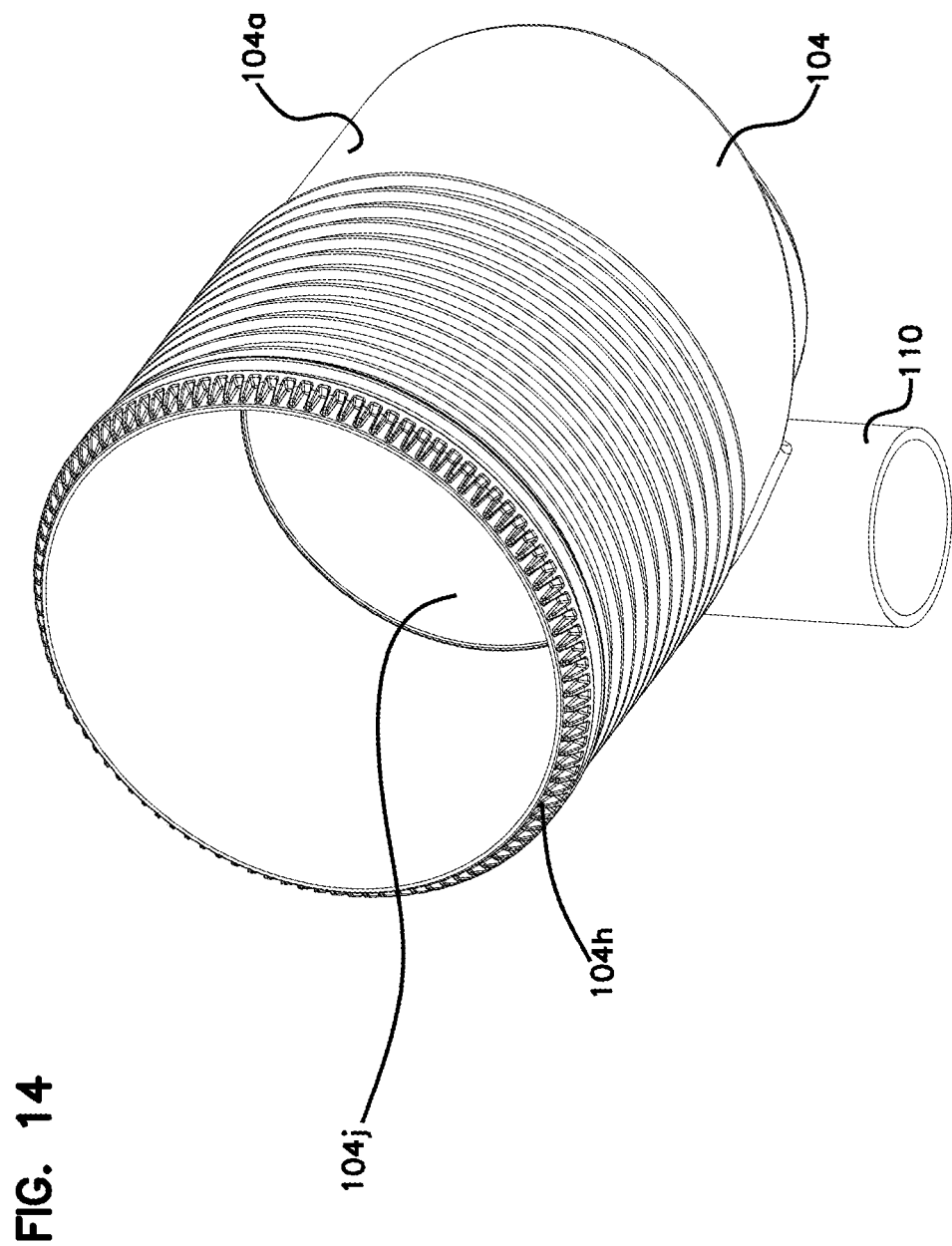
FIG. 14 is a schematic perspective view of a housing body of the air cleaner assembly shown in FIG. 1.
Figure 15:
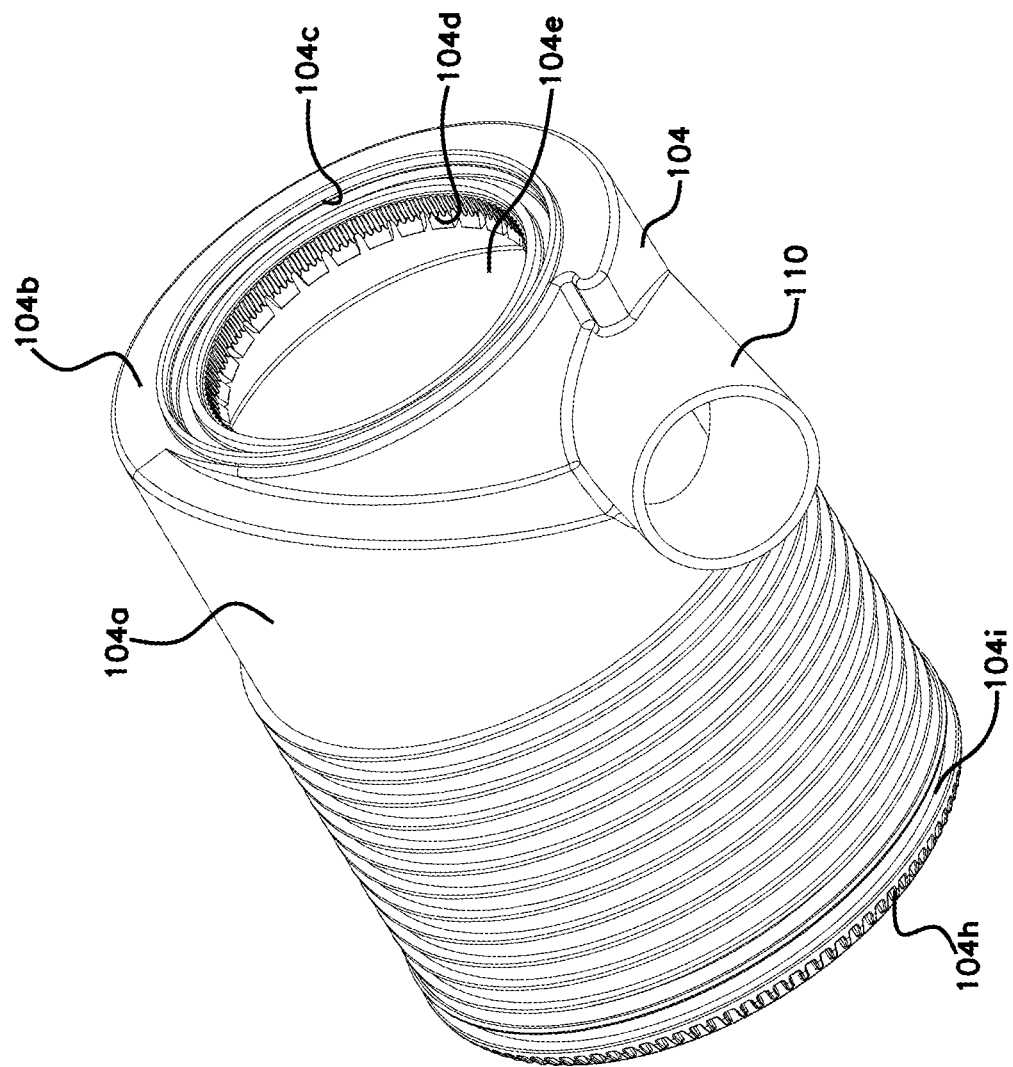
FIG. 15 is a schematic perspective view of the housing body shown in FIG. 14.
Figure 17:
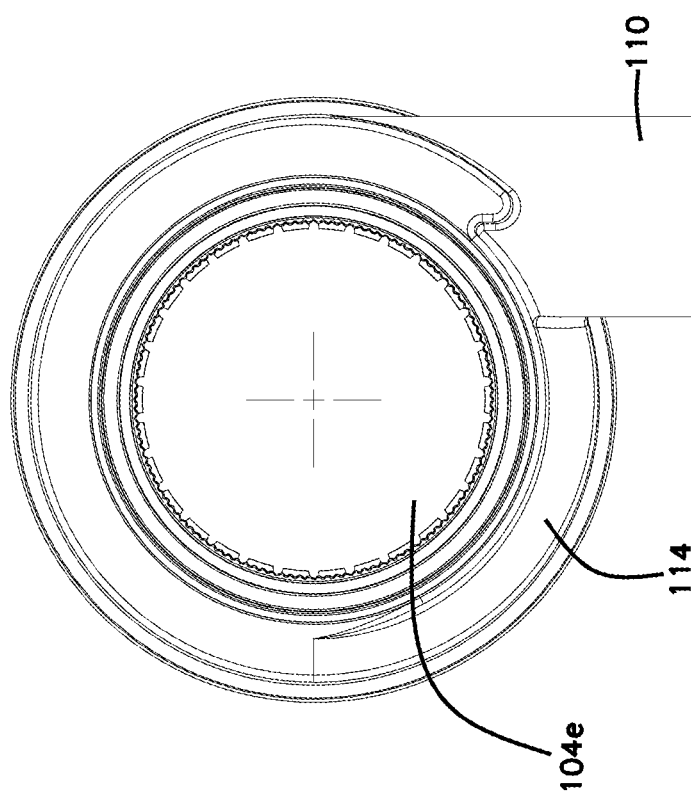
FIG. 17 is a schematic second end view of the housing body shown in FIG. 14.
Figure 16:
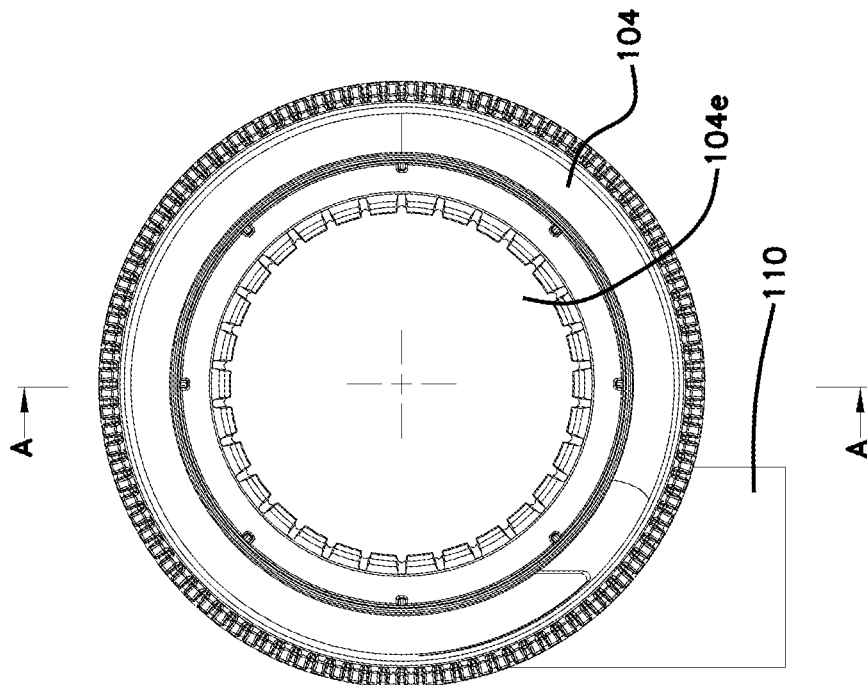
FIG. 16 is a schematic first end view of the housing body shown in FIG. 14.
Figure 19:
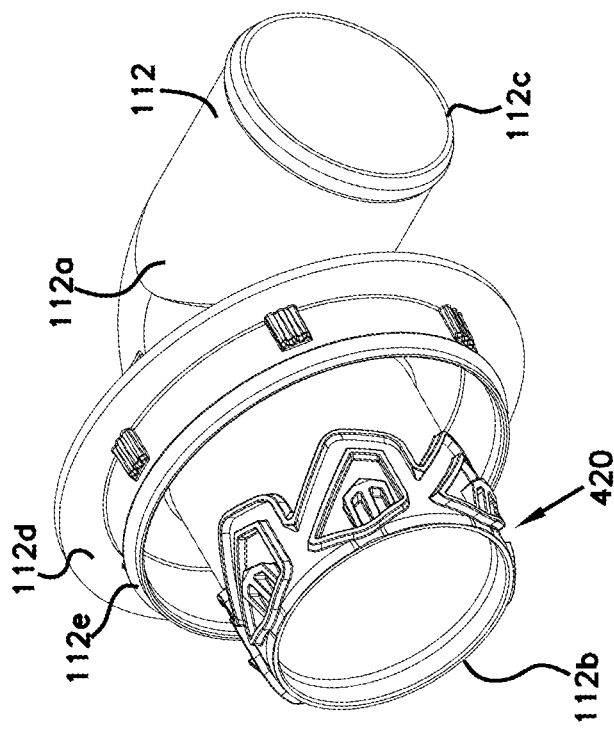
FIG. 19 is a schematic perspective view of an outlet tube of the air cleaner assembly shown in FIG. 1.
Figure 20:
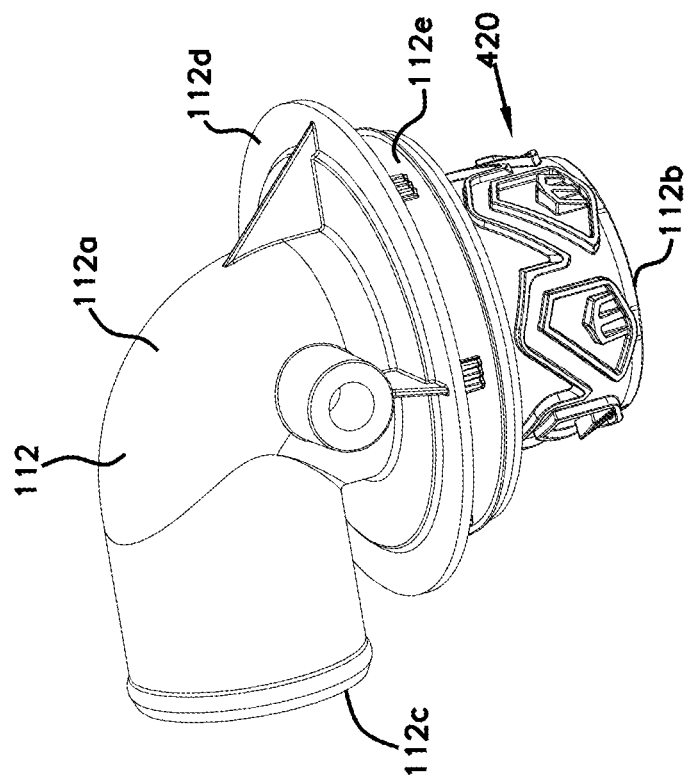
FIG. 20 is a schematic perspective view of the outlet tube shown in FIG. 19.
Figure 22:
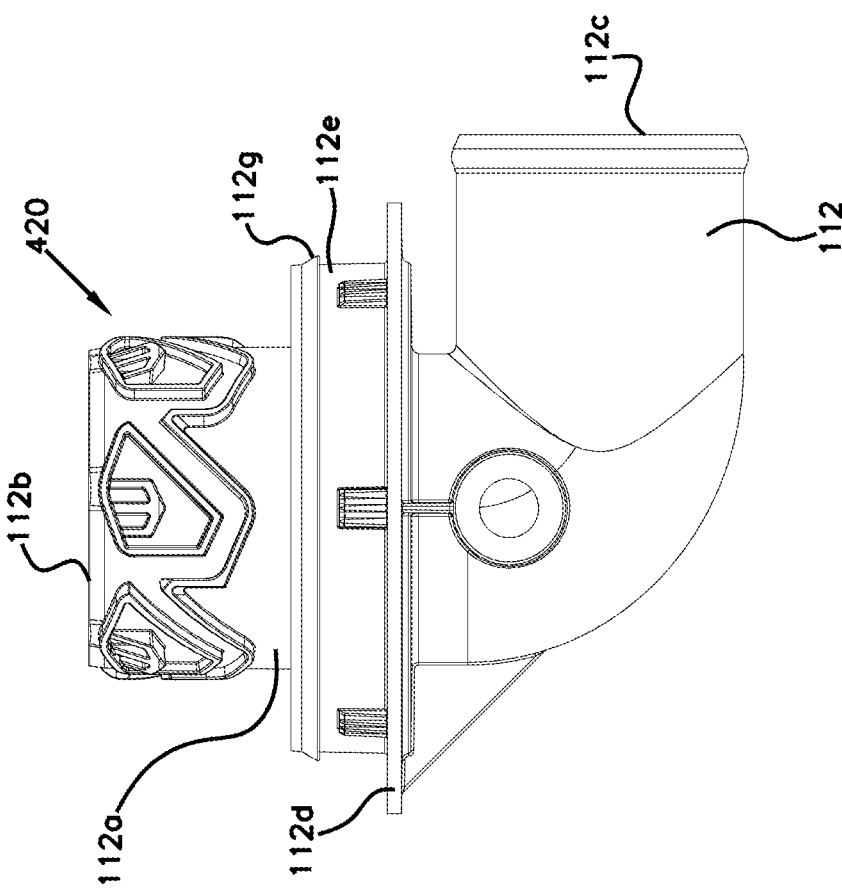
FIG. 22 is a schematic side view of the outlet tube shown in FIG. 19.
Figure 21:
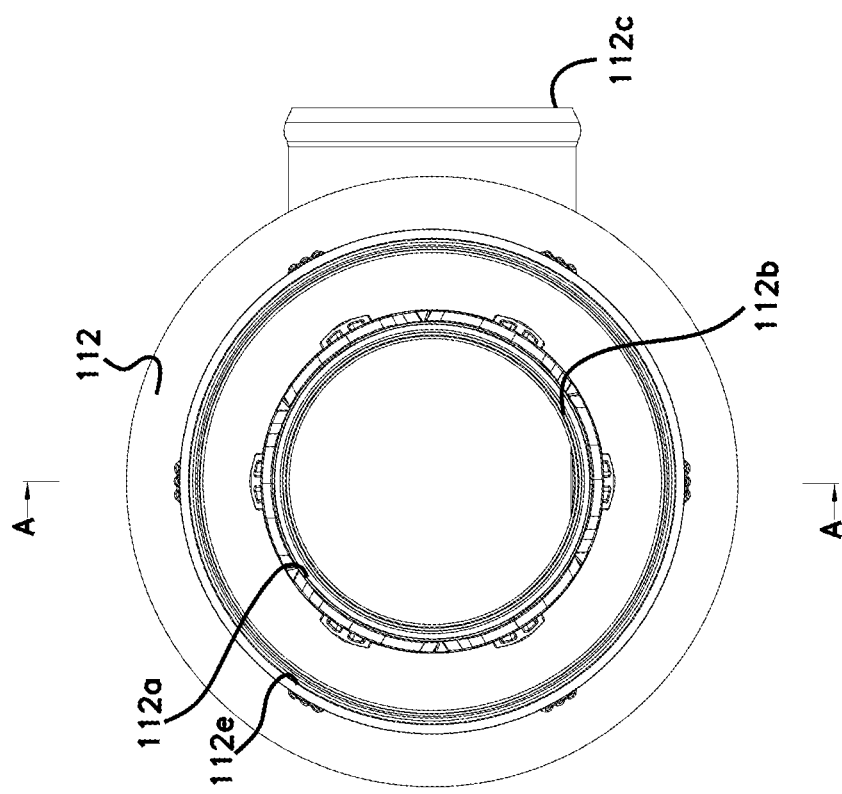
FIG. 21 is a schematic end view of the outlet tube shown in FIG. 19.
Figure 24:
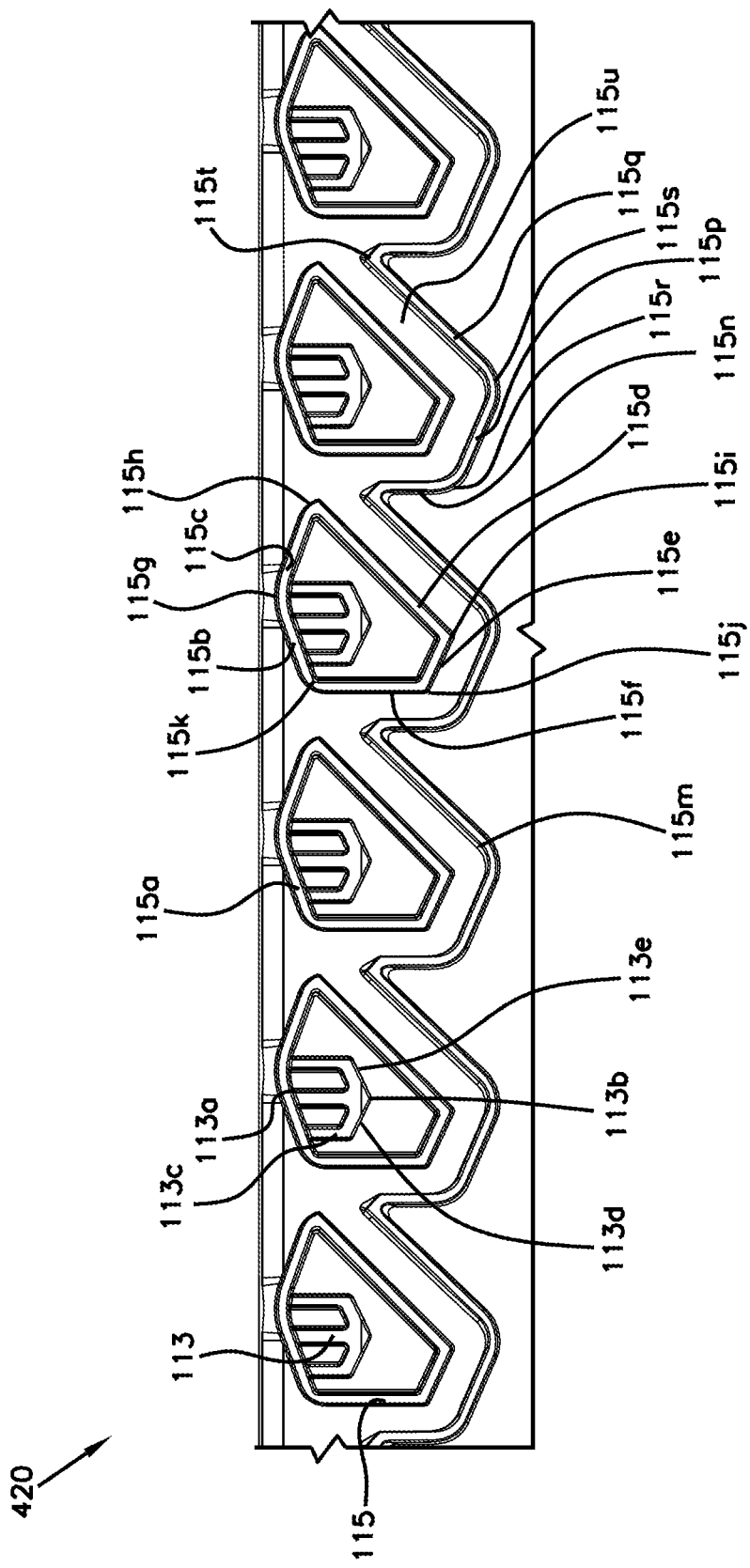
FIG. 24 is a flat schematic view of a second part of a first connection arrangement of the outlet tube shown in FIG. 19.
Figure 25:
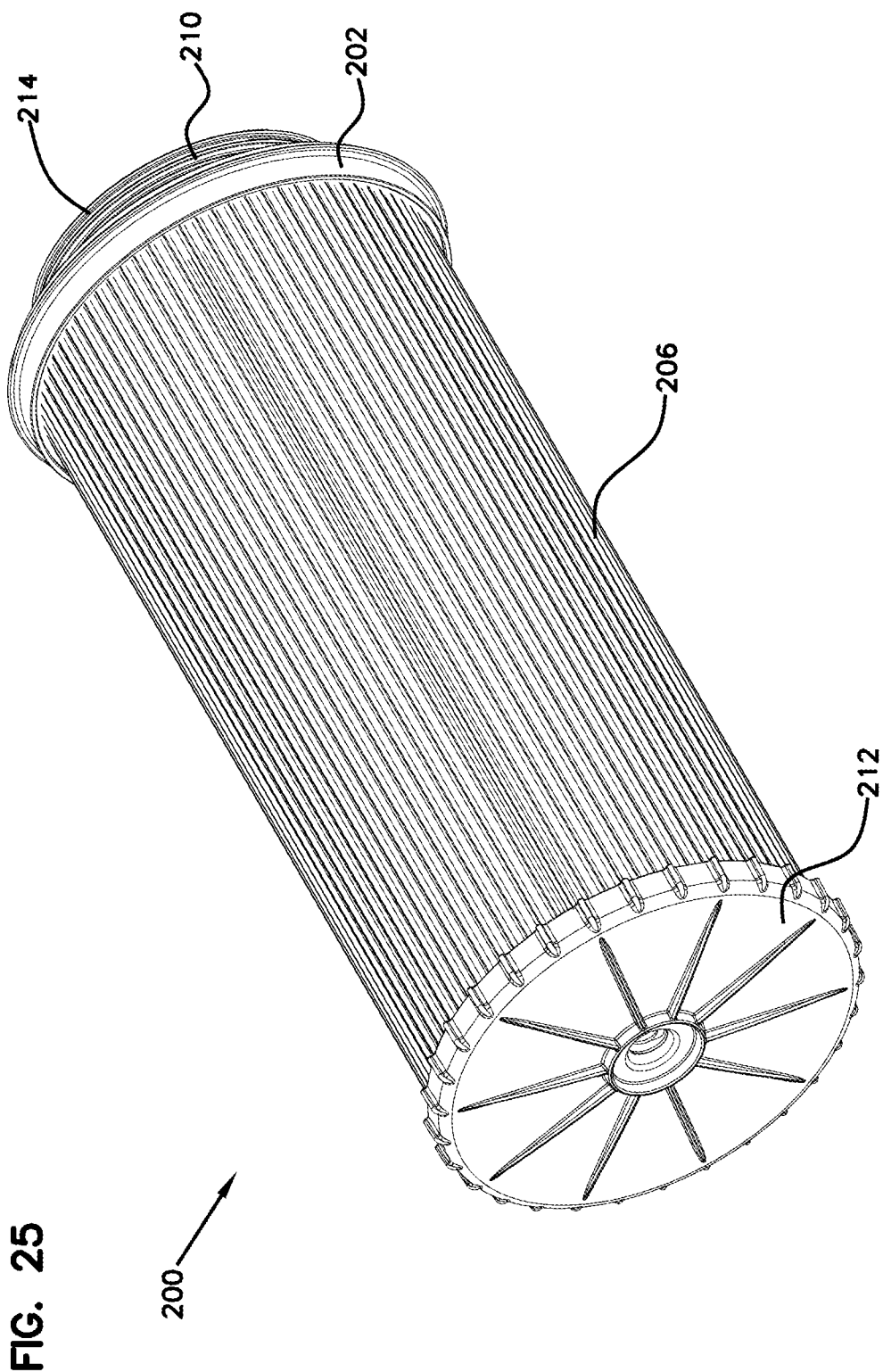
FIG. 25 is a schematic perspective view of a filter cartridge of the air cleaner assembly shown in FIG. 1.
Figure 26:
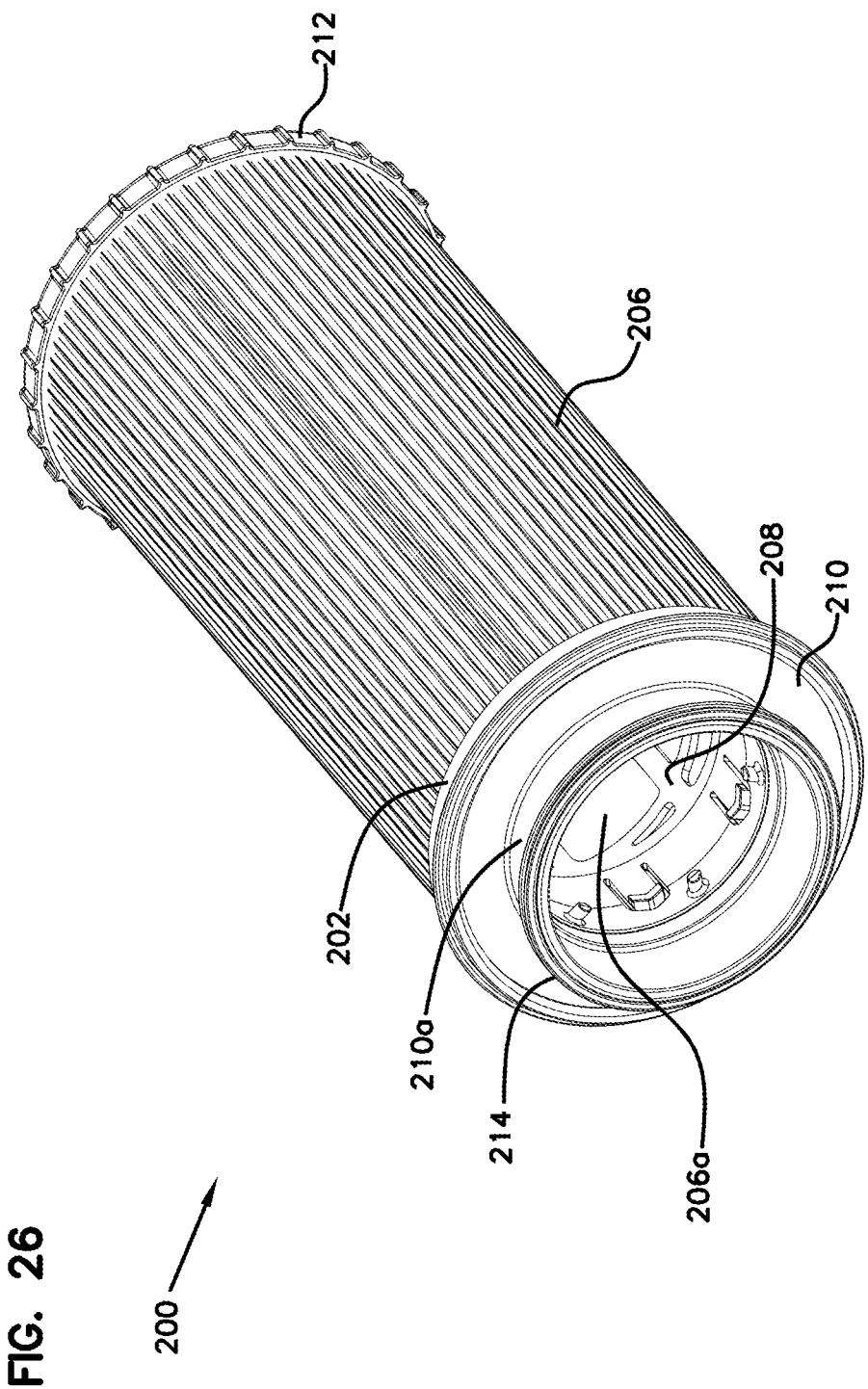
FIG. 26 is a schematic perspective view of the filter cartridge shown in FIG. 25.
Figure 27:
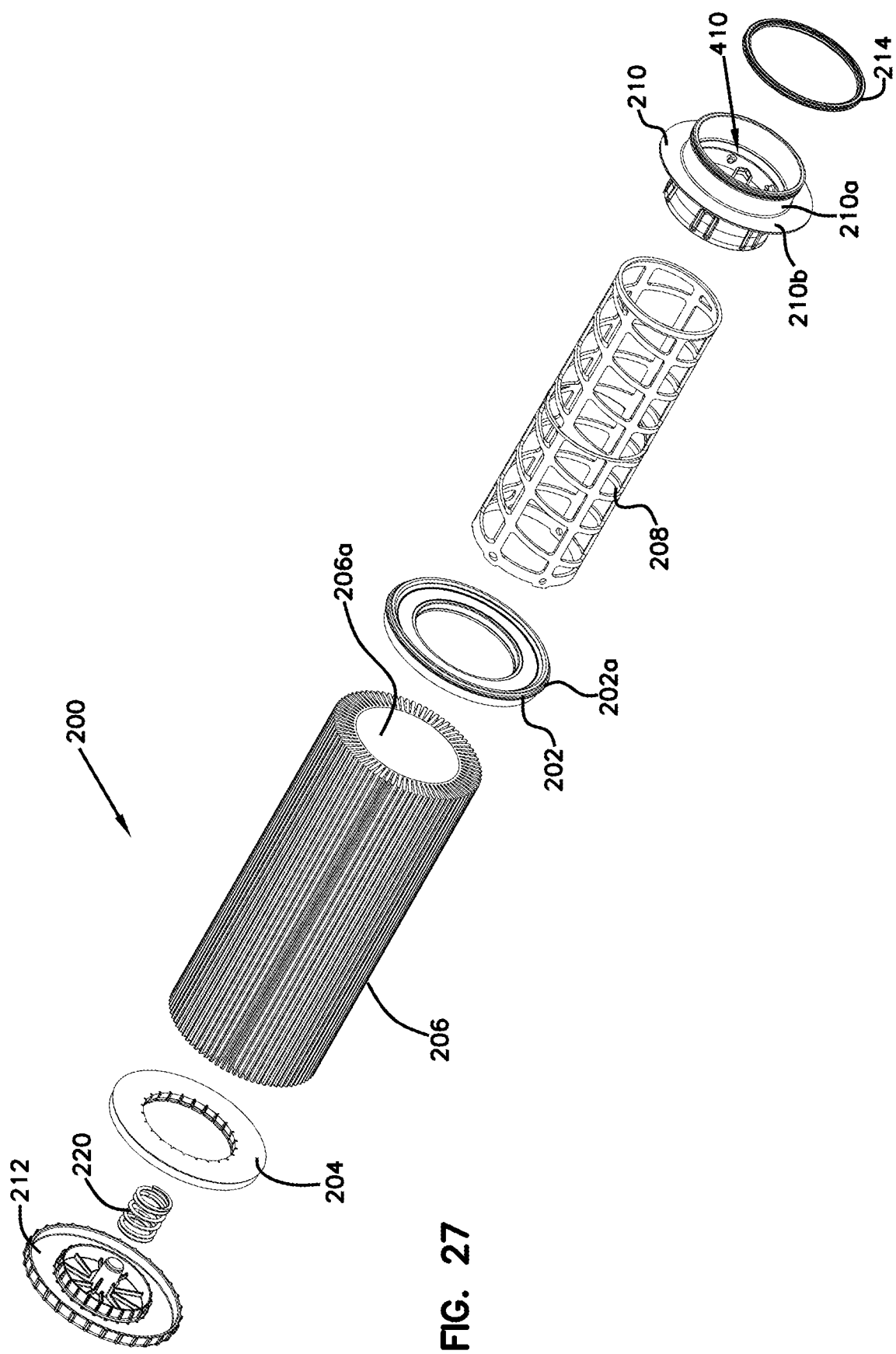
FIG. 27 is a schematic exploded perspective view of the filter cartridge shown in FIG. 25.
Figure 28:
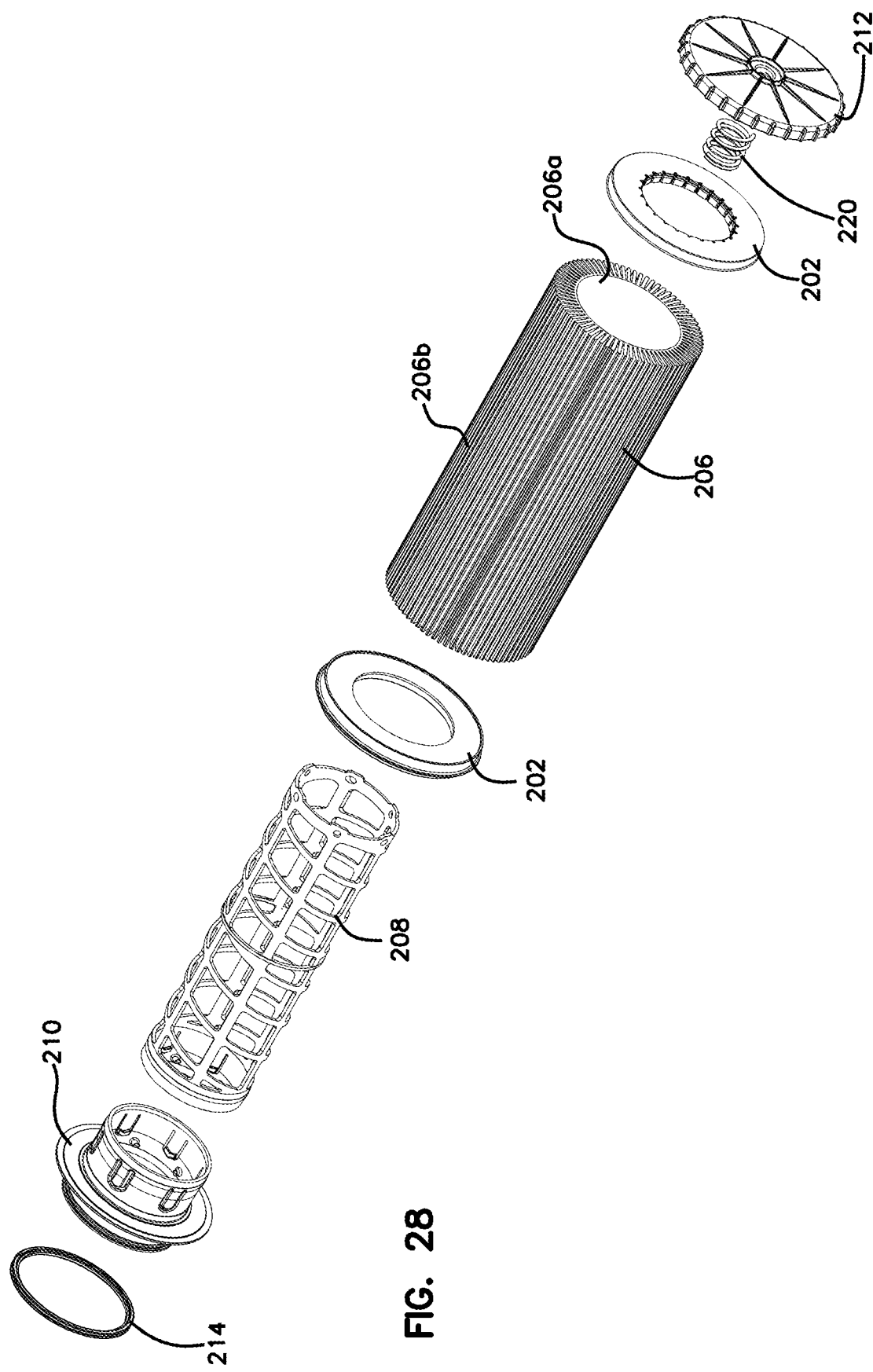
FIG. 28 is a schematic exploded perspective view of the filter cartridge shown in FIG. 25.
Figure 29:
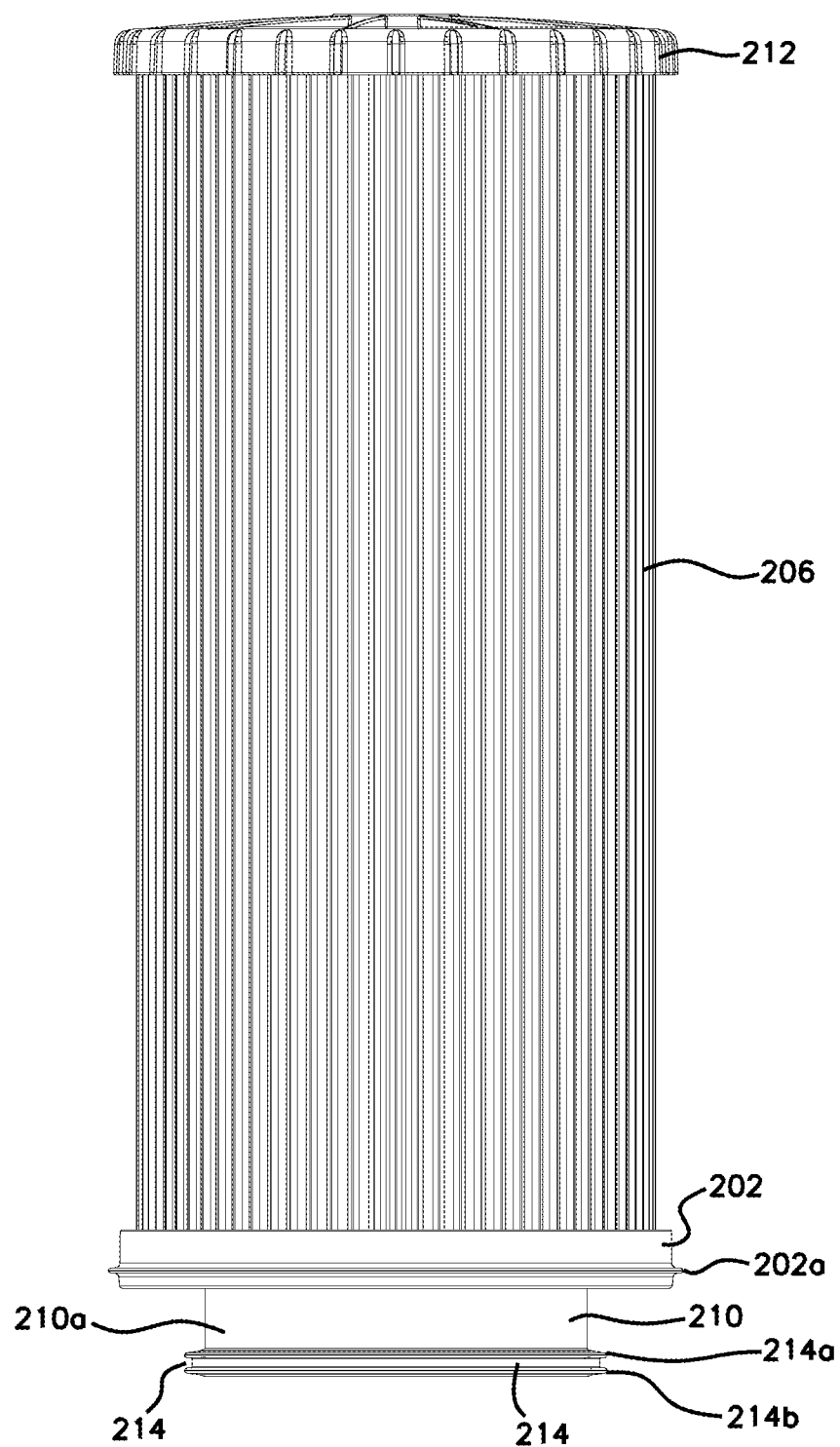
FIG. 29 is a schematic side view of the filter cartridge shown in FIG. 25.

Herein, an example filter assemblies, features and components therefor are described and depicted. A variety of specific features and components are characterized in detail. Many can be applied to provide advantage. There is no specific requirement that the various individual features and components be applied in an overall assembly with all of the features and characteristics described, however, in order to provide for some benefit in accord with the present disclosure.

Referring to FIGS. 1 to 7, an air cleaner assembly 100 is shown. In one aspect, the air cleaner assembly 100 includes a housing assembly 102 including a housing body 104 and a removable cover 106. When the cover 106 is attached to the housing body 104, the cover 106 and housing body 104 define an interior volume 108. In some examples, a weather seal member 116, for example an O-ring, can be provided between the housing body 104 and cover 106 to protect the interior volume 108 from ingress of contaminants. The air cleaner assembly 100 is also shown as including a filter cartridge 200 and a filter cartridge 300, both of which are disposed within the interior volume 108 of the air cleaner assembly 100. In the disclosed configuration, filter cartridge 200 is arranged as a primary filter cartridge 200 and filter cartridge 300 is arranged as a secondary filter cartridge 300 downstream of the primary filter cartridge 200. Other arrangements are possible. For example, a filter cartridge 200 could be provided without the use of a filter cartridge 300. In one aspect of the disclosure, the filter cartridge 200 is configured to secure the housing body 104 to the cover 106.

With reference to FIGS. 8 to 13, it can be seen that the cover 106 is provided with a sidewall 106a and an adjoining end wall 106b. A further sidewall 106c is shown as extending from the end wall 106b from which a plurality of circumferentially spaced latch members 106d extend to define a central aperture 106e. As is described later, the central aperture 106e receives a connection arrangement 120 associated with a second connection arrangement 440. The latch members 106d each include a deflectable arm portion 106f and an inwardly extending latch portion 106g extending from the deflectable arm portion 106f. The latch portions 106g of the latch members 106d engage with the connection arrangement 120 to secure the connection arrangement 120 to the cover while still allowing the connection arrangement 120 to be rotatable with respect to the cover 106. The cover 106 is also shown as including indexing members 106f such that the cover 106 can be indexed into a desired position relative to the housing body 104 by engagement with corresponding indexing features 104h on the housing body 104. In the example shown, four pairs of ribs forming the indexing members 106f are shown as being provided on the cover at every 90 degree location. More or fewer indexing members 106f may be provided.

With reference to FIGS. 14 to 18, the housing body 104 is shown in isolation. As presented, the housing body 104 of the air cleaner 100 is further shown as having a sidewall 104a and an adjoining end wall 104b. The end wall 104b is provided with a groove or channel structure 104c and a plurality of circumferentially arranged latch members 104d that define a central opening 104c. The latch members 104d each have a deflectable arm 104f and an inwardly extending latch portion 104g for engaging with a flange 112g of an outlet 112 of the air cleaner assembly 100. As mentioned previously, the housing body 104 is provided with a plurality of circumferentially arranged indexing features 104h on the sidewall 104a at the end opposite the end wall 104b. The indexing features 104h are provided such that the cover 106 can be positioned with respect to the housing body 104 in rotational increments of 5 degrees or less. The housing body sidewall 104a is also shown as having a groove or channel structure 104i for receiving the seal member 116. The housing body 104 is also provided with an interior sidewall member 104j that is inwardly spaced form the outer wall 104a. The interior sidewall member 104j functions to aid in the separation of particular matter entering through an air inlet 110 in the sidewall 104a that is ultimately delivered to a dust ejector port at an outlet 114. As is described later, the sidewall member 104j also provides a sealing surface for the filter cartridge 200. In the embodiment shown, the air outlet 112 is integrally formed with the housing body 104, but may be separately formed.

With reference to FIGS. 19 to 24 the air outlet 112 of the air cleaner assembly is shown in isolation. The air outlet 112 is connected to and rotatable with respect to the housing body 104, as described previously. The outlet 112 could also be connected to the housing body 104 in a fixed relationship or could be integrally formed with the housing body 104. As presented, the outlet 112 is defined by a tubular sidewall 112a extending from an inlet end 112b to an outlet end 112c. In the embodiment shown, the sidewall 112a is provided with a 90 degree bend to form an elbow-shape. However, the sidewall 112a may be provided with a generally straight profile or another profile. In one aspect, the sidewall 112a presents an inwardly facing surface 112g against which a seal member of the filter cartridge 300 can form a seal. Although the terms "inlet" and "outlet" are used in the present disclosure to describe various features of the air cleaner and air filter cartridge, it should be understood that the airflow through the air cleaner and/or the air filter cartridge could be reversed such that the referenced inlet could be outlets and the referenced outlets could be inlets without departing from the concepts presented herein.

The outlet 112 is also provided with a flange 112d extending from the sidewall 112a. The flange 112d is arranged and sized such that the flange 112d covers the central opening 104c defined in the end wall 104b of the housing body 104. As most easily seen at FIG. 7, the flange 112b also abuts a weather seal 107 disposed in the channel structure 104c of the housing body 104 such that a weathertight seal is formed between the housing 104 and the outlet 112. The outlet 112 is further shown as including an outer sidewall 112e extending from the flange 112d in a direction towards the inlet end 112b and generally parallel to the sidewall 112a. As mentioned previously, the sidewall 112e includes a flange 112g having a ramped profile that forms a snap-fit type connection with the latch members 104d of the housing body 104 that secures the outlet 112 to the housing body 104 while allowing for the outlet 112 to be rotatable with respect to the housing body 104. It is noted that where a rotatable outlet is not desired, the outlet 112 can be integrally formed with the housing body 104.

As discussed in a later section, the outlet 112 is provided with a second portion 420 of a first connection arrangement 400 that cooperatively operates with a first portion 410 of the first connection arrangement 400 provided on the filter cartridge 200 to secure the filter cartridge 200 to the outlet 112. As also is discussed in a later section, the connector assembly 120 and filter cartridge 200 are respectively provided with first and second portions 450, 460 of a second connection arrangement 440 that cooperatively operate to secure the filter cartridge 200 to the cover 106. Once secured, the connector assembly 120 places the filter cartridge 200 in tension against the first connection arrangement 400 to more securely retain the filter cartridge 200. This tensile force also operates to secure the cover 106 to the housing body 104.

In operation, with the cover 106 attached to the housing body 104, unfiltered air flows into the air inlet 110 and passes through the media 206 from the exterior side of the main filter cartridge 200 to the interior side. The air then flows through the media 306 of the secondary filter cartridge 300 from the exterior side to the interior, where the fully filtered air then passes through the outlet 112 and to connected equipment, such as the air intake system of an internal combustion engine. As mentioned previously, the cover 106 can be provided with a dust ejection port 114 to discharge accumulated particulates from the interior volume 108 of the housing assembly 102. Also, and as mentioned previously, the airflow through these components could be reversed without departing from the concepts presented herein.

Filter Cartridge 200

Referring to FIGS. 25 to 37, the filter cartridge 200 includes a first end cap 202 and a second end cap 204, between which filter media 206 extends. In one example, the end caps 202, 204 are formed from a molded polymeric material. A support tube 208, which may formed from a plastic or metal material, is provided at an interior side 206a of the media 206 to support the media 206.

As shown, filter media 206 is pleated media arranged into a tubular, cylindrical shape defining an interior 206a and an exterior side 206b. The selection of the media and media form is a matter of choice for efficiency and usage lifetime concerns. Other configurations for the filter cartridge 200 are possible without departing from the concepts presented herein. The filter media 206 can be either pleated or non-pleated and can include synthetic or organic fibers, such as cellulosic fibers. The media 206 can be configured in a cylindrical pattern as shown, if desired, although alternatives are possible. For example, the media 206 can be somewhat conical in extension between the opposite ends. Also, the media 206 can be configured with non-circular inner and/or outer perimeters; for example oval or other cross-sectional configurations are possible. Where the media 206 is pleated, the media 206 can include corrugations extending generally perpendicularly to the pleat tips, to facilitate keeping the pleats open during use. Various pleat tip folding techniques can be used to facilitate this, as are common in the art. Examples of this can be found in media packs with the mark "PleatLoc" from Donaldson Company, Inc, of Minneapolis, Minn., the Assignee of the present disclosure. The media 206 may also include hot melt media tip spacers or other media spacers, if desired. Example primary filter cartridge media and end cap types and configurations with features usable with the air filter cartridge 100 disclosed herein is fully shown and described in U.S. Pat. No. 8,864,866, issued on Oct. 21, 2014, the entirety of which is incorporated by reference herein. Filter media 206 may also be fluted media or z-type media.

As an alternative to pleated media, the media 206 can include fluted filter media, such as a z-filter construction. The term "z-filter construction" as used herein, is meant to refer to a type of filter construction in which individual ones of corrugated, folded or otherwise formed filter flutes are used to define sets of longitudinal, typically parallel, inlet and outlet filter flutes for fluid flow through the media; the fluid flowing along the length of the flutes between opposite inlet and outlet flow ends (or flow faces) of the media. Some examples of filter media are provided in U.S. Pat. Nos. 5,820,646; 5,772,883; 5,902,364; 5,792,247; 5,895,574; 6,210,469; 6,190,432; 6,350,296; 6,179,890; 6,235,195; D399,944; D428,128; D396,098; D398,046; and D437,401, each of which is incorporated herein by reference.

In the example shown, an end cover 210 is provided at the first end cap 202 while an end cover 212 is provided at the second end cap 204. In one example, the end cover 210 is integrally formed with the support tube 208. In one example, the end cover 210 is a separately formed component from the support tube 208 and can be then secured to the end cap 202 and/or the support tube 208. In one example, the end cap 202 is molded onto the end cover 210 and support tube 208 such that the cured end cap material secures the end cover 210 to the support tube 208. The end cover 210 can be provided at the end cap 204 and secured to the support tube 208, wherein the end cover 210 can be directly secured to the support tube 208 or can be secured to the support tube 208 via the end cap material being molded onto the end cover 210 and support tube 208. The end cover 210 could also be integrally formed with the support tube 208 as well.

In one aspect, the end cover 210 includes a flange portion 210b extending radially outward from the cylindrical sidewall 210a of the end cover 210 and abutting a cylindrical sidewall 208a of the support tube 208. The cylindrical sidewall 208a is shown as including radially raised segments 208b, 208c that create a gap 206c between the inner surface 206a of the filter media 206 and the sidewall 208a. This gap 206c operates to provide clearance for the operation of the deflectable latch arms 216 such that they can deflect radially outward without undue interference or resistance from the filter media 206.

In one aspect, a seal member 214 is disposed about the flange portion 210b. The seal member 214 is shown as being a lip or wiper type seal having individual radially extending seal members 214a that deflect or bend to form an outwardly directed radial seal against a surface of the housing assembly 102. In the particular example shown, the seal member 214 forms an outwardly directed radial seal against an interior or inwardly facing surface 112g of a circumferential sidewall member 112a of the outlet 112, as most easily seen at FIG. 7. Accordingly, it should be appreciated that the outside diameter of the sidewall 210a of the end cover 210 is smaller than the inside diameter of the sidewall member 112a of the outlet 112 and that the outside diameter of the seal member 214 is greater than the inside diameter of the inner surface 112h. In one aspect, the seal member 214 can molded onto the sidewall 210a, for example by injection molding a TPE (thermoplastic elastomer) material onto the sidewall 210.

The end cap 202 is also shown as being provided with a radial seal member 202a. In the embodiment shown, the radial seal member 202a is integrally formed with the end cap 202 such that a singular component is formed. In the particular example shown, the seal member 202a forms an outwardly directed radial seal against an interior or inwardly facing surface 104c of the circumferential sidewall member 104j of the housing body 104, as most easily seen at FIG. 7. Accordingly, it should be appreciated that the outside diameter of the seal member 202a is greater than the inside diameter of the inwardly facing surface 104c of the sidewall member 104j.

In one example, the seal member 202 is separately formed and is later installed onto the flange portion 210b, such as by elastically deforming (i.e. stretching) the seal member 202 onto the flange portion 210b. Once installed, a sidewall 202b of the seal member 202 cooperatively forms a liquid-tight dammed area 202c with the cylindrical sidewall 208a and the radial flange 210b which can retain a fluid potting material 206d until the potting material 206d cures. As such, the filter cartridge 200 can be assembled by first installing the seal member 202 onto the flange portion 210b, filling the dammed area 202c with the potting material 206d, and then installing the filter media 206 over the support tube 208 until an end of the filter media 206 abuts the flange portion 210b. Once the potting material 206d cures, the potting material 206d effectively seals the end of the filter media 206 and retains the filter media 206 onto the support tube 208.

In one aspect, the filter cartridge 200 can be removably secured to the housing body 104 via a first connection arrangement 400 in which a first part 410 of the first connection arrangement 400 is provided on the filter cartridge 200 and a second part 420 of the first connection arrangement 400 is provided on the housing assembly 102. In the example shown, the first part 410 is formed on the end cover 210 associated with the support tube 208 of the filter cartridge 200 and the second part 420 is provided on the outlet tube 112 of the housing assembly 102. Other arrangements are possible. For example, the first connection arrangement 400 can be provided on housing assembly 102 and the second part 420 of the first connection arrangement 400 can be provided on the filter cartridge 200.

As shown, the first part 410 of the first connection arrangement 400 includes a plurality of circumferentially spaced latch members 216 and a plurality of circumferentially spaced guide pins 218. The latch members 216 and the guide pins 218 can be integrally formed on the support tube 208 and/or the end cover 210. The first connection arrangement 400 further includes a biasing spring 220 mounted to the end cover 212. These features and the complete operation of the first connection arrangement 400 are described in further detail in a following section.

In one aspect, the filter cartridge 200 can be removably secured to the cover via a second connection arrangement 440 in which a first part 450 of the second connection arrangement 440 is provided on the filter cartridge 200 and a second part 460 of the second connection arrangement 440 is provided on the housing assembly 102. In the example shown, the first part 450 is formed on the end cover 212 associated with the filter cartridge 200, and the second part 460 is provided by a connection assembly 120 mounted to the cover 106. Other arrangements are possible.

As shown, the first part 450 of the second connection arrangement 440 includes a threaded engagement feature 222 which interacts with threads associated with the connection assembly 120. In the particular example shown, the threaded engagement feature 222 is a threaded bore 222b formed by a sidewall 222a defining a recess 222c in the end cover 212. In the configuration shown, the threaded bore 222b receives a threaded stem 130 of the connector assembly 120. These features and the complete operation of the second connection arrangement 440 are described in further detail in a following section.

Filter Cartridge 300

As shown, the secondary filter cartridge 300 includes an open end cap 302 and an closed end cap 304, between which filter media 306 extends. In one example, the end caps 302, 304 are formed from a molded polyurethane material.

As shown, filter media 306 is a synthetic non-pleated fabric media arranged into a tubular, cylindrical shape defining an interior 310 and an exterior side 312. The selection of the media and media form is a matter of choice for efficiency and usage lifetime concerns. Other configurations for the filter cartridge 300 are possible without departing from the concepts presented herein. The filter media 306 can be either pleated or non-pleated (e.g. depth media, fluted media, etc.) and can include synthetic or organic fibers, such as cellulosic fibers. The media 306 can be configured in a cylindrical pattern as shown, if desired, although alternatives are possible. For example, the media 306 can be somewhat conical in extension between the opposite ends. Also, the media 306 can be configured with non-circular inner and/or outer perimeters; for example oval or other cross-sectional configurations are possible. Where the media 306 is pleated, the media 306 can include corrugations extending generally perpendicularly to the pleat tips, to facilitate keeping the pleats open during use. Various pleat tip folding techniques can be used to facilitate this, as are common in the art. Examples of this can be found in media packs with the mark "PleatLoc" from Donaldson Company, Inc, of Minneapolis, Minn., the Assignee of the present disclosure. The media 206 may also include hot melt media tip spacers or other media spacers, if desired. Example primary filter cartridge media and end cap types and configurations usable with the air filter cartridge 100 disclosed herein is fully shown and described in U.S. Pat. No. 8,864,866, issued on Oct. 21, 2014, the entirety of which is incorporated by reference herein.

In one aspect, a support tube 308 is provided to support the filter media 206. The support tube may be formed from a plastic or metal material. The support tube 308 may be integrally or separately formed with the end caps 302, 304. The support tube 308 could also be integrally formed with the outlet 112. In the particular example shown, the support tube 308 is integrally formed with the end cap 304 and is attached to a separately formed end cap 302, such as by a plastic welding process or an adhesive.

A seal member 314 may be provided at the location of the end cap 302. As shown, the seal member 314 is shown as being an O-ring type seal disposed in a channel or groove 302a of the end cap 302. In the particular example shown, the seal member 314 forms an outwardly directed radial seal against an interior or inwardly facing surface 112b of a circumferential sidewall member 112e of the outlet 112, as most easily seen at FIG. 7. Accordingly, it should be appreciated that the outside diameter of the seal member 314 is greater than the inside diameter of the surface 112b. In one variation, the seal member 314 can molded onto the end cap 302, for example by injection molding a TPE (thermoplastic elastomer) material onto the end cap 302.

In one aspect, the end cap 304 is provided with a recess 304a having a circumferential sidewall 304b adjoining an end wall 304c. The recess 304a accepts the biasing spring 220 and provides a surface at the end wall 304c against which the spring 220 can act. As such, when both the main filter cartridge 200 and the secondary filter cartridge 300 are installed into the housing assembly 102, the biasing spring 220 generates a biasing force in a direction D1 away from the first connection arrangement 400. As is discussed in more detail later, this biasing force operates to retain the first connection arrangement 400 in a latched position. In the example shown, the biasing spring 220 is a separate helical metal spring. However, other configurations are possible that provide a biasing or spring effect. For example, a compressible material or a cantilevered spring could be used. Additionally, the biasing spring or element could be integrally formed with the end cover 212.

Other configurations for the secondary filter cartridge 300 are possible without departing from the concepts presented herein. An example secondary filter cartridge with features usable with the air cleaner assembly 100 disclosed herein is fully shown and described in U.S. Pat. No. 8,864,866.

First Connection Arrangement 400

In use, the first connection arrangement 400 operates to secure the filter cartridge 200 to the outlet 112 and thereby housing 104 of the air cleaner assembly 100. In one aspect, the first connection arrangement 400 includes a first part 410 associated with the filter cartridge 200 and a second part 420 associated with the outlet 112.

As mentioned previously, the first part 410 of the first connection arrangement 400 is formed in the filter cartridge 200, and includes a plurality of circumferentially arranged and spaced apart latch members 216 and guide pins 218. In the embodiment shown, the latch members 216 and guide pins 218 are integrally formed with the support tube 208. In the embodiment shown, six latch members 216 and six guide pins 218 are shown. However, more or fewer of each may be provided. Also, the number of latch members 216 need not match the number of guide pins 218 in some arrangements. As most easily seen at FIG. 37, which schematically shows the first part 410 in a flattened form, each latch member 216 is provided with a deflectable arm portion 216a and a latch portion 216b extending radially inward from the deflectable arm portion 216a. In one aspect, a space or gap 216c surrounds the latch member 216 along the sides and end proximate the latch portion 216b such that the latch arm portion 216a can deflect radially outwardly (e.g. away from the longitudinal axis x) when engaging with the second part 420 of the first connection arrangement 400, as is discussed in further detail below. Each latch portion 216b is shown as being provided with a generally chevron shape with angled end surfaces 216d, 216e that join to form a distal end or point 216f of the latch portion 216b and the latch member 216. On an opposite side of the end surfaces 216d, 216c, the latch portion 216b defines angled interior surfaces 216g, 216h which join at an interior angle 216i opposite the distal end 216f. While a chevron shape with angled surfaces is shown, a latch portion 216b with curved surfaces or a plurality of pegs or other elements may also be provided, although such configurations may be less preferable in certain configurations other interlocking shapes are possible. In one aspect, the surfaces 216d, 216e, 216g, 218h are disposed at an oblique angle a1 relative to the longitudinal axis X of the air cleaner assembly 100 and filter cartridge 200. In the example shown, each of the surfaces 216d, 216c, 216g, 218h is disposed at an angle a1 of about 65 degrees relative to the longitudinal axis. Other angles are possible.

Figure 30:
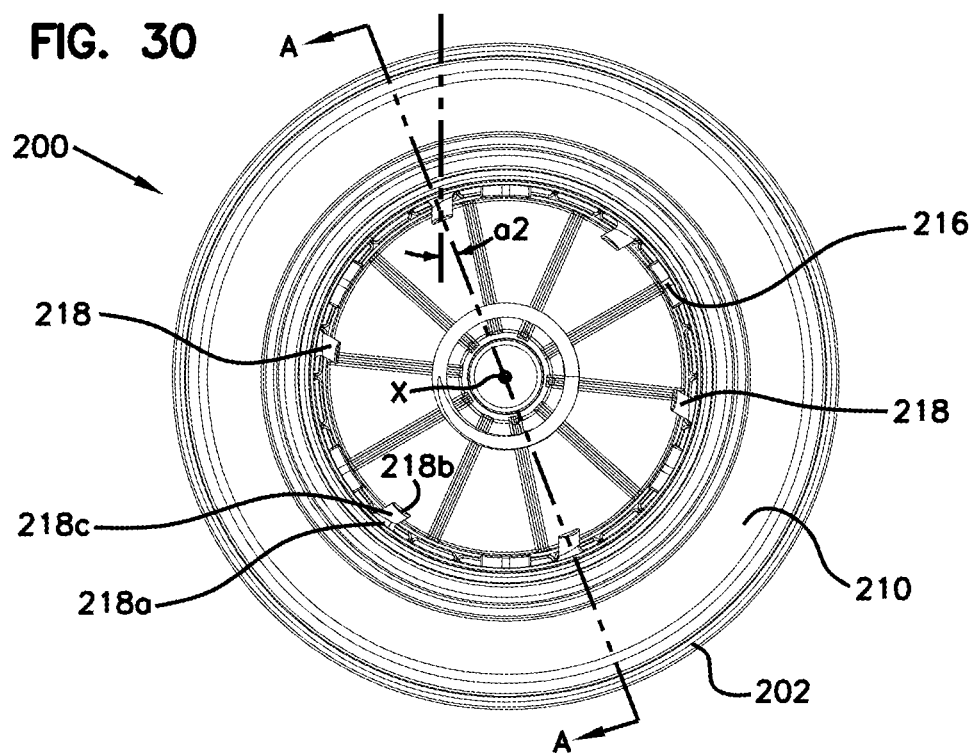
FIG. 30 is a schematic end view of the filter cartridge shown in FIG. 25.
Figure 31:
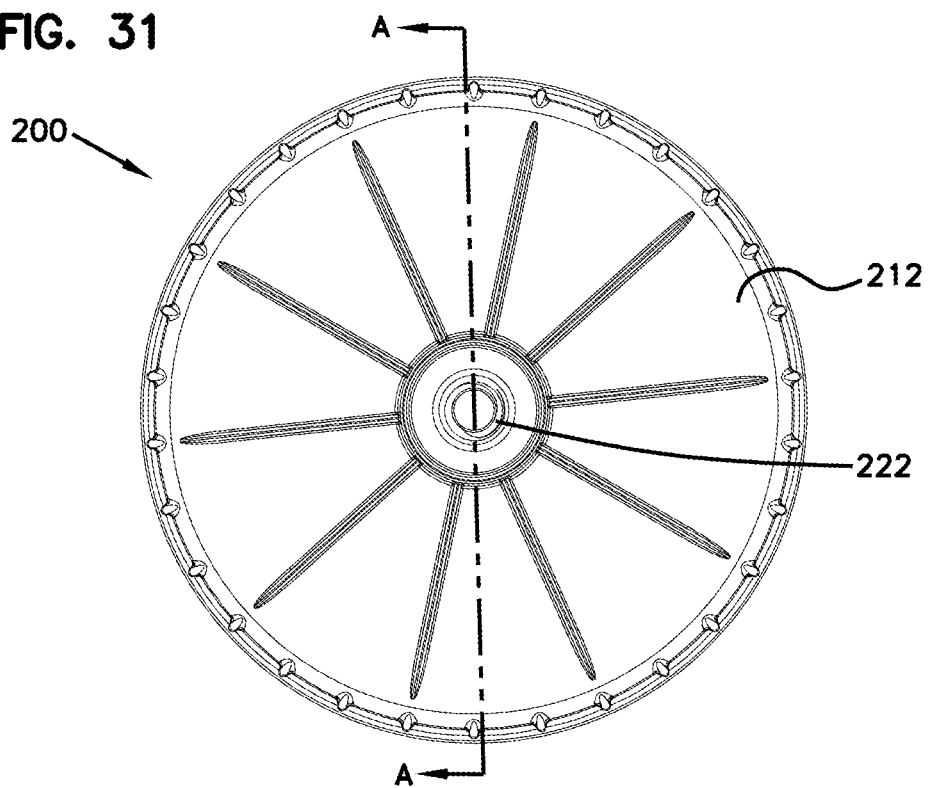
FIG. 31 is a schematic end view of the filter cartridge shown in FIG. 25.
Figure 32:
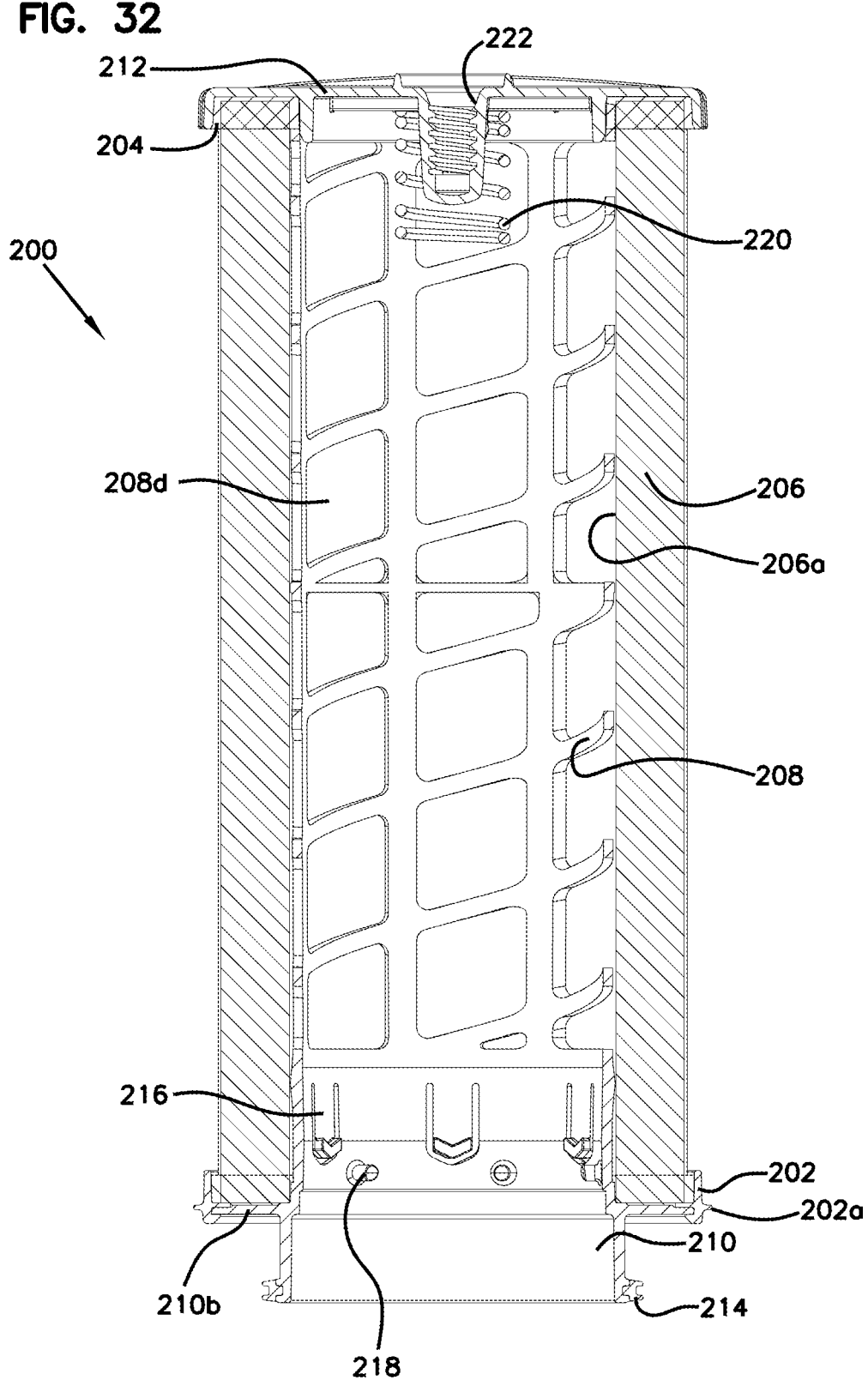
FIG. 32 is a schematic cross-sectional view of the filter cartridge shown in FIG. 30, taken along the line A-A in FIG. 31.
Figure 33:
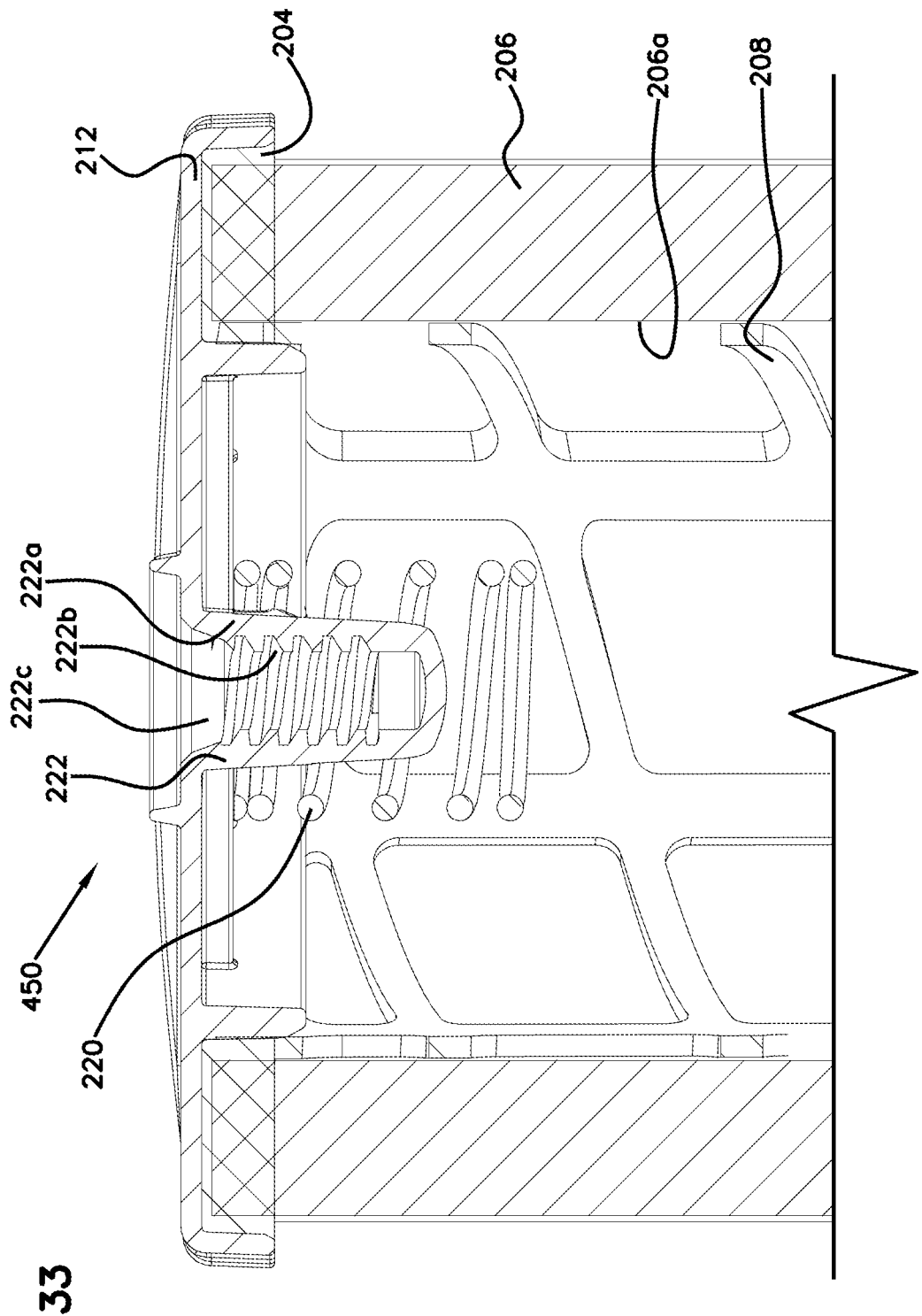
FIG. 33 is a schematic enlarged portion of the view of the filter cartridge shown in FIG. 25.
Figure 34:
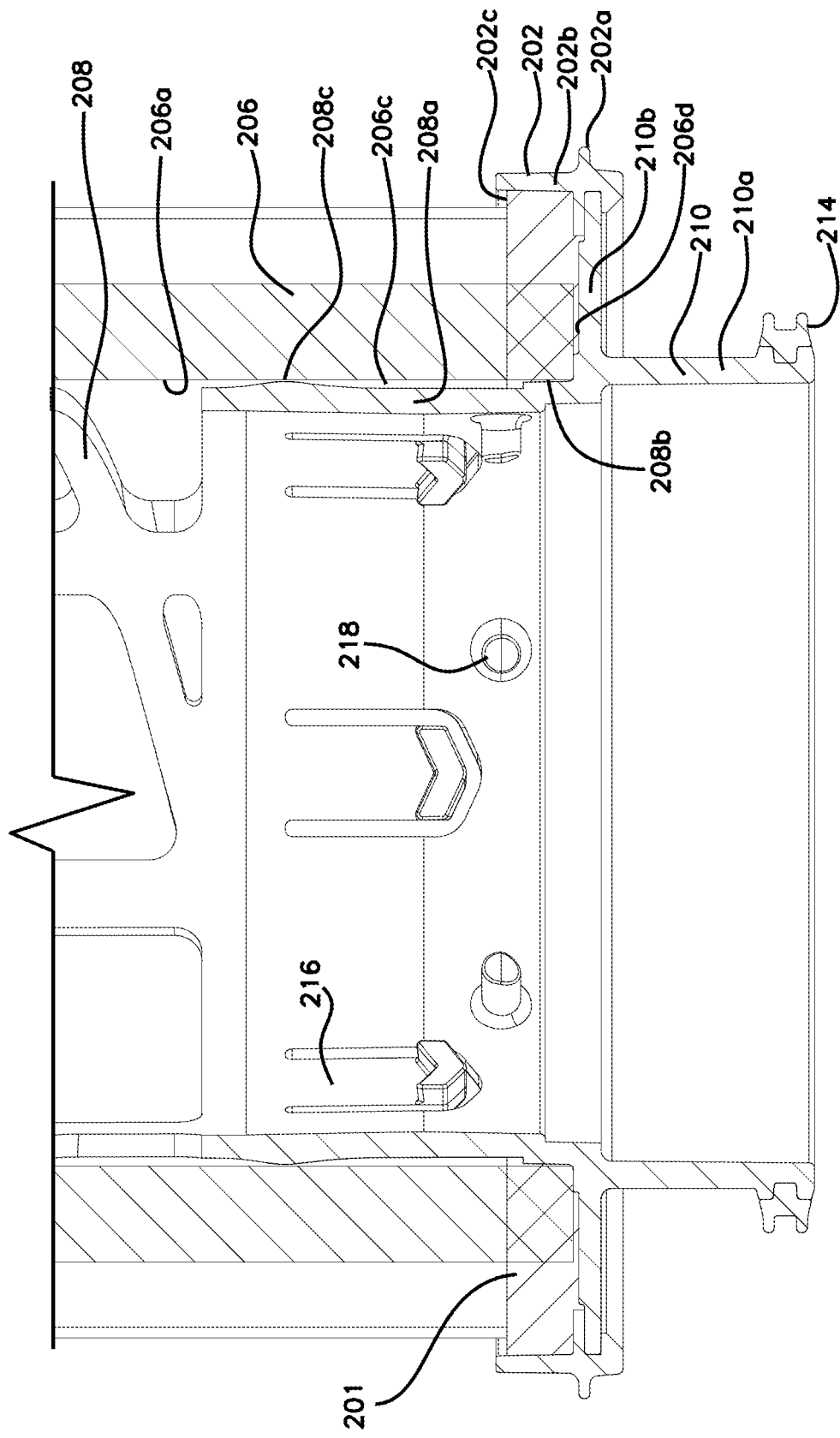
FIG. 34 is a schematic enlarged portion of the view of the filter cartridge shown in FIG. 25.
Figure 37:
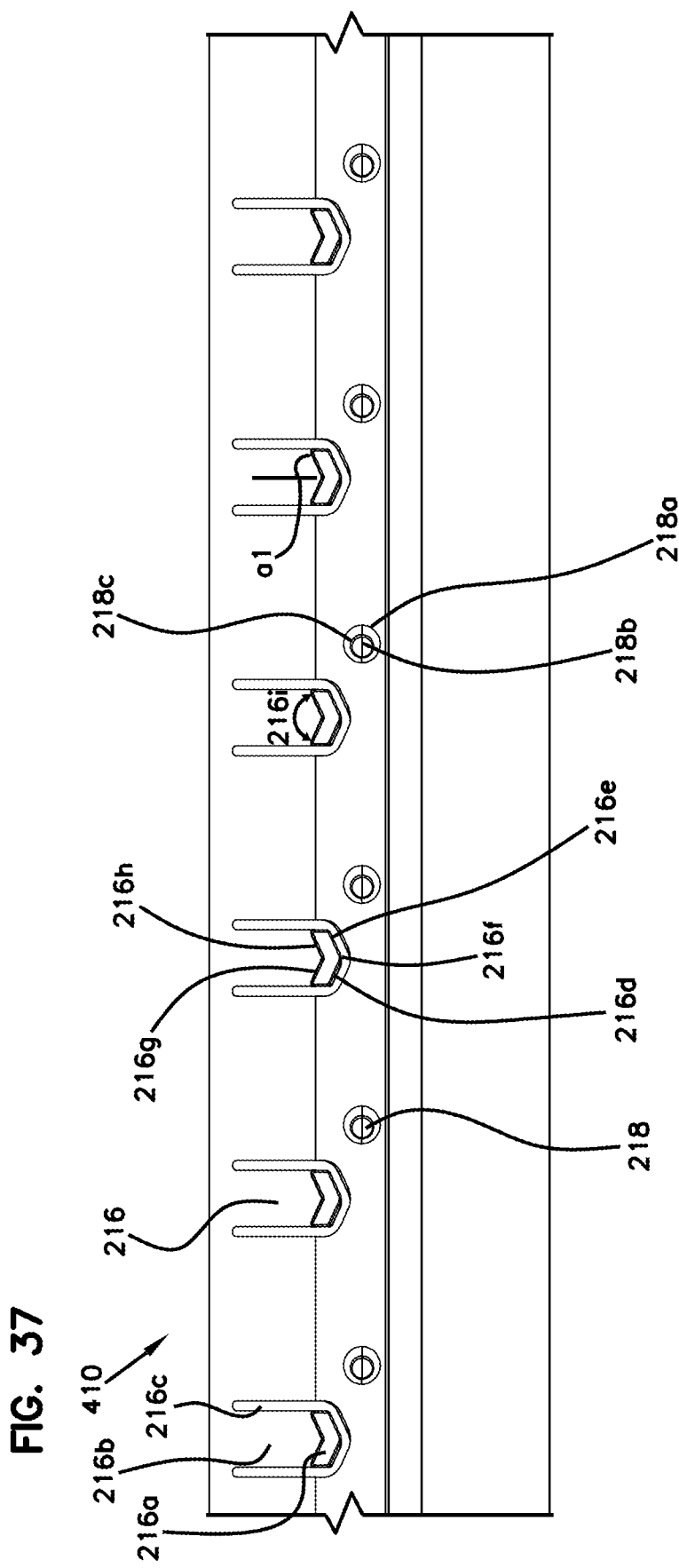
FIG. 37 is a flat schematic view of a first part of a first connection arrangement of the support tube shown in FIG. 35.
Figure 38:
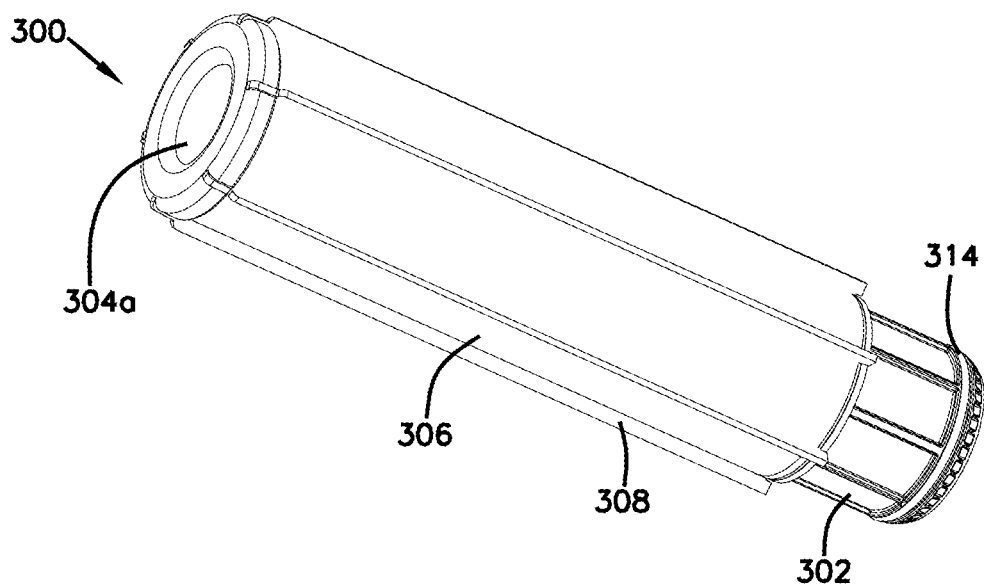
FIG. 38 is a schematic perspective view of a filter cartridge of the air cleaner assembly shown in FIG. 1.
Figure 39:
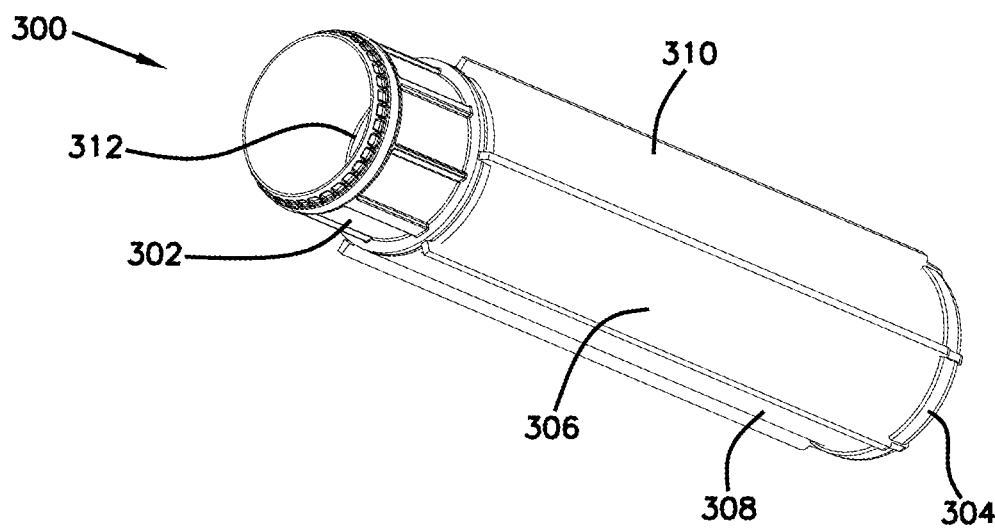
FIG. 39 is a schematic perspective view of the filter cartridge shown in FIG. 38.
Figure 40:
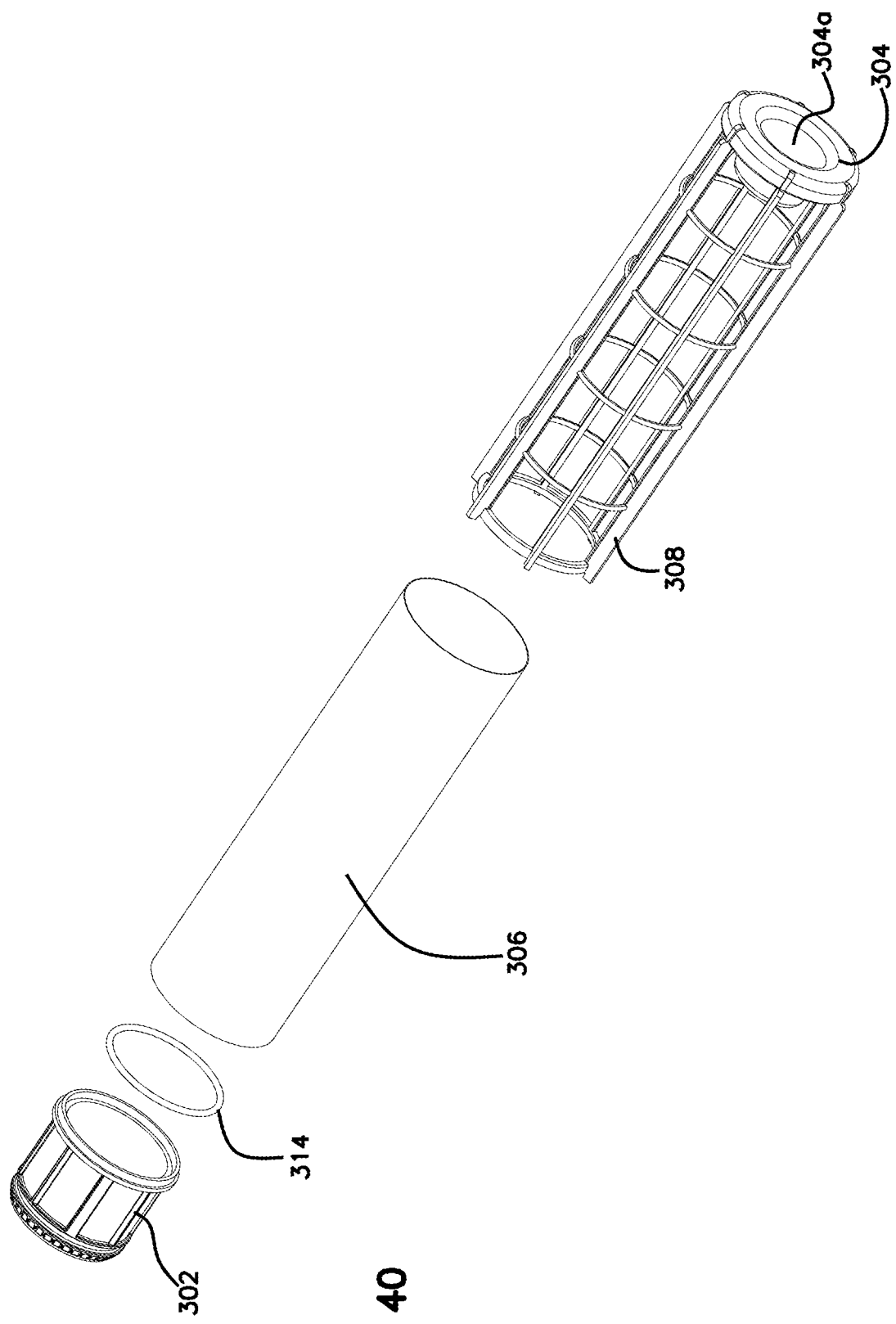
FIG. 40 is a schematic exploded perspective view of the filter cartridge shown in FIG. 38.
Figure 41:
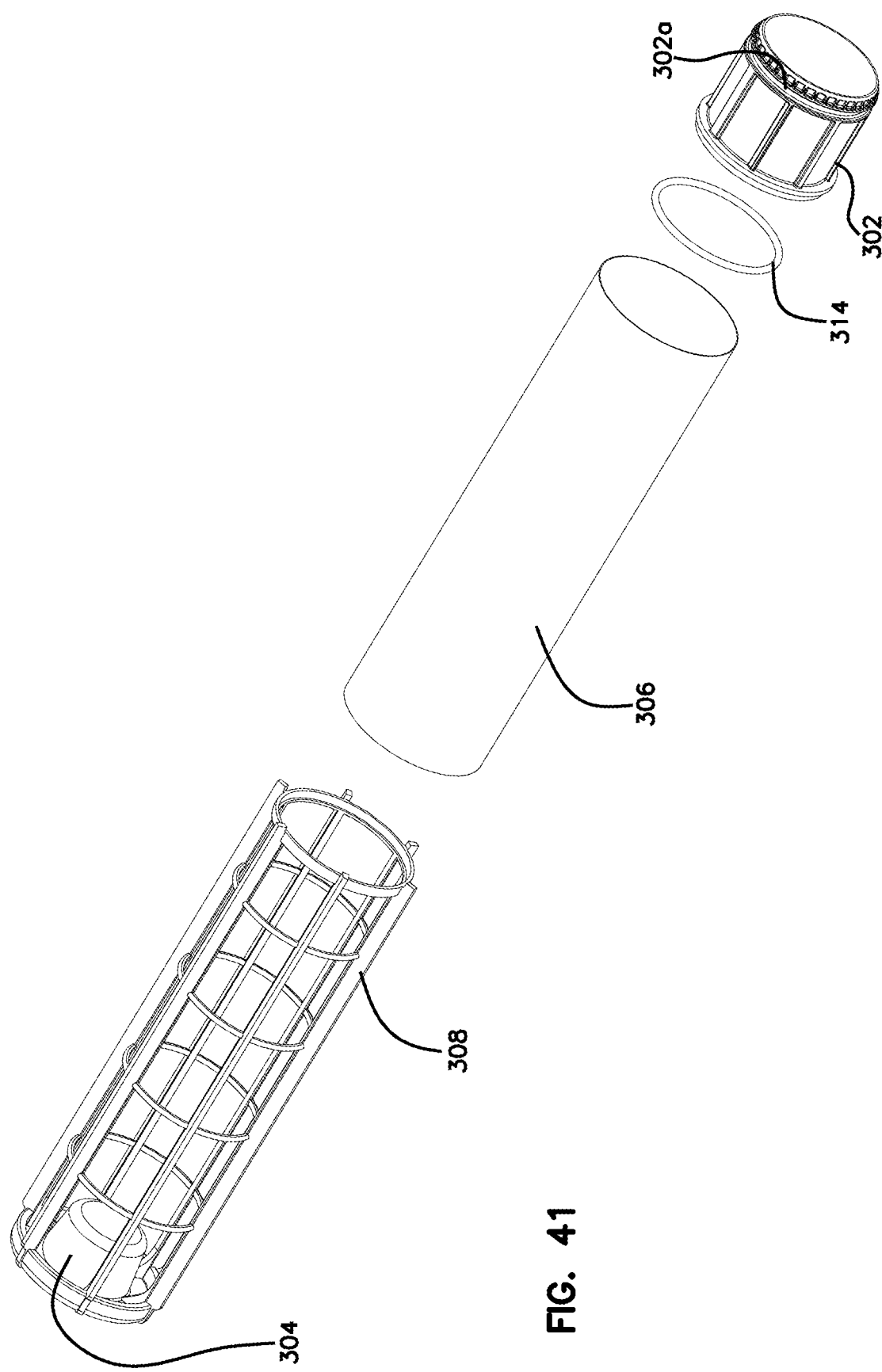
FIG. 41 is a schematic exploded perspective view of the filter cartridge shown in FIG. 38.
Figure 44:
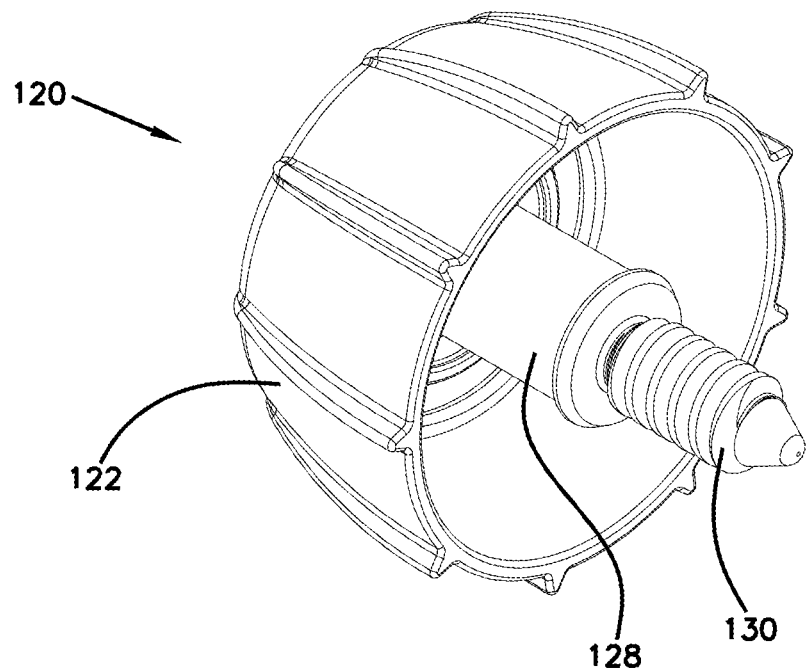
FIG. 44 is a schematic perspective view of a connector assembly of the air cleaner shown in FIG. 1.
Figure 45:
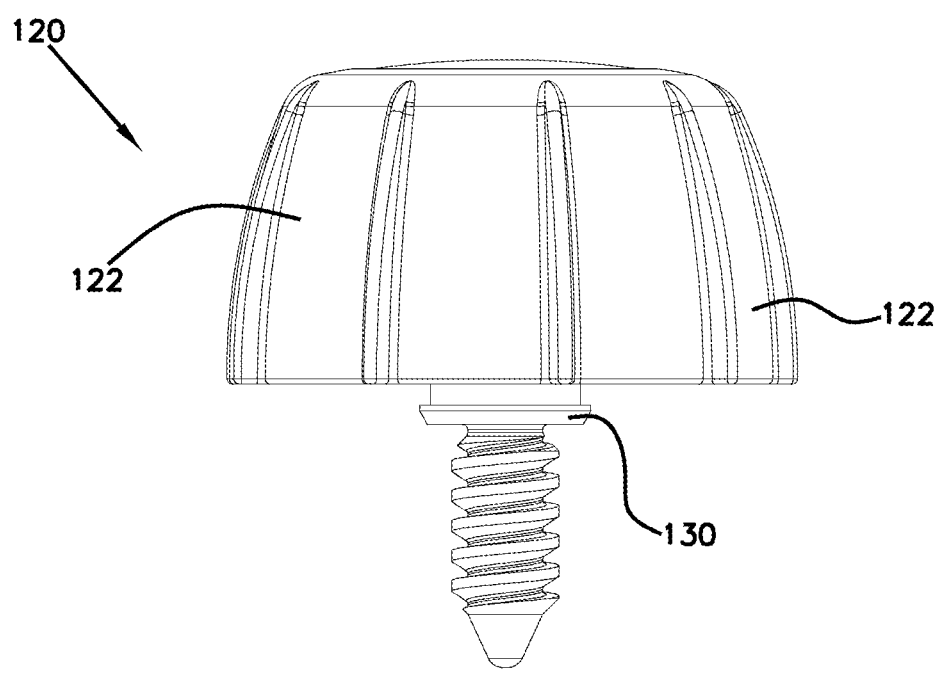
FIG. 45 is a schematic side view of the connector assembly shown in FIG. 44.
Figure 46:
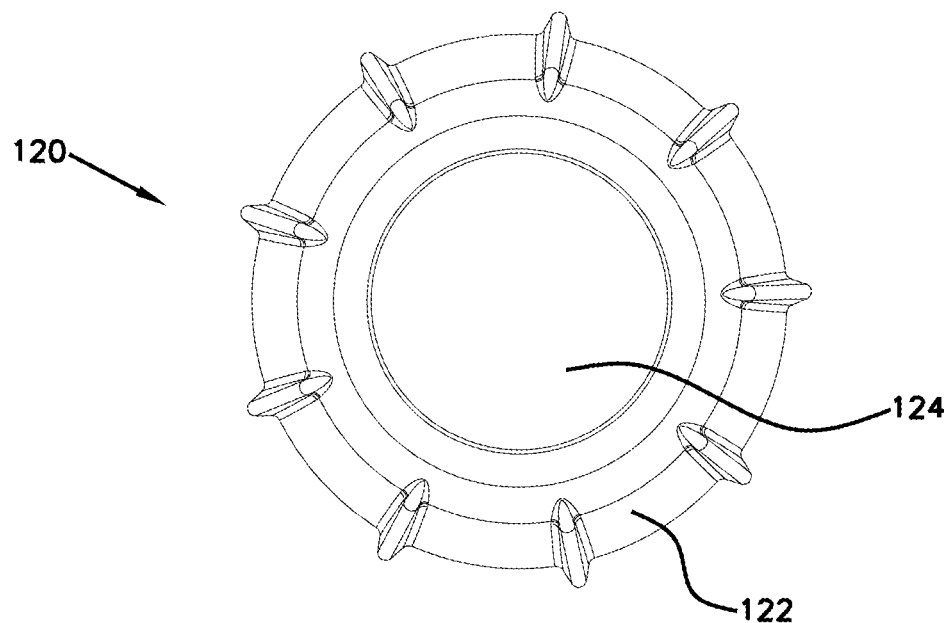
FIG. 46 is a schematic end view of the connector assembly shown in FIG. 44.
Figure 47:
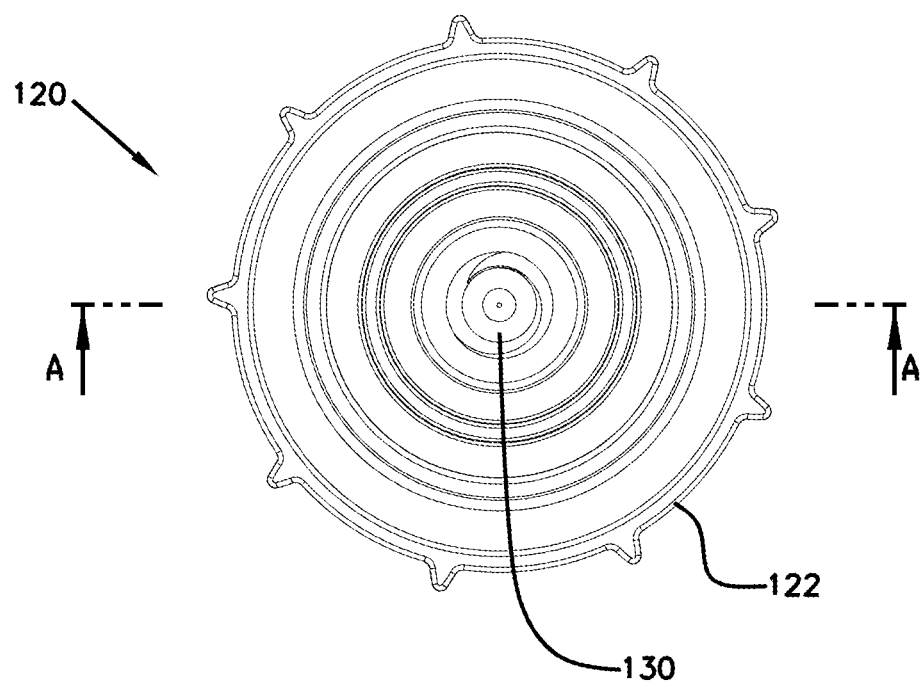
FIG. 47 is a schematic end view of the connector assembly shown in FIG. 44.
Figure 48:
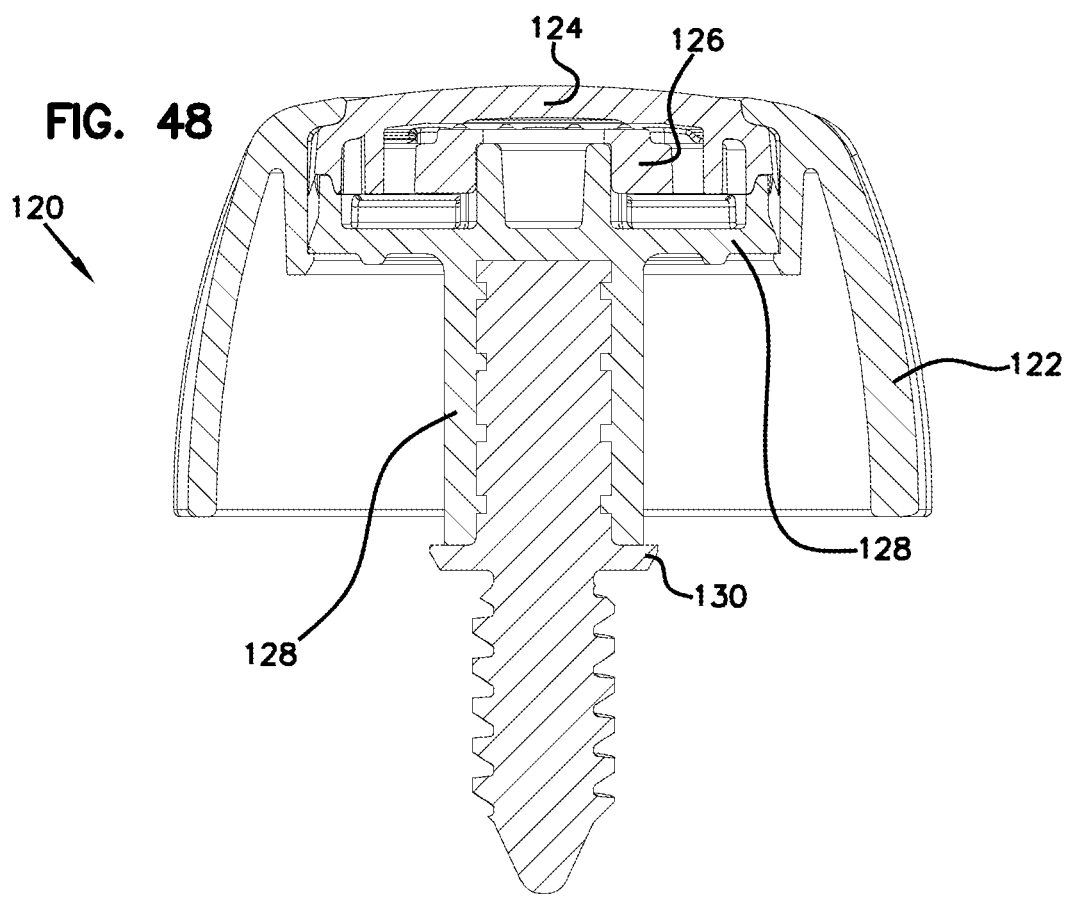
FIG. 48 is a schematic cross-sectional view of the connector assembly shown in FIG. 44, taken along the line A-A in FIG. 47.

As most easily seen at FIG. 30, the guide pins 218 extend radially inward towards the longitudinal axis X of the filter cartridge 200 from a base portion 218a to a distal portion 218b. In one aspect, the guide pins 218 have a rounded outer surface 218c and cross-sectional shape, such as a cylindrical outer surface and circular cross-sectional shape. Other shapes are possible. In one aspect, the guide pins 218 extend from the support tube 208 at an oblique angle to the interior surface of the support tube 208, for example at an angle a2 relative to a line cutting through the center of the base 218a of the guide pin 218 and through the longitudinal axis X of the filter cartridge 200. In the example shown, the angle a2 is about 7 degrees. Other angles are possible.

The second part 420 of the first connection arrangement 400 is shown as being provided on the outlet tube 112. As shown, the second part 420 includes a plurality of catch or latch structures 113 and a guide channel structure 115. As will be explained in further detail below, the catch structures 113 interact with the latch members 216 to secure the filter cartridge 200 in a latched position while the guide channel structures 115 interact with the guide pins 218 to guide the latch members 216 into and out of being latched with the catch structures 113.

As shown, each catch structure 113 is shown as extending from a base end 113a towards a distal end 113b and define a top surface 113c. As the catch structure 113 extends from the base end 113a towards the distal end 113b, the thickness of the catch structure 113 increases such that a ramped surface with a ledge or catch surface is defined. In the embodiment shown, the catch surface is defined by a pair of angled surfaces 113d, 113e that merge at the distal end 113b to form a general chevron shape that is complementary to the surfaces 216h, 216g on the first part 410 of the first connection arrangement 400. While a chevron shape is shown for surfaces 216h, 216g, the surfaces 216h, 216g could be provided with a curved surface so long as the surface on the catch structure 113 is complementarily shaped with the corresponding surface on the latch members 216.

The channel structure 115 interacts with the guide pins 218 such that the latch members 216 can be aligned with the catch structures 113 to achieve the latched position described above. In one aspect, the channel structure 115 includes a plurality of first sidewalls 115a having first, second, third, fourth, and fifth sidewall members 115b, 115c, 115d, 115e, 115f which meet at bend locations or junction points 115g, 115h, 115i, 115j, 115k. In one aspect, each first sidewall 115a encircles a latch structure 113. The channel structure 115 further includes a circumferential sidewall 115m with repeating segments 115n, 115p, 115q which meet at bend locations or junction points 115r, 115s, 115t. In one aspect, segments 115f and 115n are generally parallel to each other, segments 115c and 115r are generally parallel to each other, and segments 115d and 115q are generally parallel to each other such that a generally constant width channel 115u is formed between the sidewalls 115a and 114m. The channel 115u is further defined by the space between adjacent sidewalls 115a (i.e. distance between junctions 115h and 115k). The channel 115u defines the pathway within which the guide pins 218 travel.

As most easily seen at FIGS. 73 to 76, the filter cartridge 200 is moved from the unlatched position to the latched position by first moving the filter cartridge 200 in the insertion direction D2 such that the guide pins 218 are moved towards the sidewalls 115a. As can be seen at FIG. 73, the guide pin 218 can initially contact either the segment 115b or the segment 115c. Both of the segments 115b and 115c slope away from the rounded distal junction point 115g and towards a channel 115u. Accordingly, if the guide pins 218 initially contact the junction point 115g, the contact force in the direction D2 will cause the guide pins 218 to rotate (and thus the entire filter cartridge 200) to either the left side onto segment 115b (as shown in FIG. 73) or to the right side onto segment 115c. As long as an insertion force is being applied to the filter cartridge 200, the guide pins 218 will continue to ride down the segments 115b or 115c until the guide pins 218 drop into the portion of the channel 115u defined between the sidewalls 115f and 115n. Where the guide pins 218 happen to already align with the channel 115u between the sidewalls 114f and 115n, the filter cartridge 200 will simply drop into the position shown at FIG. 76. This insertion sequence is shown sequentially at FIGS. 74 to 76 with the pathway P1 of insertion for the guide pins 218 being shown at FIG. 73. Thus, it should be appreciated that the filter cartridge 200 will automatically be rotated into the desired position by the interaction between the guide pins 218 and the sidewalls 115 such that the filter cartridge 200 can be installed into the latched position regardless of the initial rotational alignment of the filter cartridge 200 with respect to the outlet tube 112 and air cleaner assembly 100.

As the filter cartridge 200 is being installed over the outlet tube 112 in the above described manner, the latch members 216 on the filter cartridge 200 are being rotationally aligned with the catch structures 113 on the outlet tube 112, as is also illustrated at FIGS. 73 to 76. As the guide pins 218 travel into the channel 115u, the latch portions 216b of the latch members 216 ride laterally and axially across the top surface 113c of the catch structures 113. With this interaction, the arm portions 216a deflect away from the longitudinal axis X until the latch members 216 move beyond the top surface 113c. At the point where the guide pins reach the junction 115r between sidewall segment 115n and 115p, the latch portions 216b snap over the catch structures 113 such that the arm portions 216a return to their relaxed or resting state. Once the filter cartridge 200 is in this position and released by the operator, the biasing spring 220 forces the filter cartridge 200 to move towards the direction D1 such that the interior surfaces 216g, 216h of the latch portions 216b engage and are forced against surfaces 113d, 113c to hold the filter cartridge 200 in a locked or secured position, as is shown at FIG. 76.

Referring to FIGS. 77 to 80, the removal sequence of the filter cartridge 200 is shown whereby the filter cartridge 200 can be returned to an unlocked or unlatched position from the locked or latched position via pathway P2. To unlatch the filter cartridge 200, the operator generates a pushing force in the direction D1 onto the filter cartridge 200 which will cause the filter cartridge 200 to move further towards the inlet tube 112. This pushing force will also cause the guide pins 218 to be guided into the portion of the channel 115$u$ defined between the sidewall segments 115$c$ and 115$b$ and ultimately to the junction point 115$s$ between sidewall segments 115$r$ and 115$q$, as shown at FIG. 79. Thus, it should be appreciated that the filter cartridge 200 has been rotated between the position shown at FIGS. 78 and 79. As most easily seen at FIG. 79, the junction point 115$s$ is laterally offset from the junction point 115$i$ such that when the operator releases the filter cartridge 200, the guide pins 218 will be received between the sidewall segments 115$d$ and 115$q$ as the biasing spring 220 forces the filter cartridge 200 in the direction D1. As can also be seen at FIG. 79, the latch members 216 are moved axially out of engagement with the catch structures 113 and are rotated away from the latch structures 113 such that the latch members 216 are located between the latch structures 113. Once this position is reached, the latch members 216 no longer retain the filter cartridge to the outlet tube 112.

From the position shown at FIG. 79, the biasing spring 220 will continue to cause the filter cartridge 200 to move in the direction D1 with the cartridge 200 rotating further due to the guide pins 218 travelling in the channel 115$u$ between the sidewall segments 115$d$ and 115$q$ and ultimately to the portion of the channel defined between the sidewalls 115$a$, as shown at FIG. 80. As this rotation occurs, contact between the latch members 216 and laterally adjacent catch structures 113 is prevented or reduced due to the top surfaces 113$c$ being configured as sloped or ramped surfaces that increase the clearance between the latch portions 216$b$ and the top surfaces 113$c$ in the direction D1. In the position shown at FIG. 80, the filter cartridge 200 can be removed from the air cleaner assembly 100 by pulling the cartridge axially in the direction D1.

As can be appreciated from the foregoing description, the filter cartridge 100 can be inserted into the air cleaner assembly 100 and placed into a latched position with a simple pushing motion (i.e. direction D2) by the operator and can likewise be moved to an unlatched position with the same simple pushing motion. As is described in further detail below, the second connection arrangement 440 can be provided to place the filter cartridge 200 into a locked position after the filter cartridge has been placed into the latched position, and to secure the cover 106 to the housing body 104.

Second Connection Arrangement 440

The second connection arrangement 440 operates to secure the filter cartridge 200 to the cover 106 of the air cleaner housing assembly 102 and includes a first part 450 associated with the filter cartridge 200 and a second part 460 associated with the cover 106. As previously described, the first part 450 of the second connection arrangement 440 is formed by the threaded arrangement 222 provided in the end cover 212 of the filter cartridge 200. A connection arrangement 120, described below, functions as the second part 460 of the second connection arrangement 450.

Referring to FIGS. 44 to 72 aspects of, the connection arrangement 120 is shown in further detail. In one aspect, the connection arrangement 120 is rotatably secured to the housing assembly cover 106 and thereby operates to place a tension upon and secure the filter cartridge 200 to the cover 106. As the filter cartridge 200 is secured to the housing body 104 at the opposite end by the first connection arrangement 400, the tensile force generated through the filter cartridge 200 operates to secure the housing body 104 to the cover 106. As such, the combined features of the disclosed air cleaner assembly 100 require that an appropriate filter cartridge be installed within the housing assembly 102 in order for the cover 106 to be secured to the housing body 104, thus preventing the installation of an incorrect filter and preventing the cover 106 being secured to the housing body 104 without any filter cartridge being installed.

Figure 50:
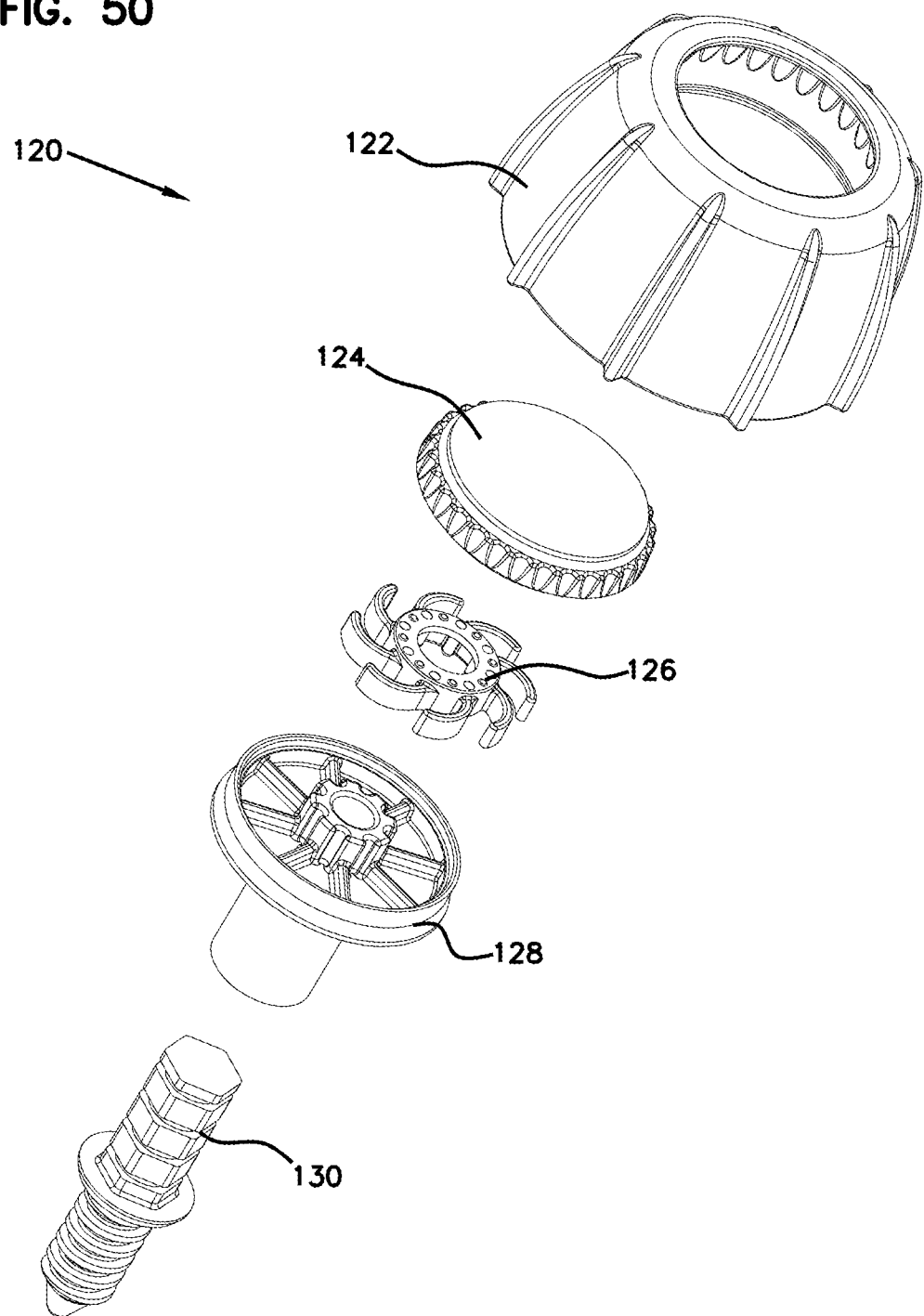
FIG. 50 is a schematic exploded perspective view of the connector assembly shown in FIG. 44.
Figure 51:
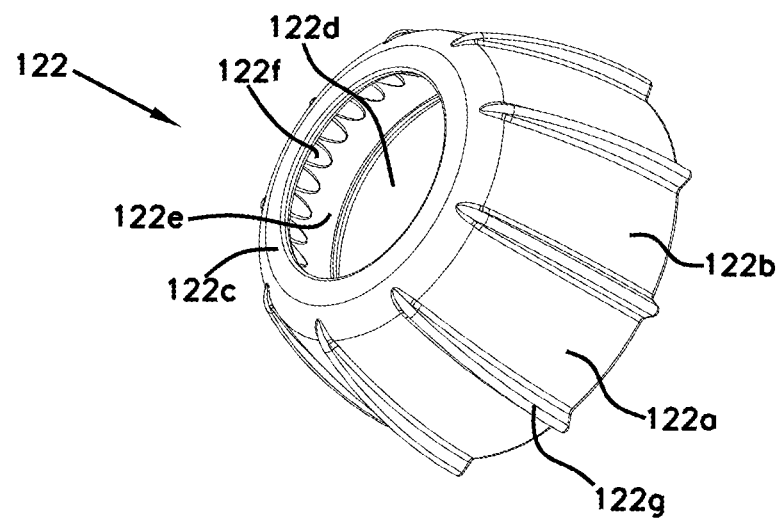
FIG. 51 is a schematic perspective view of an operator portion of the connector assembly shown in FIG. 44.
Figure 52:
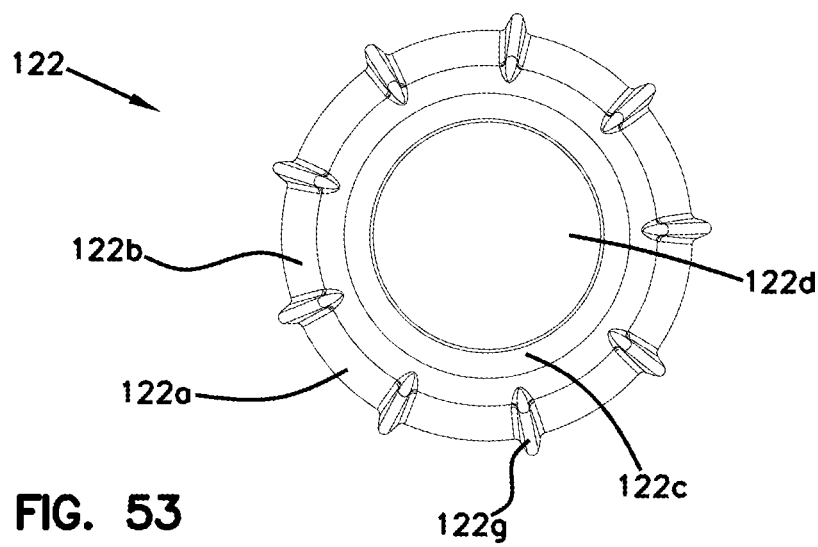
FIG. 52 is a schematic end view of the operator portion of the connector assembly shown in FIG. 51.
Figure 53:
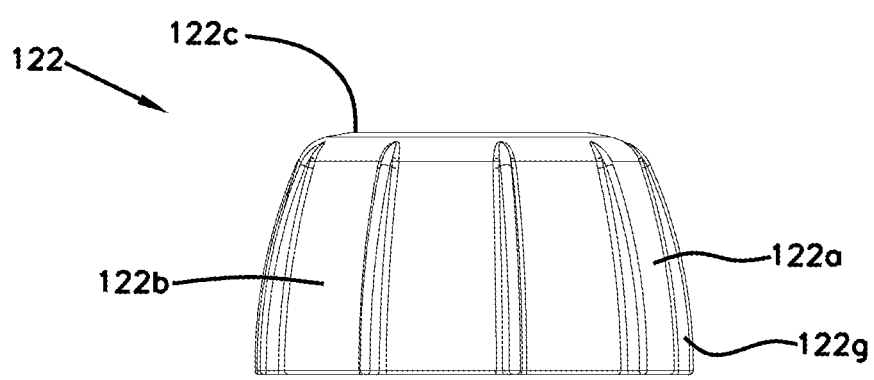
FIG. 53 is a schematic side view of the operator portion of the connector assembly shown in FIG. 51.
Figure 54:
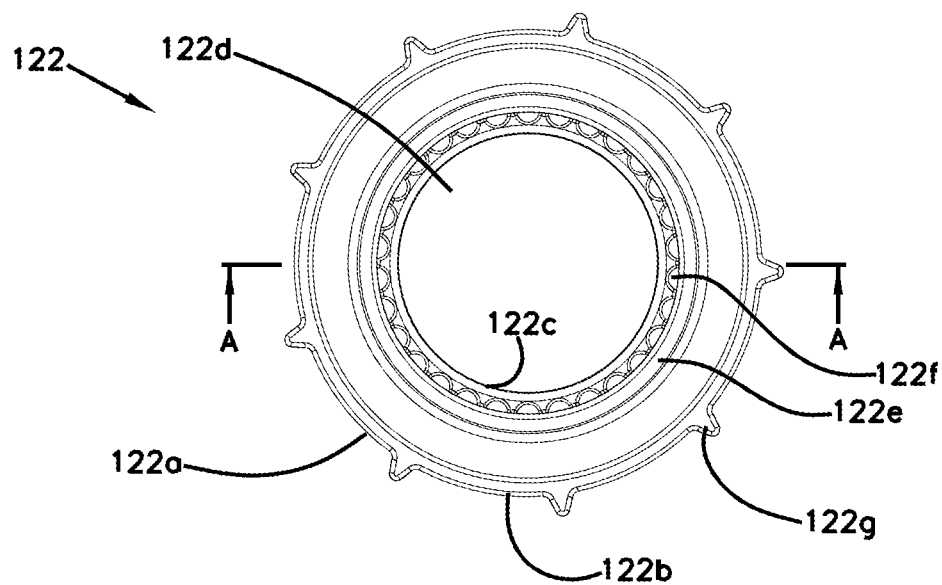
FIG. 54 is a schematic end view of the operator portion of the connector assembly shown in FIG. 51.
Figure 55:
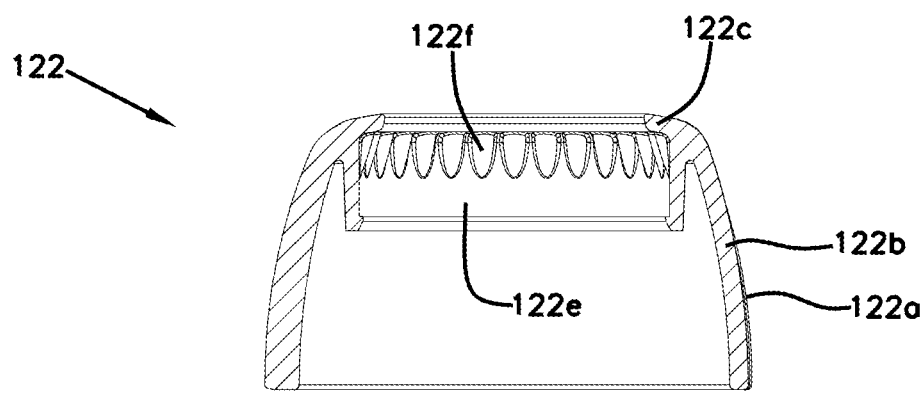
FIG. 55 is a schematic cross-sectional view of the operator portion of the connector assembly shown in FIG. 51, taken along the line A-A in FIG. 54.
Figure 56:
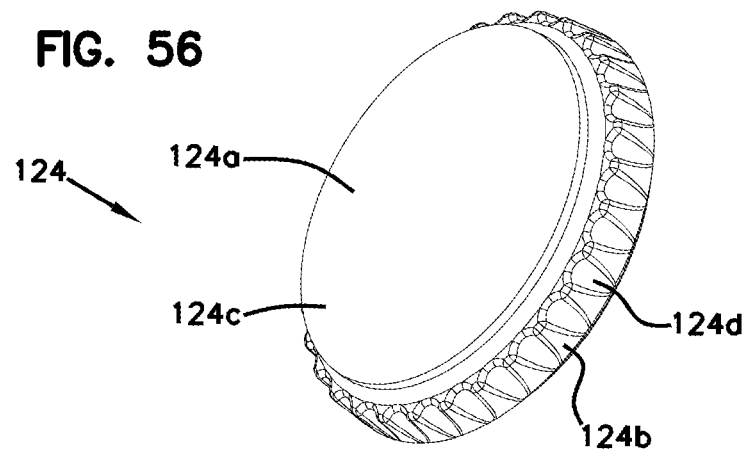
FIG. 56 is a schematic perspective view of a cap portion of the connector assembly shown in FIG. 44.
Figure 57:
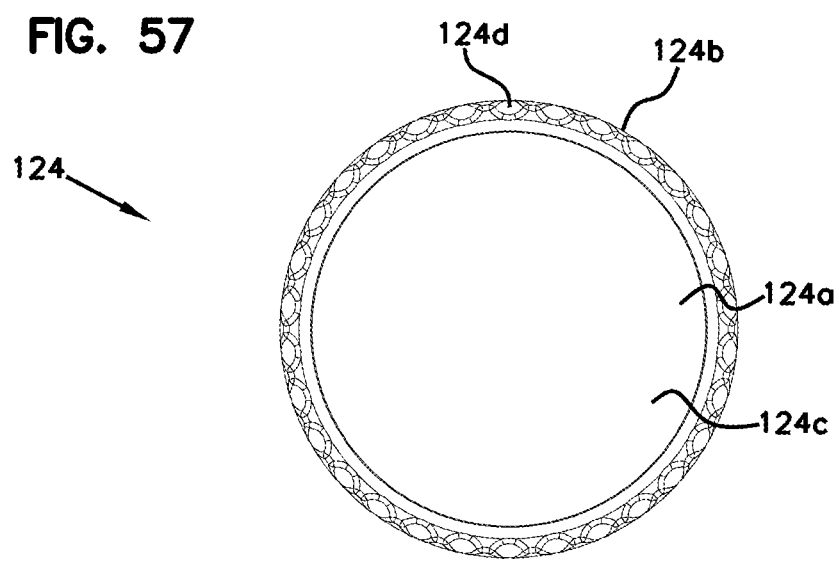
FIG. 57 is a schematic end view of the cap portion of the connector assembly shown in FIG. 56.
Figure 58:
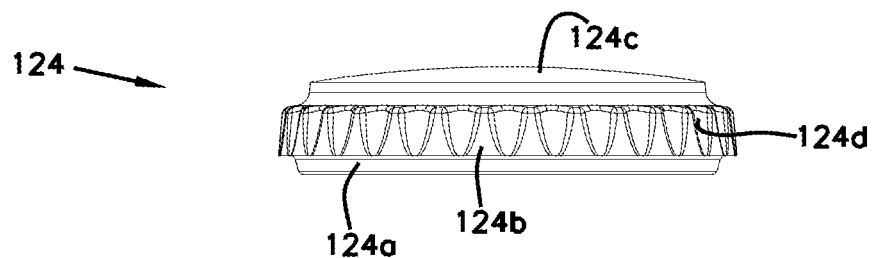
FIG. 58 is a schematic side view of the cap portion of the connector assembly shown in FIG. 56.
Figure 59:
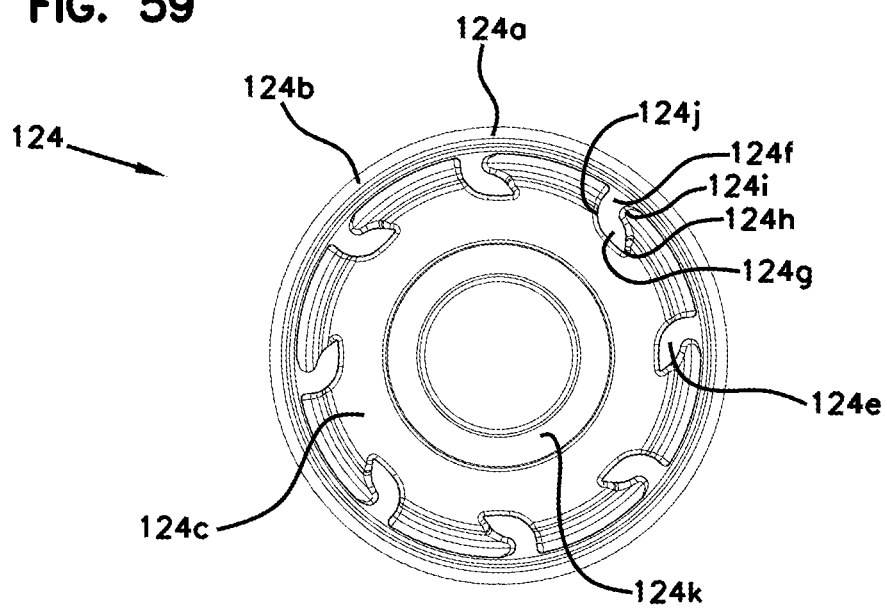
FIG. 59 is a schematic end view of the cap portion of the connector assembly shown in FIG. 56.
Figure 60:
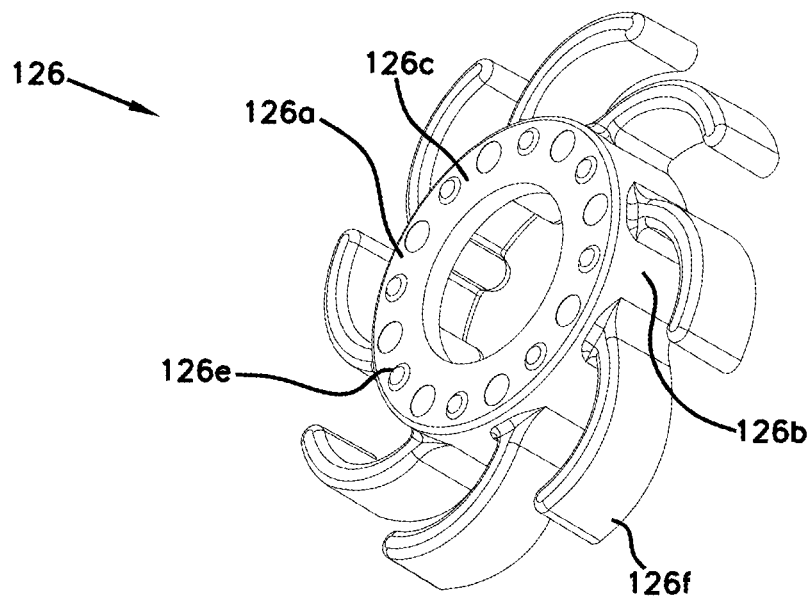
FIG. 60 is a schematic perspective view of a sprocket portion of the connector assembly shown in FIG. 44.
Figure 61:
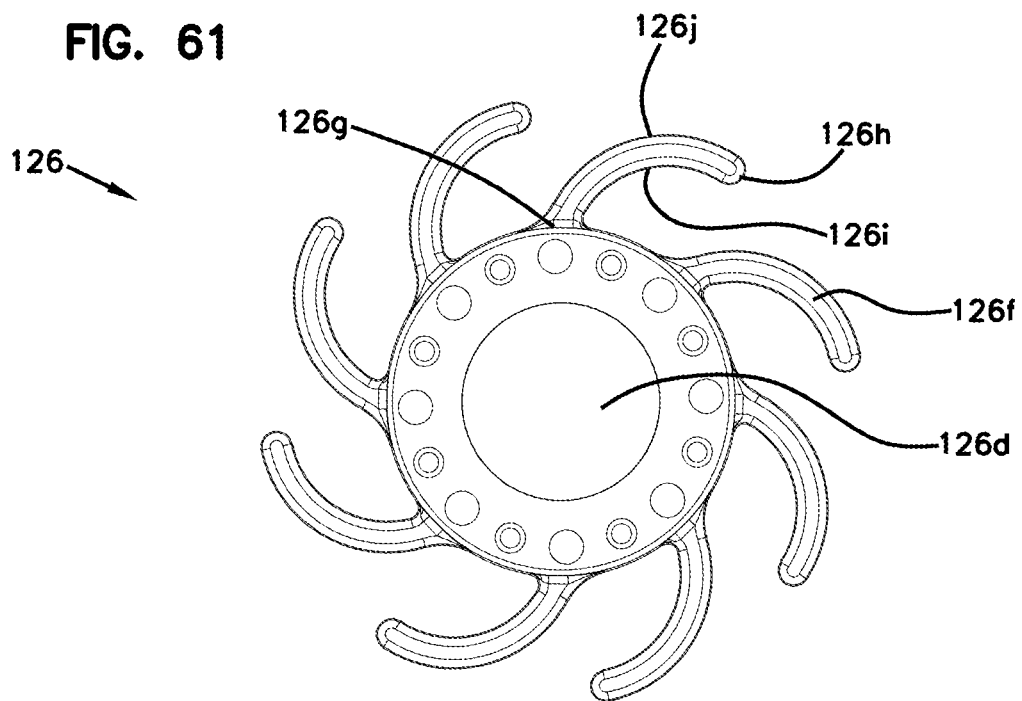
FIG. 61 is a schematic end view of the sprocket portion of the connector assembly shown in FIG. 60.
Figure 62:
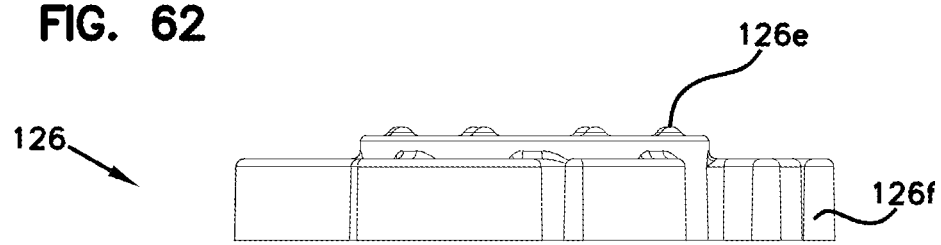
FIG. 62 is a schematic side view of the sprocket portion of the connector assembly shown in FIG. 60.
Figure 63:
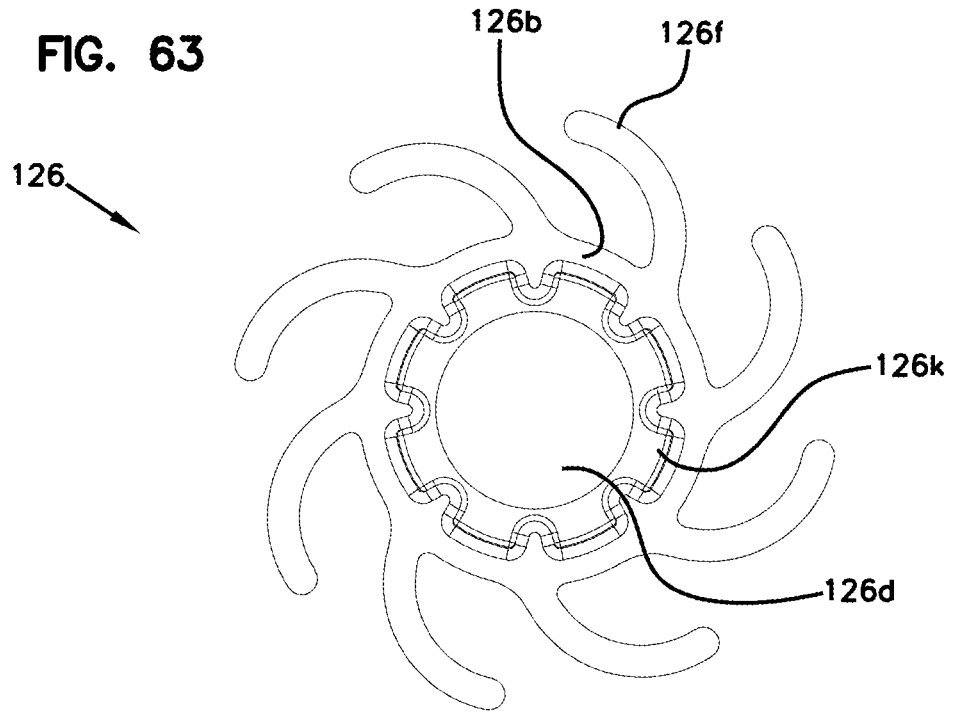
FIG. 63 is a schematic end view of the sprocket portion of the connector assembly shown in FIG. 60.
Figure 64:
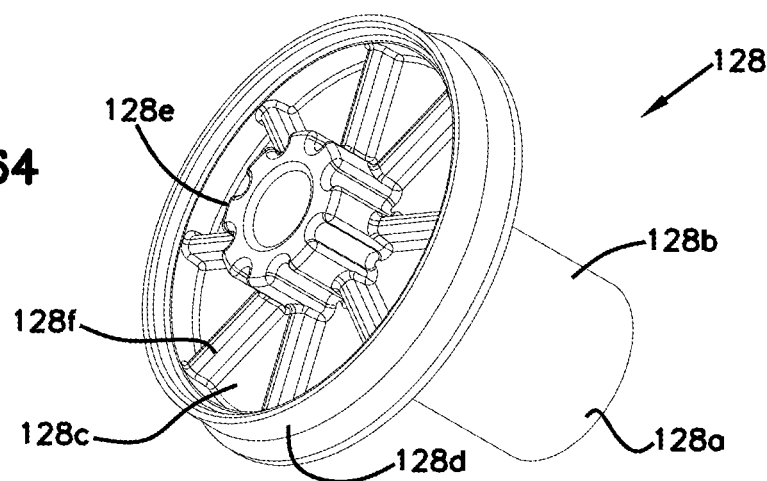
FIG. 64 is a schematic perspective view of a main body portion of the connector assembly shown in FIG. 44.
Figure 65:
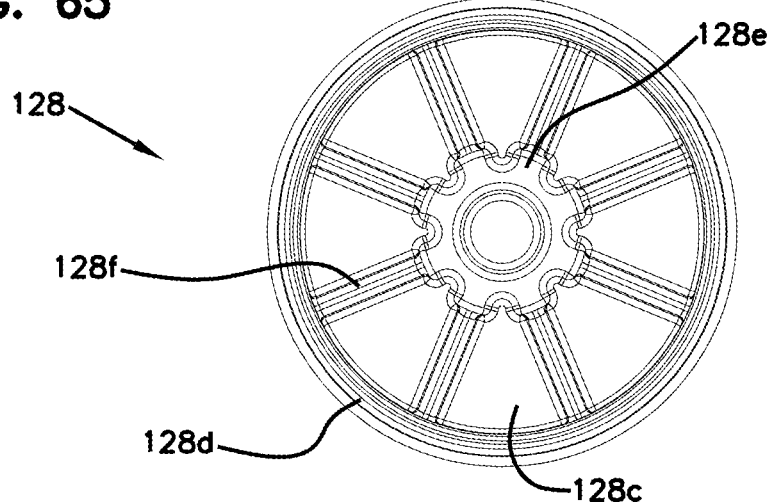
FIG. 65 is a schematic end view of the main body portion of the connector assembly shown in FIG. 64.
Figure 66:
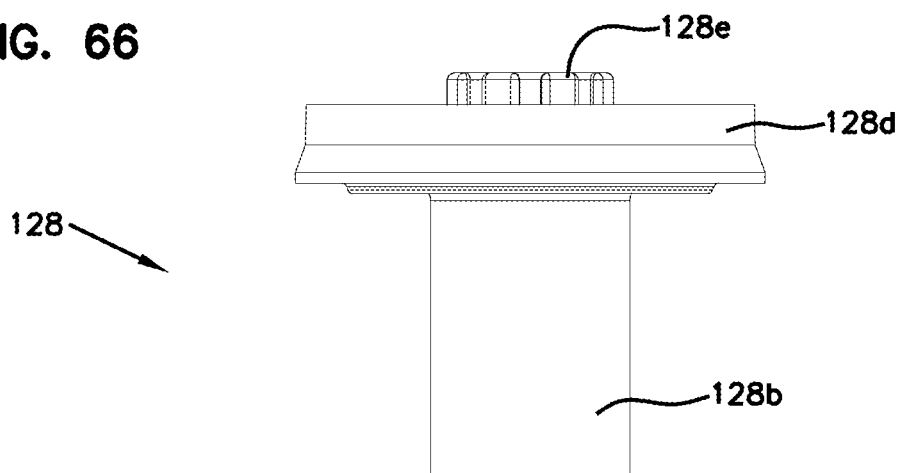
FIG. 66 is a schematic side view of the main body portion of the connector assembly shown in FIG. 64.
Figure 67:
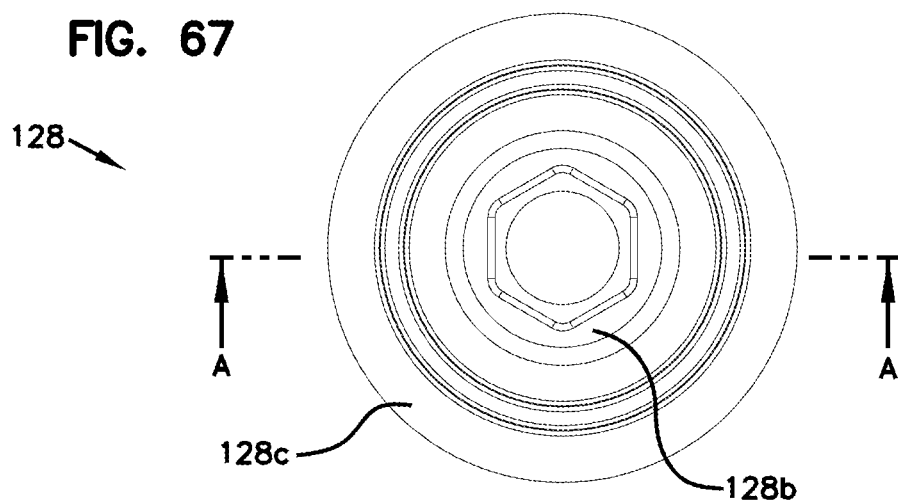
FIG. 67 is a schematic end view of the main body portion of the connector assembly shown in FIG. 64.
Figure 68:
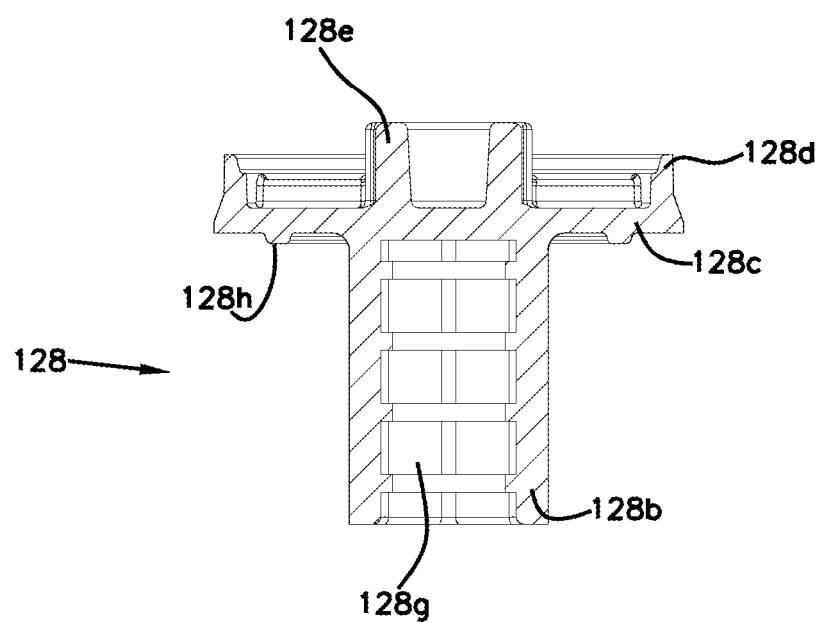
FIG. 68 is a schematic cross-sectional view of the main body portion of the connector assembly shown in FIG. 64, taken along the line A-A in FIG. 67.
Figure 69:
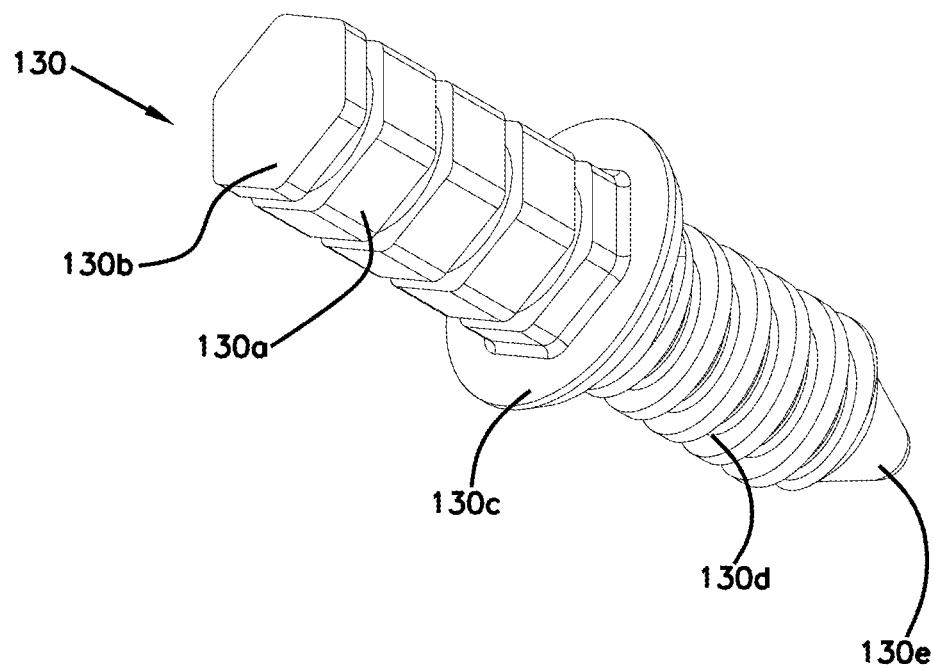
FIG. 69 is a schematic perspective view of a connector portion of the connector assembly shown in FIG. 44.
Figure 70:
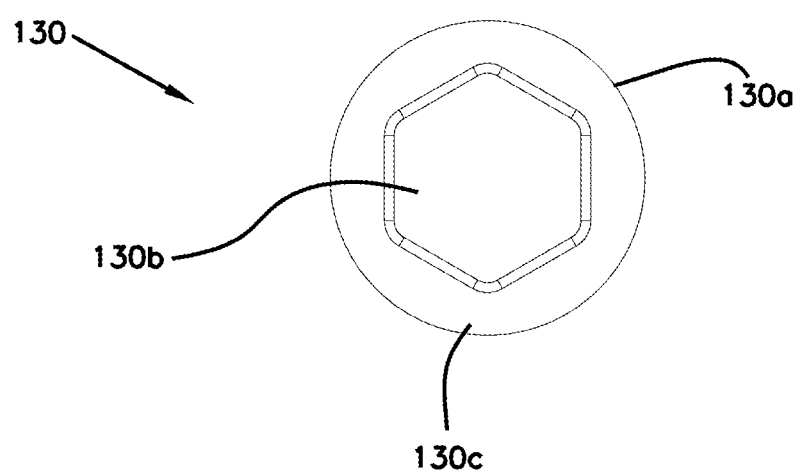
FIG. 70 is a schematic end view of the connector portion of the connector assembly shown in FIG. 69.

In one aspect, the connection arrangement 120 includes a handle or knob 122, a first gear member 124, a second gear member 126, an actuator member 128, and a threaded stem 130. As can be seen at FIG. 50, each of these components is separately formed and can therefore be formed from the same or different materials. In one example, the stem 130 is a metal component and the remaining components are plastic type components, for example nylon components. Due to the complexity of each individual part, it can be advantageous to form each independently, such as by an injection molding process. However, alternative arrangements are possible. For example, the actuator member 128 and the threaded stem 130 could be formed as a singular component. Similarly, the second gear member 126 could be integrally formed with the actuator member 128. The handle 122 and first gear member 124 could also be formed as a singular component. It is also possible to utilize a unitary formed component with the actuator member and stem formed together in such a configuration, the torque omitting features described herein would be lost.

Referring to FIGS. 51 to 55, the handle 122 is shown in further detail. In one aspect, the handle 122 includes a main body 122$a$ defining a sidewall 122$b$ extending from an end wall 122$c$ having a central aperture 122$d$. The handle 122 can further include an interior sidewall 122$e$ circumscribing the central aperture 122$d$. As shown, the interior sidewall includes a plurality of circumferentially arranged engagement features 122$f$ that interact with correspondingly shaped engagement features 124$d$ on the first gear member 124 such that rotation of the handle 122 imparts a rotational force onto the first gear member 124. In the particular embodiment shown, engagement features 122$f$ and 124$d$ are respectively provided as complementarily shaped protrusions and recesses, such as rounded wedge-shaped protrusions and scallop-shaped recesses. Other shapes are possible. The main body 122$a$ may also be provided with ribs 122$g$ or other gripping-type features to aid in providing a grasping surface for the user to impart a rotational force onto the handle 122. The main body could also be shaped to be operated by a tool, such as a wrench.

Referring to FIGS. 56 to 59, the first gear member 124 is shown in further detail. In one aspect, the first gear member includes a main body 124$a$ defining a sidewall 124$b$ and an end wall 124$c$. The previously discussed engagement features 124$d$ are circumferentially disposed on an outer portion or circumference of the sidewall 124$b$. When the first gear member 124 in inserted into the handle 122, the engagement features 122$f$, 124$d$ become engaged and the end wall 124$c$ fills and covers the central aperture 122$d$. As most easily seen at FIG. 59, the first gear member 124 is further provided with a plurality of first ratchet members 124$c$. As shown, each ratchet member 124$e$ is provided with a base portion 124$f$ extending inwardly from the sidewall 124$b$ and a nose portion 124$g$ extending towards a distal end 124$h$. The nose portion 124$g$ is disposed at a right or oblique angle to the base portion 124f to give the first ratchet members 124e a generally L-shape with a rounded root portion 124i formed at the interior bend portion. In one aspect, the base portion 124f and nose portion 124g form a relatively smooth or curved outer perimeter surface 124j. The first gear member 124 is also shown as being provided with a channel structure 124k for receiving protrusions 126e on the second gear member 126 such that a guiding and sliding surface for the second gear member 126 is provided.

Referring to FIGS. 60 to 63, the second gear member 126 is shown in further detail. In one aspect, the second gear member 126 includes a main body 126a defined by a sidewall 126b and an end wall 126c with the end wall 126c defining a central aperture 126d. The aforementioned protrusions 126e are shown as being provided on the end wall in a circular pattern such that they can be received into the channel structure 124k of the first gear member 124. The second gear member 126 is further provided with a plurality of second ratchet members 126f configured for engaging with the first ratchet members 124e of the first gear member 124. As shown, the second ratchet members 126f extend from a base end 126g to a distal end 126h and are provided with a curved or arc shape with an inner curved surface 126ih and an outer curved surface 126j. In one aspect, the second ratchet members 126f are deflectable in an inward direction towards the center of the second gear member main body 126a and in an outward direction away from the center of the second gear member main body 126a.

In one aspect, the second gear member 126 is also provided with an engagement arrangement 126k which receives a corresponding engagement arrangement 128e of the actuator member 128. In the particular embodiment shown, the engagement arrangements 126k, 128e are correspondingly shaped and have a projection-receiver shape that locks the components together to prevent relative rotation between them. The engagement arrangements 126k, 128e can be provided with a variety of shapes and geometries to suit this purpose and may be provided with simple geometric shapes and/or gear or spline shapes.

Figure 49:
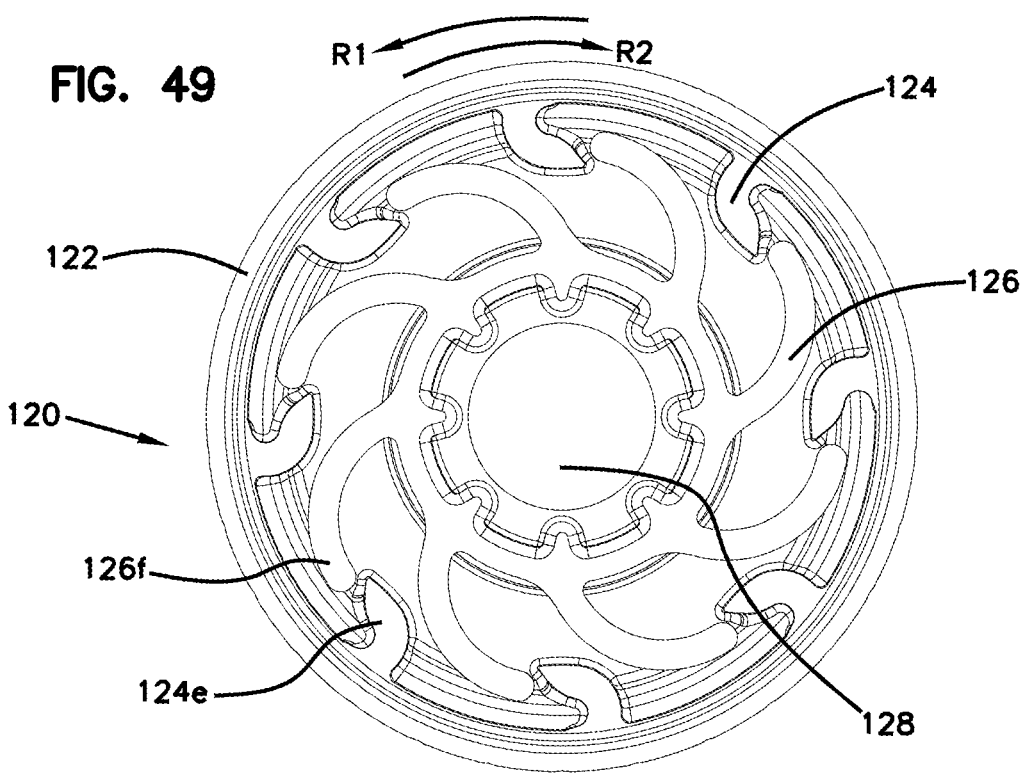
FIG. 49 is a schematic end view of a subassembly of the connector assembly shown in FIG. 44.

When the second gear member 126 is received by the first gear member 124, which can be seen most easily at FIG. 49, the first ratchet members 124e engage with the second ratchet members 126f of the second gear member 126. Through this interaction, rotation of the handle 122 can impart a rotational torque onto the second gear member 126, as is described in further detail below.

With reference to FIGS. 64 to 68, the actuator member 128 is shown in further detail. In one aspect, the actuator member 128 is provided with a main body 128a defining a cylindrical sidewall receiver portion 128b, a flange portion 128c adjoining the receiver portion, an outer sidewall 128d extending from the flange portion 128c, and the aforementioned engagement arrangement 128e which also extends from the sidewall 128d. A plurality of radially extending ribs 128f may also be provided to increase the stiffness or strength of the sidewall 128d.

In one aspect, a central aperture 128g extends through the receiver portion 128b into which the threaded stem 130 can be received. The threaded stem 130 is provided with a stem portion 130b having a cross-sectional shape that matches that of the central aperture 128g. As such, the central aperture 128g and stem portion 130b are correspondingly shaped and have a projection-receiver shape that locks the components together to prevent relative rotation between them. The stem portion 130b and central aperture 128g can be provided with a variety of shapes and geometries to suit this purpose and may be provided with simple geometric shapes and/or gear or spline shapes. In the example shown, the central aperture 128g is provided with a female hexagonal shape and the stem portion 130b is provided with a male hexagonal shape. The male hexagonal shape of the stem portion 130b, and other polygonal shapes, is advantageous in the event that the actuator member 128 fails in that the actuator member 128 can be removed and a tool, such as a wrench, can be engaged with the stem portion 130b to rotate the stem portion 130b. As noted previously, the threaded stem 130 and actuator member 128 could be provided a single, unitary component. The threaded stem 130 could also be configured to have a recess that receives a correspondingly shaped projection on the actuator member 128.

Referring to FIGS. 69 to 72, the threaded stem 130 is shown in further detail. In one aspect, the threaded stem 130 is provided with a main body 130a having a stem portion 130b, a radial flange portion 130c, and a threaded portion 130d. The radial flange portion 130c separates the stem portion 130b form the threaded portion 130d. The radial flange portion 130c abuts the end of the receiver portion 128b once the threaded stem 130 is fully inserted into the central aperture 128g. In one aspect, the radial flange portion 130c extends radially beyond the receiver portion 128b of the actuator member 128. The threaded portion 130d may be provided with a tapered distal portion 130e to aid in guiding the threaded portion 130d into the threaded bore 222b of the threaded engagement feature 222.

Figure 71:
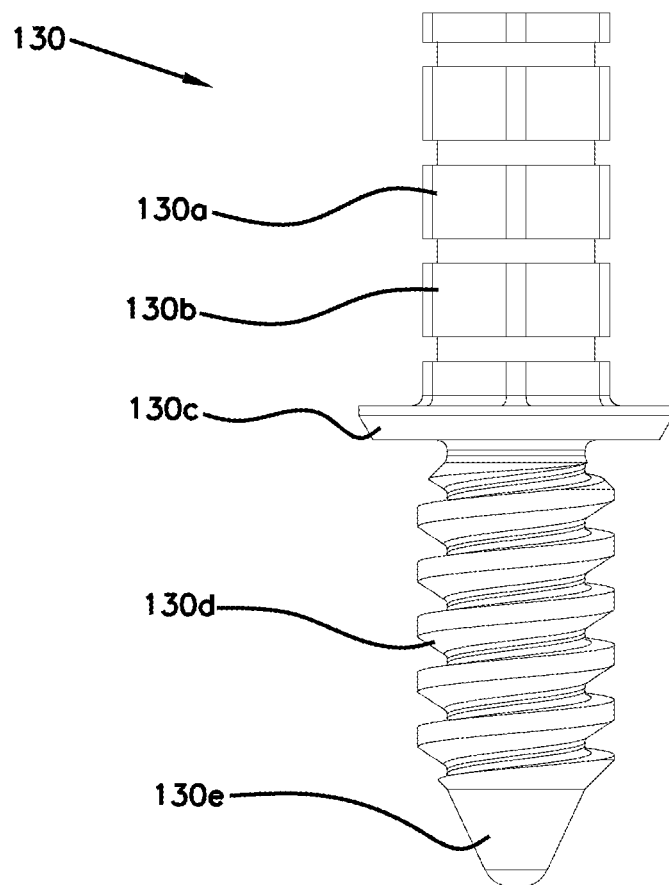
FIG. 71 is a schematic side view of the connector portion of the connector assembly shown in FIG. 69.
Figure 72:
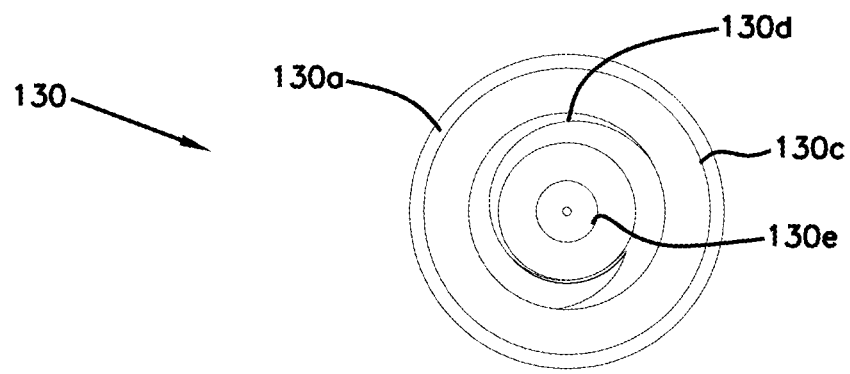
FIG. 72 is a schematic end view of the connector portion of the connector assembly shown in FIG. 69.
Figure 81:
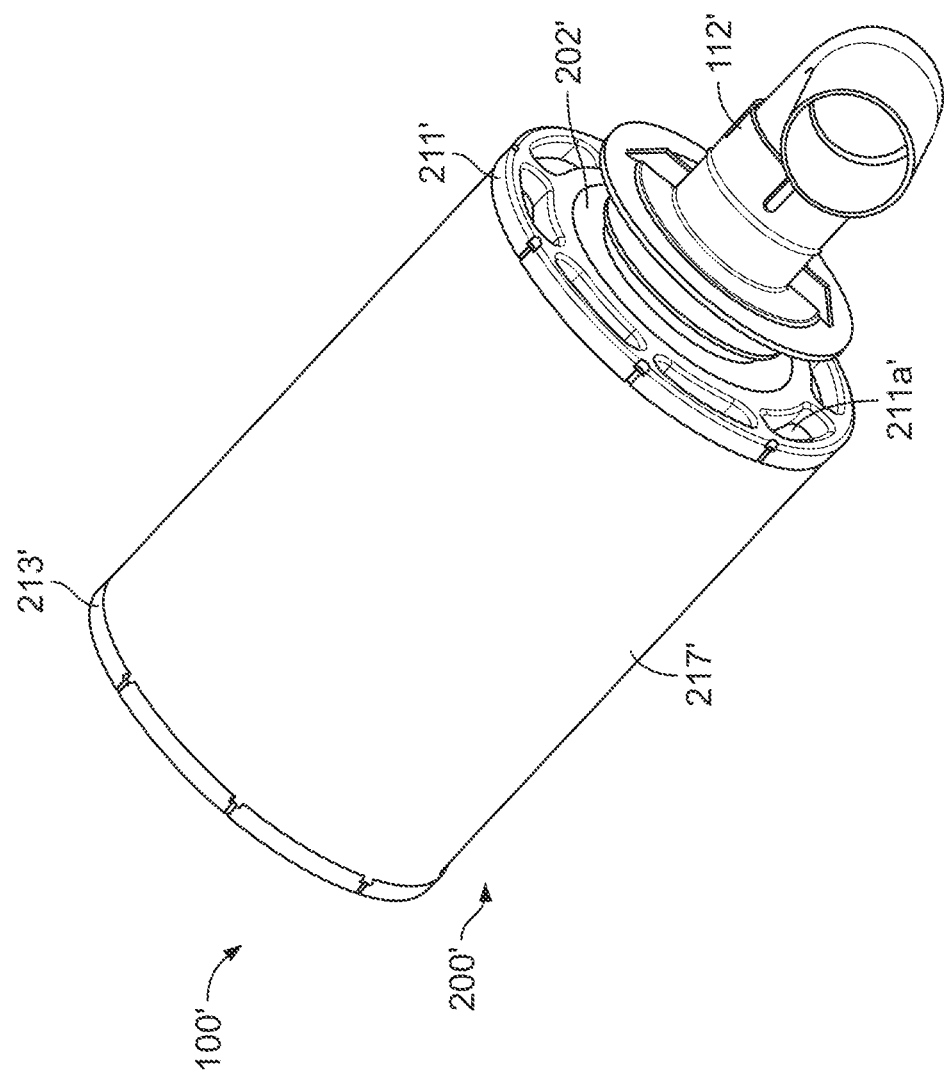
FIG. 81 is a schematic perspective view of a second example of an air cleaner assembly having features in accordance with the present disclosure.
Figure 82:
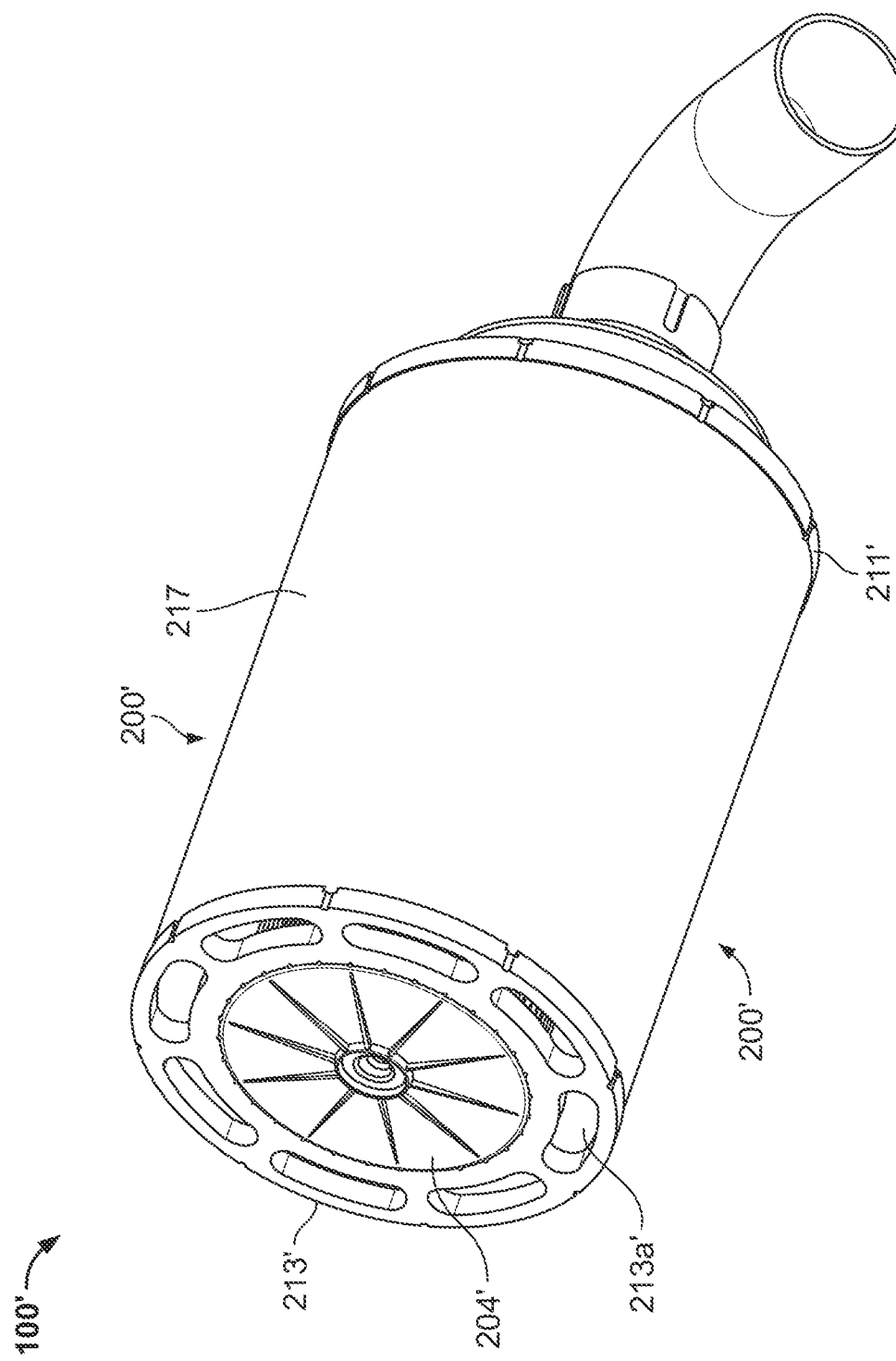
FIG. 82 is a schematic perspective view of the air cleaner assembly shown in FIG. 81.
Figure 83:
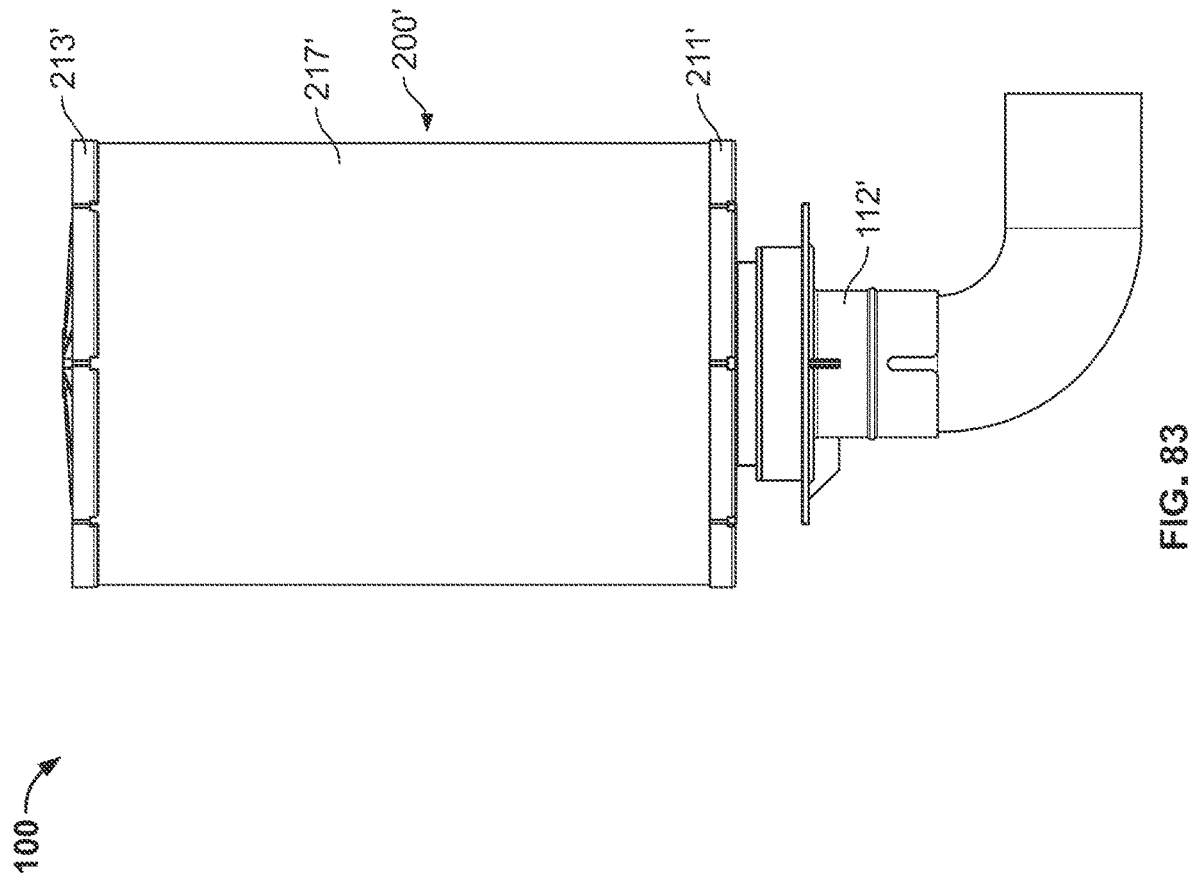
FIG. 83 is a schematic side view of the air cleaner assembly shown in FIG. 81.

In one aspect, the connection arrangement 120 can be assembled such that the actuator member 128 extends through and is received by the central opening 106e in the cover 106 whereby a circumferential rib 128h rides along the distal end wall defined in the cover 106 in a low-friction manner and the latch members 106d capture the flange 130c of the threaded stem 130 to prevent the connection arrangement from being removed from the cover 106. As the latch members 106d are deflectable, a fully assembled connection arrangement 120 can be inserted through the central opening 106c such that the latch members 106d deflect and ultimately snap over the flange portion 130c to provide a snap-fit connection between the cover 106 and the connection arrangement 120. As can be seen at FIG. 71, the flange portion 130c may be provided with a tapered face such that the latch members 106d can more easily slide past the flange portion 130c during insertion.

In operation, when the handle 122 is rotated in a first direction R1 (i.e. counterclockwise), the nose portions 124h guide and deflect the second ratchet members 126f in an outward direction such that the distal ends 126h of the second ratchet members 126f ride against the inside surface of the first ratchet members 124e until the distal ends 126h are captured into the root portions 124i of the first ratchet members 124. Once this position is achieved, the second ratchet members 126f can no longer deflect and any torque applied to the handle 122 in the first direction R1 is imparted onto the second gear member 126. As is described below, the actuation member 128 and the threaded stem 130 are rigidly attached to the second gear member 124 such that rotation of the handle 122 in the first direction R1 will cause the threaded stem 130 to also rotate in the first direction R1 to unthread the threaded stem 130 from the threaded bore 222b of the threaded engagement feature 222.

When the handle 122 is rotated in a second direction R2 (i.e. clockwise), the curved outer surface 124j of the first ratchet members 124e engaged against the outer curved surface 126j of the second ratchet members 126f. Accordingly, as the handle 122 is rotated in this direction, the threaded stem 130 is also rotated in the second direction R2 to thread the threaded stem 130 into the threaded bore 222*b* of the threaded engagement feature 222. As the threaded stem 130 is threaded in this manner, the filter cartridge 200 is drawn towards the connection arrangement 120 (i.e. the second connection arrangement 440) and away from the first connection arrangement 460 to place the filter cartridge 200 in tension. As is described in other portions of this disclosure, this tensile action operates to secure the filter cartridge 200 against the second connection arrangement 440 in a locked position and also operates to secure the cover 106 to the housing body 104.

As the second ratchet members 126*f* are deflectable, the torque applied to the handle 122 in the direction R2 will eventually generate a sufficient force such that the curved outer surface 124*j* of the first ratchet members 124*e* will act against the curved surface 126*j* of the second ratchet members 126*f* to cause the second ratchet members 126*f* to deflect inwardly and ride past the first ratchet members and generate an audible clicking sound. Once this occurs, the second ratchet members 126*f* will deflect back to their resting or relaxed positions and engage against the adjacent first ratchet members 124*c*. If torque continues to be applied to the handle 122, the tactile feedback of the slipping motion and the related audible sound generation will continue to alert an operator that the maximum tightening torque of the connection arrangement 120 has been achieved. With such a construction, the connection arrangement 120 cannot be tightened past a predetermined torque setting, thereby preventing a user from over-tightening the assembly and potentially damaging components of the air cleaner. As such, the connection arrangement 120 can be characterized as having a torque-limiting feature.

In the example shown, the first and second ratchet members 124*c*, 126*f* are designed with a material type, shape, thickness, and geometry to provide the predetermined maximum tightening torque setting. The design of the first and second ratchet members 124*c*, 126*f* may be modified to achieve various torque settings without departing from the concepts presented herein. Furthermore, differently configured gear members 126 may be placed in the connection arrangement 120 such that a desired torque setting is achieved.

In some examples, the torque setting is a function of the desired tensile force the filter cartridge 200 is placed under by the connection arrangement 120. In some examples, the tensile force is sufficient to resist movement of an element with a given maximum loaded weight plus the cover weight accelerated at 10g in the long axis. Accordingly, the tensile force can be a function of, among other things, the configuration, size, and mass of the filter cartridge 200. In some examples, the tensile force is between 0.75 kilograms and 95 kilograms. The torque setting is thus a setting that will enable the desired or predetermined tensile force to be achieved before slipping occurs such that an operator is ensured that the cartridge has been appropriately secured by the tactile and audible feedback of the slipping action. In view of the above, in some examples, the torque setting can be characterized as both a minimum torque setting that ensures that the minimum or required tensile load is placed on the filter cartridge 200 and as a maximum torque setting that ensures that the connection arrangement 120 is not tightened to a point where breakage or failure might occur. In some examples, for example on high torque applications, the diameter and/or shape of the handle or knob 122, and/or the threads 130*d*/222*b* can be sized and configured such that an operator can achieve the torque setting defined by the required tensile force without the use of tools and unreasonable force. For example, the handle or knob 122 can be provided with a relatively larger diameter for higher force applications. Likewise, the threads 130*d*/222*b* can be provided at a finer pitch for higher force applications.

As can be appreciated from the foregoing description, the connection arrangement 120 can be rotated in the first direction R1 with no pre-determined torque limitation placed on the arrangement while only being able to be rotated in the second direction R2 up to a predetermined torque setting. In one aspect, the components of the connection arrangement can be formed from a polymeric material. Other materials are possible.

Air Cleaner Assembly 100'

Referring to FIGS. 81 to 89, a second example air cleaner assembly 100' with an air filter cartridge 200' and an optional secondary air filter cartridge 300 or tower 500 is shown. The air cleaner 100' primarily differs in that the air filter cartridge 200' is provided as a "stand-alone" element and is constructed in such a way that an external housing is not needed. The air cleaner assembly 100' is similar to air cleaner assembly 100 in that same first connection arrangement 400 is provided for the air cleaner assembly 100'. Accordingly, the outlet 112' of the air cleaner assembly 100' is provided with a second portion 420 of a first connection arrangement 400 that cooperatively operates with a first portion 410 of the first connection arrangement 400 provided on the filter cartridge 200' to secure the filter cartridge 200' to the outlet 112', as previously described. Accordingly, the features of the first connection arrangement 400 of the air cleaner assembly 100' need not be repeated in this section. Also, the relevant features of the outlet tube 112' are generally the same as that already shown and described for the outlet tube 112. Accordingly, the overlapping features of the outlet tube 112' and 112 need not be repeated in this section. As the filter cartridge 200' is provided as a stand-alone element in which no external housing is provided, the filter cartridge 200' does not incorporate the second connection arrangement 440 described for the air filter cartridge 200.

Figure 89:
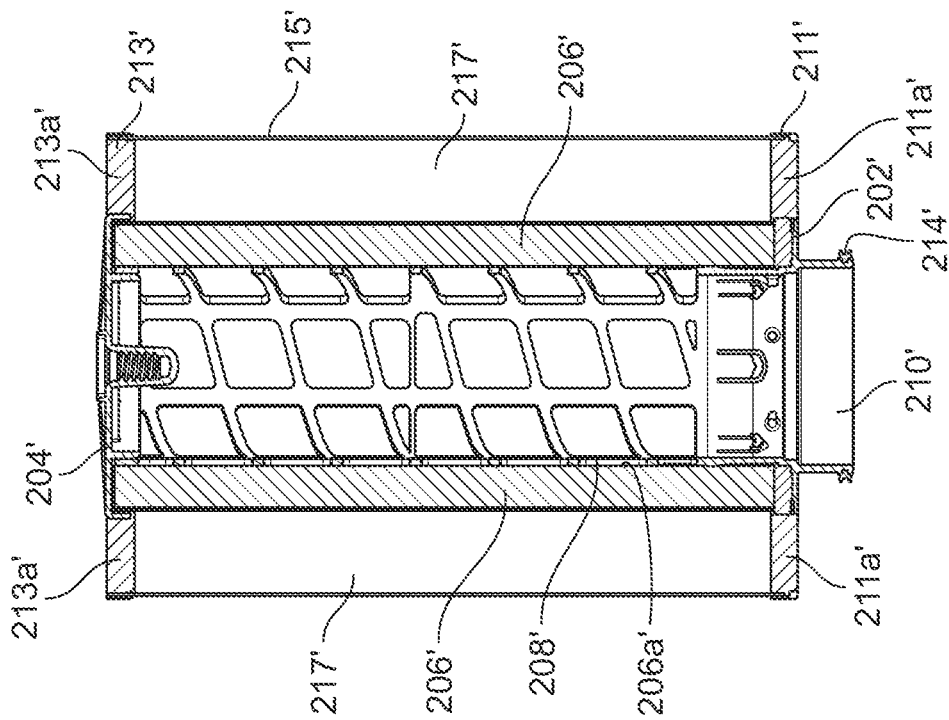
FIG. 89 is a schematic cross-sectional side view of the filter cartridge of the air cleaner assembly shown in FIG. 81.

As most easily seen at FIG. 89, the air filter cartridge 200' includes a first end cap 202' and a second end cap 204', between which filter media 206' extends. In one example, the end caps 202', 204' are formed from a molded polymeric material. A support tube 208', which may formed from a plastic or metal material, is provided at an interior side 206*a*' of the media 206' to support the media 206'. The filter media 206' can be provided in any of the forms, materials, and configurations as already described for filter media 206 and need not be repeated in this section.

In the example shown, an end cover 210' is provided at the first end cap 202' while an end cover 212' is provided at the second end cap 204'. The support tube 208', end caps 202', 212', and end covers 210', 212' are generally configured similarly to the corresponding components of the filter cartridge 200. Accordingly, these features need not be described again in this section. However, in contrast to the filter cartridge 200, the filter cartridge 200' is provided with additional end covers 211' and 213' which are respectively mounted to the end covers 210', 212'. The filter cartridge 200' is also provided with an outer shell 215' extending between the end covers 211', 213' to define an interior volume 217' within which the media 206' is housed. Each of the end covers 211', 213' is provided with a plurality of openings 211*a*', 213*a*', respectively. In operation, unfiltered ambient air flows into and through the openings 211*a*', 213*a*', into the interior volume 217', through the filter media 206', and through the outlet tube 112'.

Figure 84:
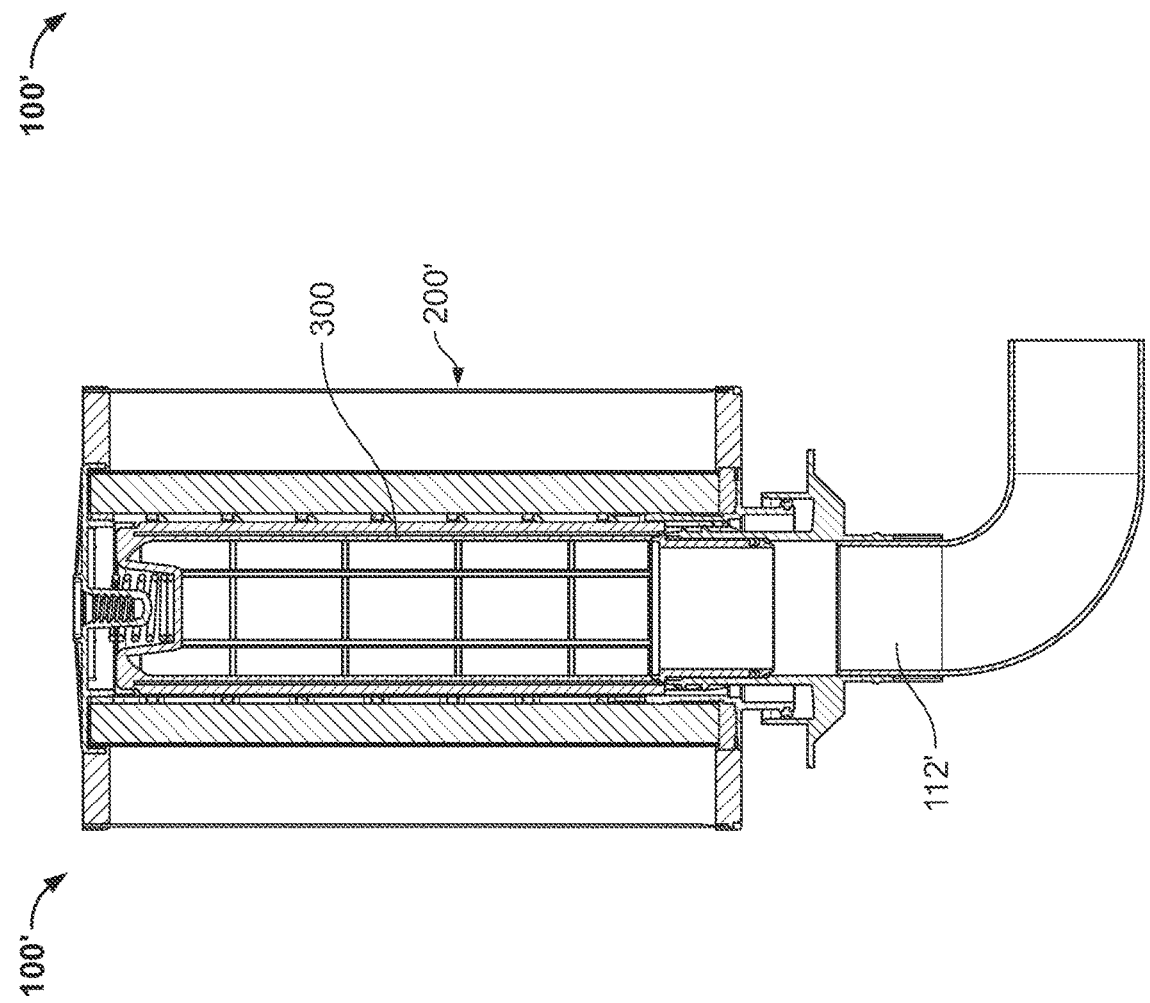
FIG. 84 is a schematic cross-sectional side view of the air cleaner assembly shown in FIG. 81, with the air cleaner assembly shown as including an optional secondary or safety filter element.
Figure 86:
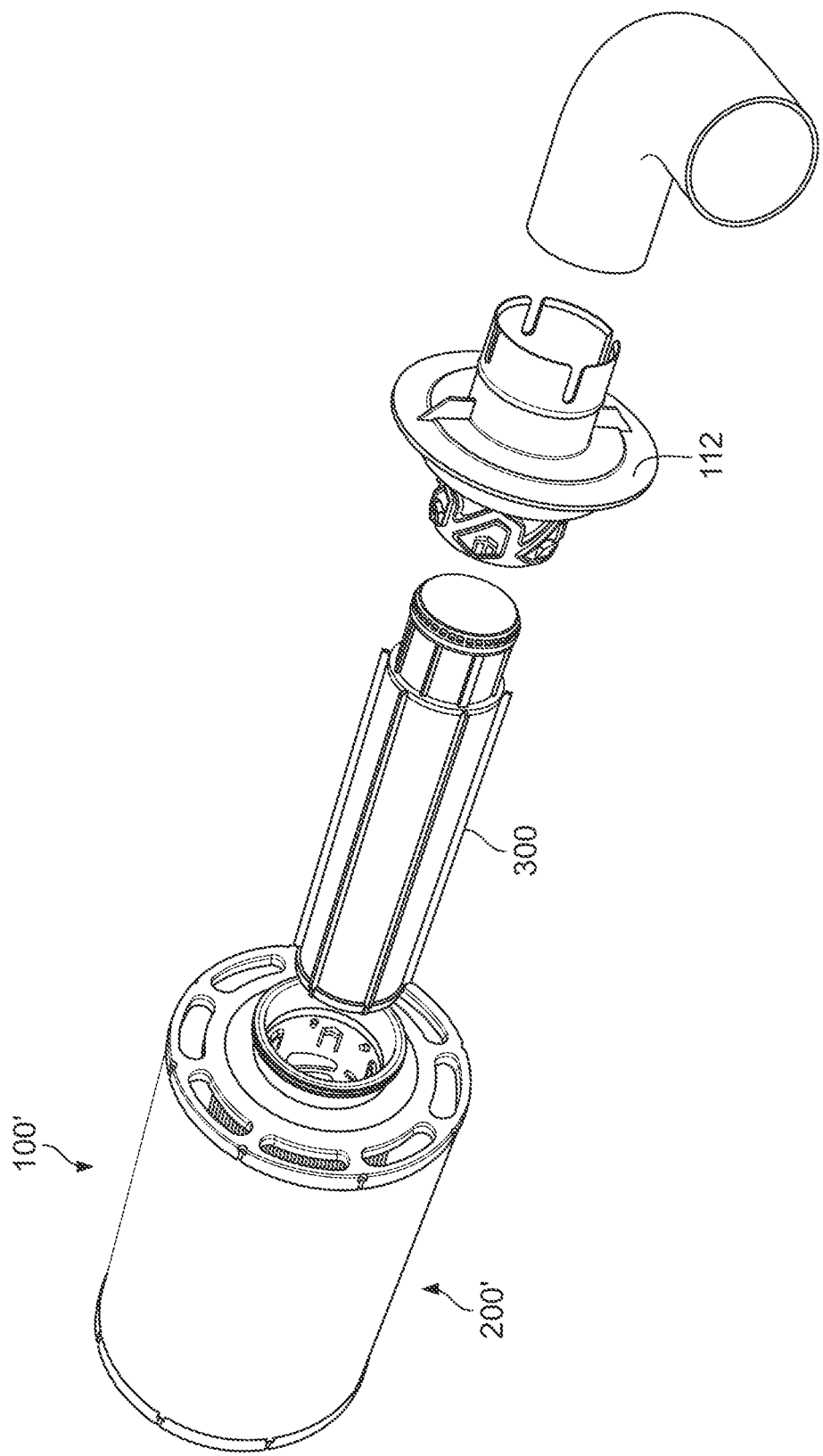
FIG. 86 is a schematic exploded perspective view of the air cleaner assembly and optional secondary filter element shown in FIG. 84.
Figure 87:
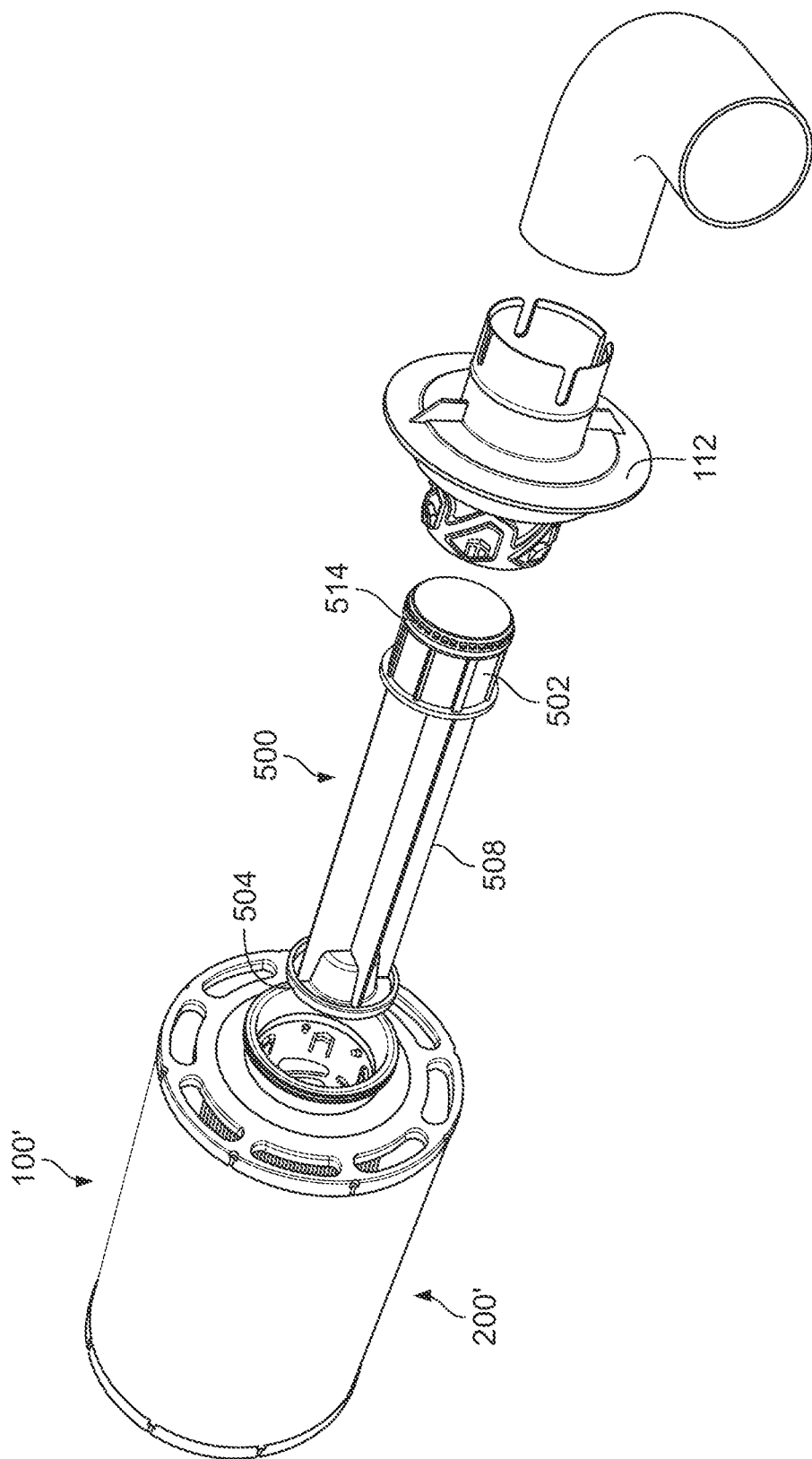
FIG. 87 is a schematic exploded perspective view of the air cleaner assembly and optional tower shown in FIG. 85.

As previously mentioned, and as most easily seen at FIGS. 84 and 86, the air cleaner assembly 100' can further include the previously described safety filter cartridge 300 and biasing spring 220. The biasing spring 220 can be provided as a loose component, mounted to the end cover 204' of the filter cartridge 200', or can be mounted within the recess defined within the safety filter cartridge 300. The interaction between the biasing spring 220, air filter cartridge 200', and air filter cartridge 300 is the same as previously described for the embodiment including the biasing spring 220 and air filter cartridges 200, 300.

Figure 85:
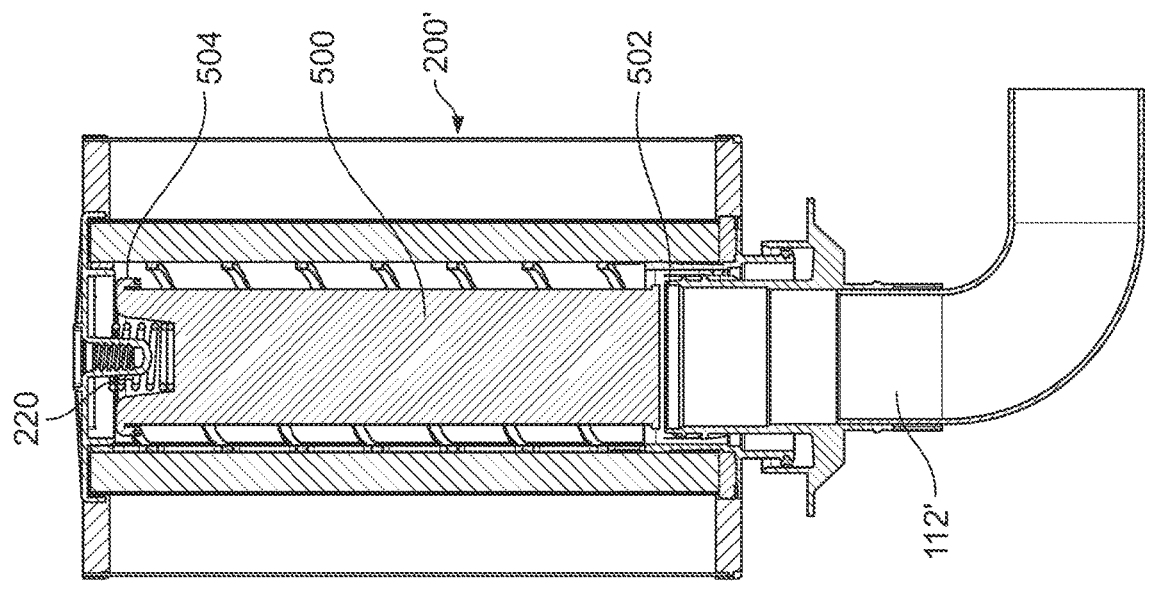
FIG. 85 is a schematic cross-sectional side view of the air cleaner assembly shown in FIG. 81, with the air cleaner assembly shown as including an optional internal tower.
Figure 88:
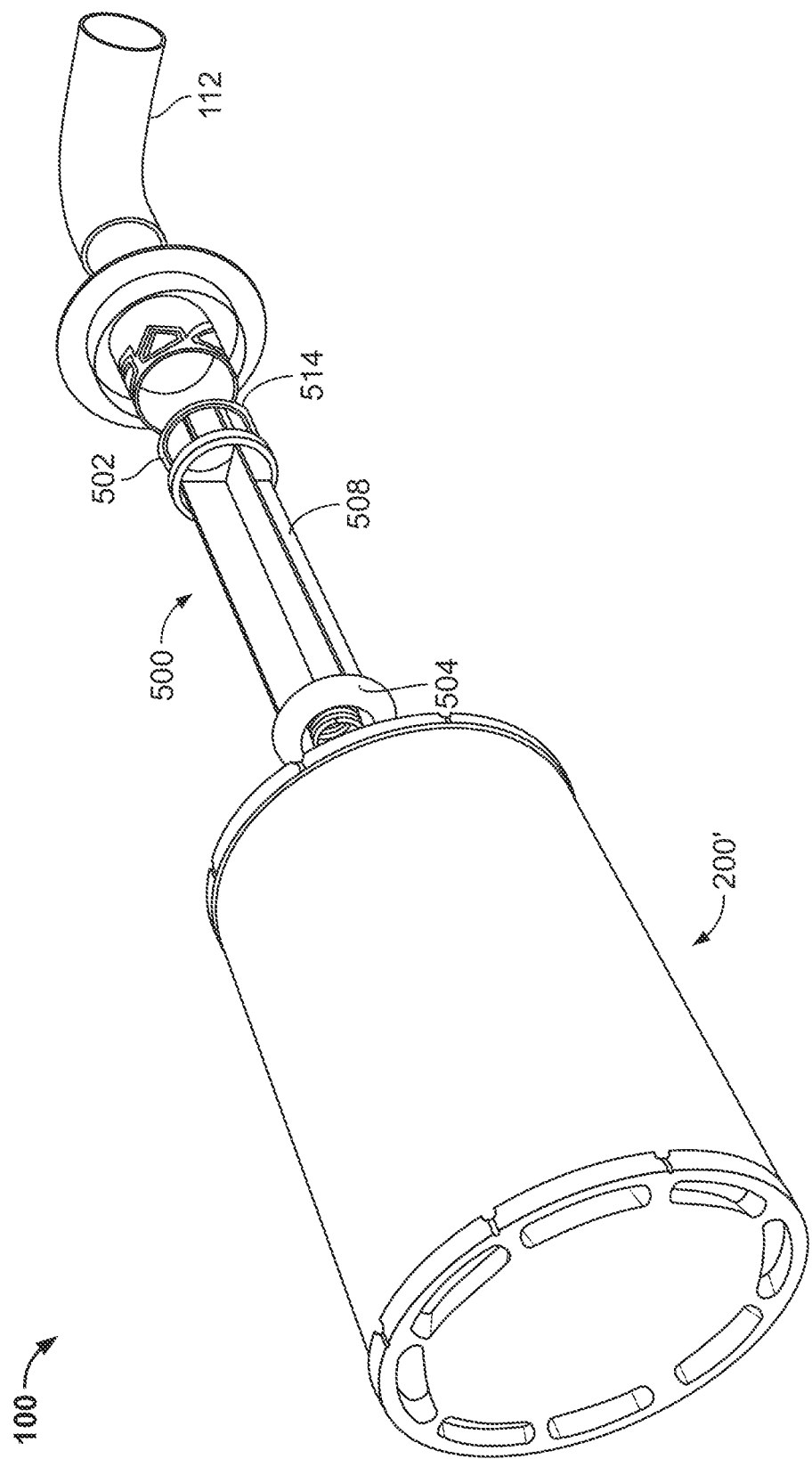
FIG. 88 is a schematic exploded perspective view of the air cleaner assembly and optional tower shown in FIG. 87.

Instead of a safety filter cartridge 300, the air cleaner assembly 100' can alternatively include a tower 500, as shown at FIGS. 85, and 88. The tower 500 can be provided when a safety filter cartridge is not desired while still providing a support structure for the biasing spring 220. Thus, the tower 500 enables the filter cartridge 200' to still be biased away from the first connection arrangement 400 by operation of the spring 220 even though a safety filter cartridge is not present.

In one aspect, the tower 500 includes first and second end caps 502, 504 between which a support structure 508 extends. As shown, the support structure 508 has an X-shaped or cross-shaped cross-sectional shape, thereby allowing air to flow relatively unobstructed along the length of the support structure 508. Other shapes are possible. For example, the support structure 508 could be formed as a central post or as a support tube with a sidewall having a plurality of openings. The support structure 508 may be formed from a plastic or metal material. The support structure 508 may be integrally or separately formed with the end caps 502, 504 and or integrally or separately formed with the outlet 210. In the particular example shown, the support structure 508 is integrally formed with the end cap 504 and is attached to a separately formed end cap 502, such as by a plastic welding process or an adhesive. In the example shown, the end cap 502 is provided with a seal member 514 and is generally configured the same as the end cap 302 provided for the safety filter cartridge 300, and need not be further described here. Likewise, the end cap 504 is generally configured the same as the end cap 304 provided for the safety filter cartridge 300, and need not be further described here.

Figure 91:
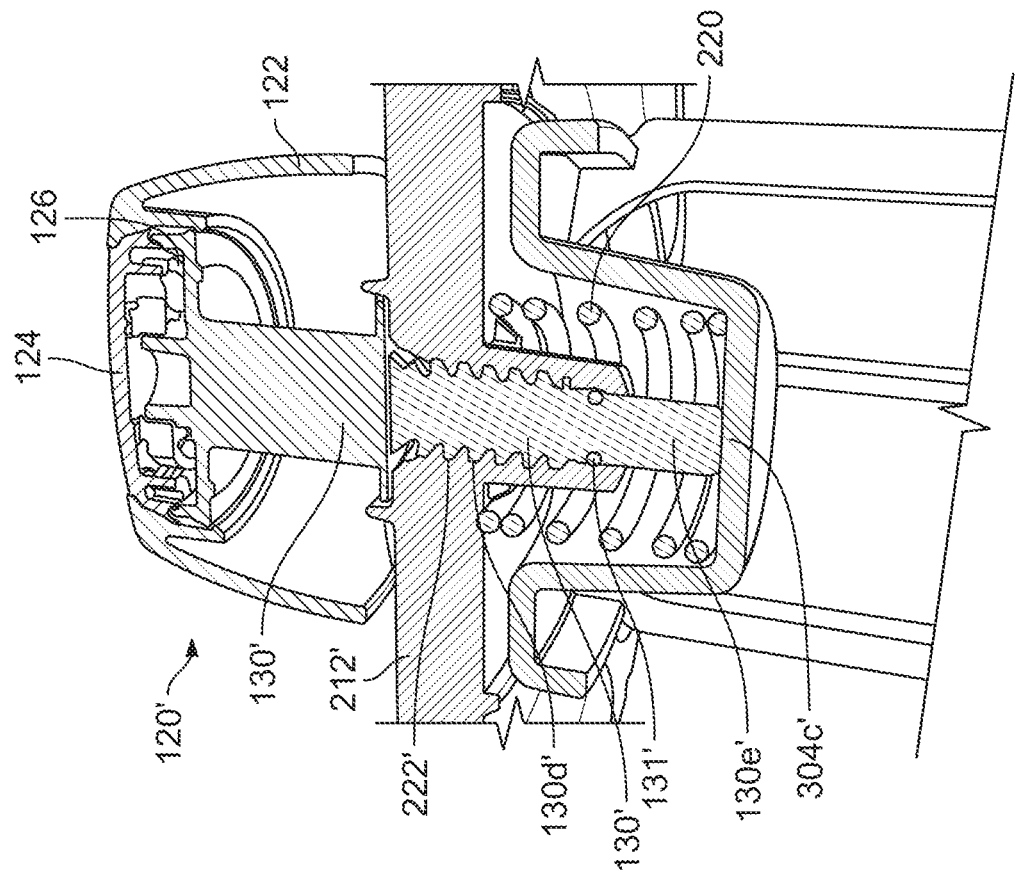
FIG. 91 is a schematic cross-sectional view of the air cleaner assembly and connection arrangement shown in FIG. 90.
Figure 90:
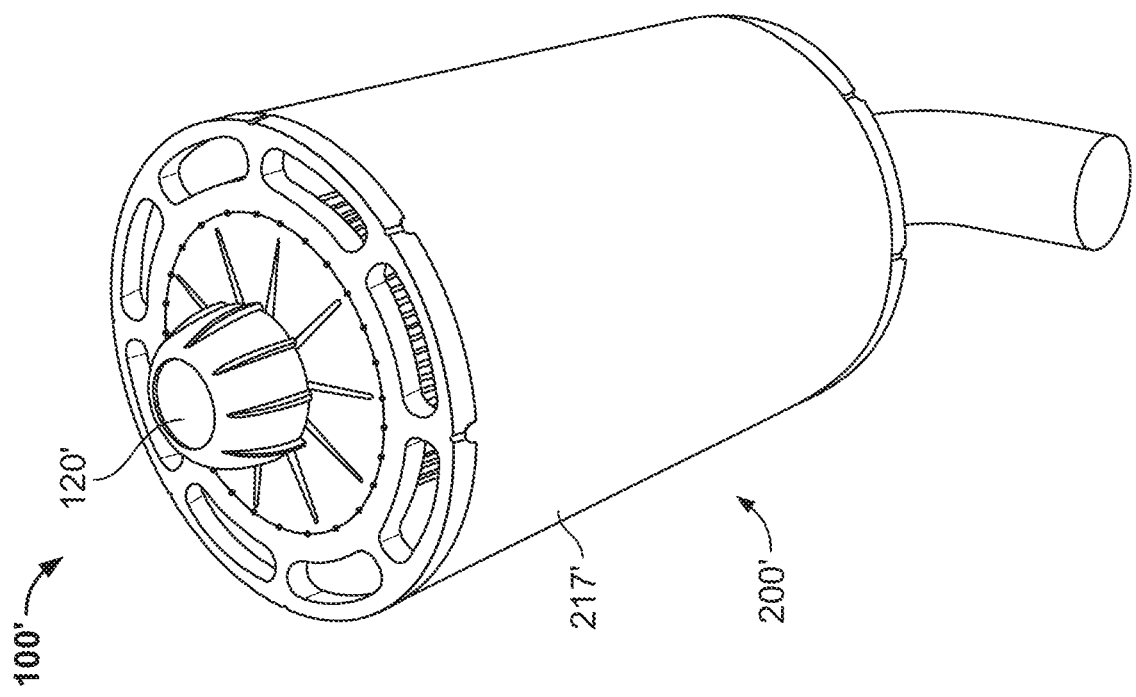
FIG. 90 is a schematic perspective view of the air cleaner assembly shown in FIG. 81, with an optional connection arrangement installed.

Referring to FIGS. 90 and 91, the air cleaner assembly 100' is shown as including an optional connection arrangement 120'. The connection arrangement 120' is similar to the connection arrangement 120 and the description for the various components that are similar need not be repeated here. As the air cleaner assembly 100' does not include a separate housing, the threaded engagement feature 222' provided in the cover 212' has an open end such that the distal portion 130e' of the threaded stem 130' can extend through the open end and contact the end wall 304c'. As the threaded stem 130' is engaged with the end cover 212' by tightening the connector assembly 120', the resulting contact between the distal portion 130e' and the end wall 304c' places the filter cartridge 200' in tension against the first connection arrangement 400 to more securely retain the filter cartridge 200' in the same general manner as already described for the operation of the connector assembly 120. As the threaded engagement feature 222' has an open end extending into the clean side of the filter cartridge 200', a seal 131' can be provided that forms a seal between the threaded engagement feature 222' and the distal portion 130e'. In the example shown, the seal 131' is an O-ring type seal. Other types of seals are possible.

Referring to FIG. 92, a variation of the air cleaner assembly 100' is shown in which the outer shell 215' is not provided and the outer perimeter of the media 206' is exposed. In such an embodiment, end covers 211', 213' having apertures is not necessary. In the example shown, the air cleaner assembly 100' shown at FIG. 92 includes an outer liner 215", which is shown in this example as being an expanded metal liner.

The principles described herein can be applied in a variety of filter assemblies. Examples described in which the principles applied to (air) gas filter assemblies. Examples are described include air filters and crankcase ventilation filter assemblies. The principles can be applied to a variety of alternate gas filtration arrangements, in some instances even with liquid filter assemblies.

Again, the principles, techniques, and features described herein can be applied in a variety of systems, and there is no requirement that all of the advantageous features identified be incorporated in an assembly, system or component to obtain some benefit according to the present disclosure.

What is claimed is:

1. An air filter cartridge comprising:
   a) an air filtration media arrangement extending between a first end and a second end;
   b) a first end cap proximate the first end of the air filtration media arrangement;
   c) a second end cap proximate the second end of the air filtration media arrangement;
   d) a first part of a first connection arrangement for engaging with a second part of the first connection arrangement associated with a housing of an air cleaner assembly, wherein the first part is at least partially located within a clean airflow path defined between the first end cap and the air filtration media arrangement, the first part including a guide pin extending in a first radial direction; and
   e) a seal arrangement extending in a second radial direction that is opposite to the first radial direction.

2. The air filter cartridge of claim 1, wherein the guide pin includes a plurality of guide pins.

3. The air filter cartridge of claim 2, wherein the plurality of guide pins are integrally formed in a support tube of the air filter cartridge.

4. The air filter cartridge of claim 1, wherein the air filtration media arrangement includes pleated media.

5. An air filter cartridge comprising:
   a) an air filtration media arrangement extending between a first end and a second end;
   b) a first end cap proximate the first end of the air filtration media arrangement;
   c) a second end cap proximate the second end of the air filtration media arrangement; and
   d) a first part of a first connection arrangement for engaging with a second part of the first connection arrangement associated with a housing of an air cleaner assembly, wherein the first part is at least partially located within a clean airflow path defined between the first end cap and the air filtration media arrangement, wherein the first part includes a guide pin extending in a radially inward direction towards a longitudinal axis of the air filtration media arrangement.

6. The air filter cartridge of claim 5, further including a seal arrangement.

7. The air filter cartridge of claim 6, wherein the seal arrangement is arranged to form an outwardly directed radial seal with the air cleaner assembly.

8. An air cleaner assembly comprising:
a) an outlet tube;
b) an air filter cartridge extending along a longitudinal axis and including an air filtration media separating an air inlet from an air outlet, the filter cartridge including a seal arrangement forming a seal with the outlet tube; and
c) a first connection arrangement having a first part associated with one of the air filter cartridge and the outlet tube and having a second part associated with the other of the air filter cartridge and the outlet tube, wherein one of the first and second parts includes a guide pin;
d) wherein the air filter cartridge is movable between a latched position and an unlatched position, and wherein:
  i) in the latched position, the first part is engaged with the second part;
  ii) in the unlatched position, the first part is disengaged with the second part.

9. The air cleaner assembly of claim 8, wherein the guide pin includes a plurality of guide pins.

10. The air cleaner assembly of claim 9, wherein the plurality of guide pins are integrally formed in a support tube of the air filter cartridge.

11. The air cleaner assembly of claim 10, wherein each of the plurality of guide pins extends from the support tube at an oblique angle to an interior surface of the support tube.

12. The air cleaner assembly of claim 8, wherein the air filtration media includes pleated media.

13. The air cleaner assembly of claim 8, wherein the seal arrangement forms an outwardly directed radial seal with the outlet tube.

14. The air cleaner assembly of claim 8, wherein the air cleaner assembly includes a housing and the outlet tube is operably connected to or formed with the housing to define an outlet of the air cleaner assembly.

* * * * *